US011718156B2

(12) United States Patent
Kobayashi et al.

(10) Patent No.: US 11,718,156 B2
(45) Date of Patent: Aug. 8, 2023

(54) REFRIGERATION CYCLE DEVICE

(71) Applicant: DENSO CORPORATION, Kariya (JP)

(72) Inventors: Hiroyuki Kobayashi, Kariya (JP); Yuichi Kami, Kariya (JP); Kengo Sugimura, Kariya (JP); Satoshi Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 421 days.

(21) Appl. No.: 17/110,086

(22) Filed: Dec. 2, 2020

(65) Prior Publication Data

US 2021/0101450 A1 Apr. 8, 2021

Related U.S. Application Data

(63) Continuation of application No. PCT/JP2019/023462, filed on Jun. 13, 2019.

(30) Foreign Application Priority Data

Jun. 22, 2018 (JP) ................. 2018-118489

(51) Int. Cl.
*F25B 1/00* (2006.01)
*B60H 1/32* (2006.01)
(Continued)

(52) U.S. Cl.
CPC ............ *B60H 1/3205* (2013.01); *B60H 1/04* (2013.01); *B60H 1/323* (2013.01); *B60H 1/3223* (2013.01);
(Continued)

(58) Field of Classification Search
CPC ...... B60H 1/3205; B60H 1/04; B60H 1/3223; B60H 1/323; B60H 1/00278;
(Continued)

(56) References Cited

U.S. PATENT DOCUMENTS

| 2012/0255319 A1 | 10/2012 | Itoh et al. |
| 2015/0159933 A1 | 6/2015 | Itoh et al. |
| 2019/0111756 A1 | 4/2019 | Makimoto et al. |

FOREIGN PATENT DOCUMENTS

| JP | H11125472 A | 5/1999 |
| JP | 5929372 B2 | 6/2016 |

(Continued)

OTHER PUBLICATIONS

U.S. Appl. No. 17/110,058, filed Dec. 2, 2020, Satoshi Ito et al.

*Primary Examiner* — Davis D Hwu
(74) *Attorney, Agent, or Firm* — Harness, Dickey & Pierce, P.L.C.

(57) ABSTRACT

A refrigeration cycle device includes a compressor, a radiator, an air-conditioning heat exchanger, a cooling heat exchanger, an air-conditioning decompression unit, a cooler-unit decompression unit, a refrigerant flow rate detector, and a controller. The radiator is configured to radiate heat of refrigerant discharged from the compressor. The air-conditioning heat exchanger absorbs heat from air to evaporate the refrigerant. The cooling heat exchanger is arranged in parallel with the air-conditioning heat exchanger in the flow of refrigerant. The air-conditioning decompression unit adjusts a decompression amount of the refrigerant flowing into the air-conditioning heat exchanger. The cooler-unit decompression unit adjusts a decompression amount of the refrigerant flowing into the cooling heat exchanger. The controller controls the operation of the cooler-unit decompression unit so that the flow rate of the refrigerant detected by the refrigerant flow rate detector exceeds a predetermined reference flow rate.

7 Claims, 20 Drawing Sheets

(51) Int. Cl.
   *B60H 1/04*        (2006.01)
   *B60H 1/00*        (2006.01)
(52) U.S. Cl.
   CPC .... *B60H 1/00278* (2013.01); *B60H 2001/325* (2013.01); *B60H 2001/3242* (2013.01); *B60H 2001/3257* (2013.01)
(58) Field of Classification Search
   CPC ...... B60H 2001/3242; B60H 2001/325; B60H 2001/3257
   USPC ....................................................... 62/228.3
   See application file for complete search history.

(56)                References Cited

FOREIGN PATENT DOCUMENTS

JP       WO2018211958 A1 *  11/2018
JP          2019211197 A     12/2019
WO      WO-2017217099 A1    12/2017

* cited by examiner

REFRIGERATION CYCLE DEVICE

CROSS REFERENCE TO RELATED APPLICATION

The present application is a continuation application of International Patent Application No. PCT/JP2019/023462 filed on Jun. 13, 2019, which designated the U.S. and claims the benefit of priority from Japanese Patent Application No. 2018-118489 filed on Jun. 22, 2018. The entire disclosures of all of the above applications are incorporated herein by reference.

TECHNICAL FIELD

The present disclosure relates to a refrigeration cycle device for an air conditioner.

BACKGROUND

A refrigeration cycle device is applied to a vehicle air conditioner to control the temperature of air to be blown into a cabin that is a target space to be air-conditioned.

SUMMARY

According to an aspect of the present disclosure, a refrigeration cycle device includes a compressor, a radiator, an air-conditioning heat exchanger, a cooling heat exchanger, an air-conditioning decompression unit, a cooler-unit decompression unit, a refrigerant flow rate detector, and a controller. The compressor sucks in and discharges refrigerant. The radiator is configured to emit heat of the refrigerant that was discharged from the compressor. The air-conditioning heat exchanger absorbs heat from air to evaporate the refrigerant. The cooling heat exchanger is arranged in parallel with the air-conditioning heat exchanger in the flow of the refrigerant radiated by the radiator, and absorbs heat from a target object or heat medium circulating for the target object to evaporate the refrigerant. The air-conditioning decompression unit adjusts a decompression amount of the refrigerant flowing into the air-conditioning heat exchanger by adjusting the opening area of the air-conditioning passage that guides the refrigerant flowing out of the radiator to the inlet side of the air-conditioning heat exchanger. The cooler-unit decompression unit adjusts a decompression amount of the refrigerant flowing into the cooling heat exchanger by adjusting the opening area of the cooling passage that guides the refrigerant flowing out of the radiator to the inlet side of the cooling heat exchanger. The refrigerant flow rate detector detects the flow rate of the refrigerant flowing into the cooling heat exchanger. The controller controls the operation of the cooler-unit decompression unit so that the flow rate of the refrigerant detected by the refrigerant flow rate detector exceeds a predetermined reference flow rate.

DESCRIPTION OF EMBODIMENT

Figure 1:
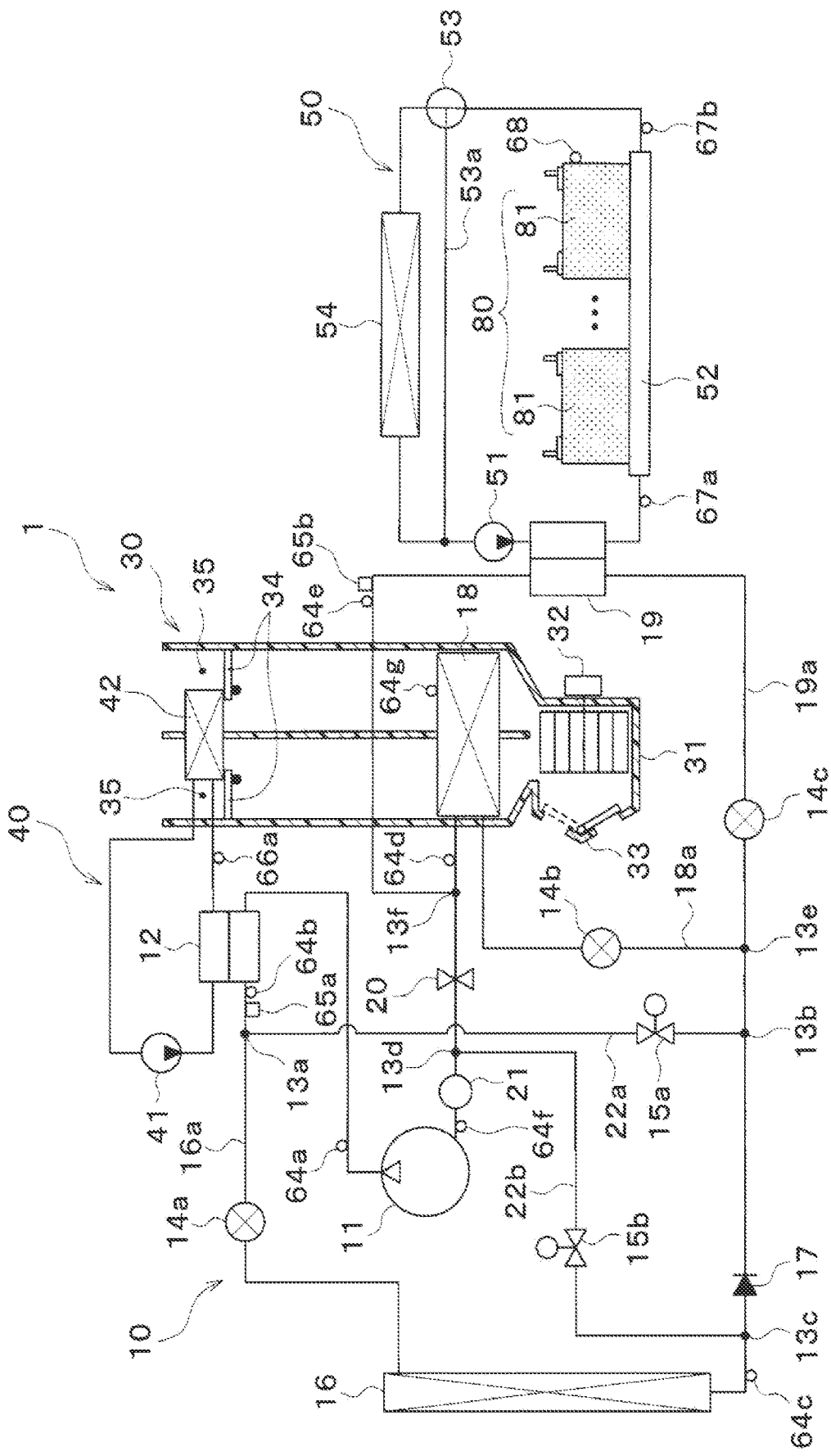
FIG. 1 is an overall configuration diagram of a vehicle air conditioner of a first embodiment.

To begin with, examples of relevant techniques will be described.

A refrigeration cycle device is configured so that the refrigerant circuit is switchable. Specifically, the refrigeration cycle device is configured to be able to switch the refrigerant circuit between a cooling mode, a heating mode, a dehumidification heating mode, and the like. The cooling mode is an operation mode in which air is cooled by the indoor evaporator. The heating mode is an operation mode in which air is heated by the indoor condenser. The dehumidification heating mode is an operation mode in which the air that has been cooled and dehumidified by the indoor evaporator is reheated by the indoor condenser.

Further, in the dehumidification heating mode, the refrigerant circuit is switched to connect the outdoor heat exchanger and the indoor evaporator in series to the refrigerant flow, or to connect the outdoor heat exchanger and the indoor evaporator in parallel to the refrigerant flow. Thus, in the refrigeration cycle device, the amount of heat exchange between the refrigerant and the outside air in the outdoor heat exchanger is adjusted during the dehumidification heating mode. Thus, it is possible to adjust continuously the temperature of the air within a wide range from high temperature to low temperature.

As described above, the ability to continuously adjust the temperature of the air over a wide range is effective to realize comfortable heating for the cabin when applied to an air conditioner for a vehicle in which a heat source for heating tends to be insufficient. A heat source for heating tends to be insufficient, for example, in an electric vehicle, as exhaust heat of an engine cannot be used.

In recent years, it is necessary to cool a battery that supplies power for driving a hybrid vehicle or electric vehicle.

The applicant considers cooling a battery by absorbing heat by adding a cooling heat exchanger to the refrigeration cycle device. Specifically, in the refrigerant flow, the cooling heat exchanger is arranged in parallel with the air conditioning heat exchanger (that is, at least one of the indoor condenser and the outdoor heat exchanger) to adjust the temperature of the air and to cool the battery.

However, according to the applicant's detailed study, the following situations may occur in this case. That is, the cooling heat exchanger has a higher target temperature and a smaller required cooling amount than the air conditioning heat exchanger. Therefore, the flow rate of the refrigerant flowing through the cooling heat exchanger becomes low, and the refrigerant on the outlet side of the cooling heat exchanger tends to be an overheated gas refrigerant. Therefore, oil stagnation may occur in the cooling heat exchanger. The oil stagnation refers to a phenomenon in which the refrigerant oil stays in the cooling heat exchanger and the refrigerant oil returns insufficiently from the cooling heat exchanger to the compressor.

In view of the above points, the present disclosure provides a refrigeration cycle device in which the air conditioning heat exchanger and the cooling heat exchanger for heat absorption are arranged in parallel with respect to the refrigerant flow, and to suppress oil from staying in the cooling heat exchanger.

In order to achieve the above object, the refrigeration cycle device according to one aspect of the present disclosure includes a compressor, a radiator, an air-conditioning heat exchanger, a cooling heat exchanger, an air-conditioning decompression unit, a cooler-unit decompression unit, a refrigerant flow rate detector, and a controller.

The compressor sucks in and discharges refrigerant. The radiator is configured to emit heat of the refrigerant that was discharged from the compressor. The air-conditioning heat exchanger absorbs heat from air to evaporate the refrigerant. The cooling heat exchanger is arranged in parallel with the air-conditioning heat exchanger in the flow of the refrigerant radiated by the radiator, and absorbs heat from a target object or heat medium circulating for the target object to evaporate the refrigerant.

The air-conditioning decompression unit adjusts a decompression amount of the refrigerant flowing into the air-conditioning heat exchanger by adjusting the opening area of the air-conditioning passage that guides the refrigerant flowing out of the radiator to the inlet side of the air-conditioning heat exchanger. The cooler-unit decompression unit adjusts a decompression amount of the refrigerant flowing into the cooling heat exchanger by adjusting the opening area of the cooling passage that guides the refrigerant flowing out of the radiator to the inlet side of the cooling heat exchanger.

The refrigerant flow rate detector detects the flow rate of the refrigerant flowing into the cooling heat exchanger. The controller controls the operation of the cooler-unit decompression unit so that the flow rate of the refrigerant detected by the refrigerant flow rate detector exceeds a predetermined reference flow rate.

Accordingly, the operation of the cooler-unit decompression unit is controlled so that the flow rate of the refrigerant flowing into the cooling heat exchanger exceeds the reference flow rate. Thus, the flow rate of the refrigerant flowing through the cooling heat exchanger can be secured. Therefore, it is possible to restrict the refrigerant oil of the refrigerating cycle device from accumulating in the cooling heat exchanger. Therefore, it is possible to suppress oil from staying in the cooling heat exchanger that cools an object by absorbing heat.

Hereinafter, embodiments for implementing the present disclosure will be described referring to drawings. In the respective embodiments, parts corresponding to matters already described in the preceding embodiments are given reference numbers identical to reference numbers of the matters already described. The same description is therefore omitted depending on circumstances. In the case where only a part of the configuration is described in each embodiment, the other embodiments described above can be applied to the other part of the configuration. The present disclosure is not limited to combinations of embodiments which combine parts that are explicitly described as being combinable. As long as no problem is present, the various embodiments may be partially combined with each other even if not explicitly described.

First Embodiment

A first embodiment will be described with reference to FIGS. 1 to 24. In the present embodiment, a refrigeration cycle device 10 is applied to a vehicle air conditioner 1 mounted on an electric vehicle that obtains a driving force for traveling from an electric motor. The vehicle air conditioner 1 has a function of adjusting the temperature of a battery 80 as well as performing the air conditioning of the vehicle cabin, which is a target space. Therefore, the vehicle air conditioner 1 can also be called an air conditioner with a battery temperature adjusting function.

The battery 80 is a secondary battery that stores electric power supplied to in-vehicle devices such as an electric motor. The battery 80 of this embodiment is a lithium-ion battery. The battery 80 is a so-called assembled battery formed by stacking plural battery cells 81 electrically connected in series or in parallel.

The output of this type of battery tends to decrease when the temperature becomes low, and the deterioration thereof easily progresses when the temperature becomes high. Therefore, the temperature of the battery needs to be maintained within an appropriate temperature range (higher than or equal to 15° C. and lower than or equal to 55° C. in the present embodiment) in which the charge/discharge capacity of the battery can be fully utilized.

Therefore, in the vehicle air conditioner 1, the battery 80 can be cooled by the cold heat generated by the refrigeration cycle device 10. Therefore, the cooling target different from the air (that is, the target object from which heat is absorbed) is the battery 80 in the refrigeration cycle device 10 of the present embodiment.

The vehicle air conditioner 1 includes the refrigeration cycle device 10, an indoor air conditioning unit 30, a high temperature heat medium circuit 40, and a low temperature heat medium circuit 50, as shown in FIG. 1.

The refrigeration cycle device 10 cools air that is blown into the cabin to condition air in the cabin. Further, the high temperature heat medium circulating in the high temperature heat medium circuit 40 is heated. Further, the refrigeration cycle device 10 cools the low temperature heat medium circulating in the low temperature heat medium circuit 50 in order to cool the battery 80.

The refrigeration cycle device 10 is configured to be able to switch the refrigerant circuits for various operation modes in order to condition air in the cabin. For example, the refrigeration cycle device 10 is able to switch the refrigerant circuit between a cooling mode, a heating mode, a dehumidification heating mode, and the like. Further, the refrigeration cycle device 10 can set the operation mode in which the battery 80 is cooled or the operation mode in which the battery 80 is not cooled in each operation mode for air conditioning.

The refrigeration cycle device 10 employs an HFO-based refrigerant (specifically, R1234yf) as a refrigerant, and forms a vapor compression subcritical refrigeration cycle in which the pressure of the discharged refrigerant discharged from the compressor 11 does not exceed the critical pressure of the refrigerant. Further, a refrigerator oil for lubricating the compressor 11 is mixed in the refrigerant. A part of the refrigerator oil circulates in the cycle together with the refrigerant.

The refrigeration cycle device 10 has the compressor 11 that draws in, compresses, and discharges the refrigerant in the refrigeration cycle device 10. The compressor 11 is located in the front of the vehicle cabin and is arranged in a drive device chamber that houses an electric motor and the like. The compressor 11 is an electric compressor that rotationally drives a fixed capacity type compression mechanism having a fixed discharge capacity by the electric motor. The rotation speed (that is, refrigerant discharge capacity) of the compressor 11 is controlled by a control signal output from the controller 60 described later.

A refrigerant inlet of a water-refrigerant heat exchanger 12 is connected to a discharge port of the compressor 11. The water-refrigerant heat exchanger 12 has a refrigerant passage through which the high-pressure refrigerant discharged from the compressor 11 flows and a water passage through which the high temperature heat medium circulating in the high temperature heat medium circuit 40 flows. The water-refrigerant heat exchanger 12 is a heating heat exchanger that heats the high temperature heat medium by exchanging heat between the high pressure refrigerant flowing through the refrigerant passage and the high temperature heat medium flowing through the water passage. In other words, the water-refrigerant heat exchanger 12 is a radiator that dissipates the heat of the refrigerant discharged from the compressor 11 to the high temperature heat medium.

The outlet of the refrigerant passage of the water-refrigerant heat exchanger 12 is connected to an inlet of the first three-way joint 13a having three ports communicating with each other. The three-way joint may be formed by joining multiple pipes to each other, or may be formed by providing multiple refrigerant passages in a metal block or a resin block.

The refrigeration cycle device 10 includes second to sixth three-way joints 13b to 13f, as will be described later. The basic configuration of the second to sixth three-way joint 13b to 13f is similar to that of the first three-way joint 13a.

The inlet of the air-heating expansion valve 14a is connected to one outlet of the first three-way joint 13a. One inlet of the second three-way joint 13b is connected to the other outlet of the first three-way joint 13a via a bypass passage 22a. A dehumidification on-off valve 15a is arranged in the bypass passage 22a.

The dehumidification on-off valve 15a is a solenoid valve that opens and closes a refrigerant passage that connects the other outlet of the first three-way joint 13a to one inlet of the second three-way joint 13b. The dehumidification on-off valve 15a is a bypass opening/closing portion that opens or closes the bypass passage 22a.

Further, the refrigeration cycle device 10 includes an air-heating on-off valve 15b, as described later. The basic configuration of the air-heating on-off valve 15b is the same as that of the dehumidification on-off valve 15a.

The dehumidification on-off valve 15a and the air-heating on-off valve 15b can switch the refrigerant circuit in each operation mode by opening and closing the refrigerant passage. Therefore, the dehumidification on-off valve 15a and the air-heating on-off valve 15b correspond to a refrigerant circuit switching unit that switches the refrigerant circuit of the cycle. The operations of the dehumidification on-off valve 15a and the air-heating on-off valve 15b are controlled by the control voltage output from the controller 60.

The air-heating expansion valve 14a is a heating decompression unit that decompresses the high-pressure refrigerant flowing out of the refrigerant passage of the water-refrigerant heat exchanger 12, at least in the operation mode for heating the cabin, and that controls the flow rate (mass flow rate) of the refrigerant to the downstream side. The air-heating expansion valve 14a is an electric variable throttling mechanism including a valve body whose throttle opening can be changed and an electric actuator which changes the opening of the valve body.

Further, the refrigeration cycle device 10 includes an air-cooling expansion valve 14b and a cooler-unit expansion valve 14c, as described later. The basic configurations of the air-cooling expansion valve 14b and the cooler-unit expansion valve 14c are similar to that of the air-heating expansion valve 14a.

The air-heating expansion valve 14a, the air-cooling expansion valve 14b, and the cooler-unit expansion valve 14c have a fully open function and a fully closed function.

The fully open function sets the valve opening as full open to provide a simple refrigerant passage without flow rate adjusting action and refrigerant decompressing action. The fully closed function closes the refrigerant passage by setting the valve opening as fully closed.

The air-heating expansion valve 14a, the air-cooling expansion valve 14b, and the cooler-unit expansion valve 14c can switch the refrigerant circuit in each operation mode by the fully open function and the fully closed function.

Therefore, the air-heating expansion valve 14a, the air-cooling expansion valve 14b, and the cooler-unit expansion valve 14c of the present embodiment also have a function as a refrigerant circuit switching unit. The operations of the air-heating expansion valve 14a, the air-cooling expansion valve 14b, and the cooler-unit expansion valve 14c are controlled by a control signal (control pulse) output from the controller 60.

The refrigerant inlet of the outdoor heat exchanger 16 is connected to the outlet of the air-heating expansion valve 14a. The outdoor heat exchanger 16 causes heat exchange between the refrigerant flowing out from the air-heating expansion valve 14a and the outside air blown by a cooling fan (not shown). The outdoor heat exchanger 16 functions as a radiator that dissipates the refrigerant discharged from the compressor 11 or an air conditioning heat exchanger that absorbs heat from the air to evaporate the refrigerant depending on the operation mode.

The outdoor heat exchanger 16 is arranged on the front side inside the drive device chamber. Therefore, wind caused when the vehicle travels can be applied to the outdoor heat exchanger 16.

The first refrigerant passage 16a is a refrigerant passage that guides the refrigerant flowing out of the water-refrigerant heat exchanger 12 to the inlet side of the outdoor heat exchanger 16, and corresponds to an air-conditioning passage. The air-heating expansion valve 14a is an air-conditioning decompression unit that adjusts the decompression amount of the refrigerant flowing into the outdoor heat exchanger 16 by adjusting the opening area of the first refrigerant passage 16a. The air-heating expansion valve 14a corresponds to a first throttle portion.

A refrigerant outlet of the outdoor heat exchanger 16 is connected to an inflow port of the third three-way joint 13c. One inlet of the fourth three-way joint 13d is connected to one outlet of the third three-way joint 13c via the heating passage 22b. The air-heating on-off valve 15b for opening and closing the refrigerant passage is arranged in the heating passage 22b.

The heating passage 22b is a second refrigerant passage that guides the refrigerant flowing out of the outdoor heat exchanger 16 to the suction side of the compressor 11. The air-heating on-off valve 15b is arranged in the heating passage 22b to open or close the refrigerant passage. The air-heating on-off valve 15b is a second refrigerant passage opening/closing portion that opens/closes the second refrigerant passage.

Another outflow port of the third three-way joint 13c is connected to another inflow port of the second three-way joint 13b. A check valve 17 is disposed in a refrigerant passage connecting the another outflow port of the third three-way joint 13c to the another inflow port of the second three-way joint 13b. The check valve 17 allows the refrigerant to flow from the third three-way joint 13c to the second three-way joint 13b, and prohibits the refrigerant from flowing from the second three-way joint 13b to the third three-way joint 13c.

An outflow port of the second three-way joint 13b is connected to an inflow port of the fifth three-way joint 13e. The inlet of the air-cooling expansion valve 14b is connected to one outlet of the fifth three-way joint 13e. The inlet of the cooler-unit expansion valve 14c is connected to the other outlet of the fifth three-way joint 13e.

The air-cooling expansion valve 14b is an air-conditioning decompression unit that decompresses the refrigerant flowing out of the outdoor heat exchanger 16 and adjusts the flow rate of the refrigerant that flows out to the downstream side, at least in the operation mode in which the cabin is cooled.

The refrigerant inlet of the indoor evaporator 18 is connected to the outlet of the air-cooling expansion valve 14b. The indoor evaporator 18 is disposed in an air conditioning case 31 of the indoor air conditioning unit 30 described later. The indoor evaporator 18 is a cooling heat exchanger that performs heat exchange between a low-pressure refrigerant decompressed by the air-cooling expansion valve 14b and air supplied from a blower 32 to evaporate the low-pressure refrigerant. The low-pressure refrigerant exhibits a heat absorbing action to cool the air. In other words, the indoor evaporator 18 is an air conditioning heat exchanger that absorbs heat from air to evaporate the refrigerant.

The refrigerant outlet of the indoor evaporator 18 is connected to one inlet of the sixth three-way joint 13f.

The cooler-unit expansion valve 14c is a cooler-unit decompression unit that decompresses the refrigerant that has flowed out of the outdoor heat exchanger 16 and adjusts the flow rate of the refrigerant that flows out to the downstream side, at least in the operation mode in which the battery 80 is cooled.

The inlet of the refrigerant passage of the chiller 19 is connected to the outlet of the cooler-unit expansion valve 14c. The chiller 19 has a refrigerant passage through which a low-pressure refrigerant whose pressure has been reduced by the cooler-unit expansion valve 14c flows, and a water passage through which a low temperature heat medium circulating in the low temperature heat medium circuit 50 flows. The chiller 19 is an evaporator unit in which the low-pressure refrigerant flowing in the refrigerant passage and the low temperature heat medium flowing in the water passage exchange heat to evaporate the low-pressure refrigerant to exert a heat absorbing effect. In other words, the chiller 19 is a cooling heat exchanger that absorbs heat from the low temperature heat medium to evaporate the refrigerant. Further, the chiller 19 is arranged in parallel with at least one of the outdoor heat exchanger 16 and the indoor evaporator 18 in the flow of the refrigerant radiated by the water-refrigerant heat exchanger 12. The other inlet of the sixth three-way joint 13f is connected to the outlet of the refrigerant passage of the chiller 19.

An outflow port of the sixth three-way joint 13f is connected to an inlet of the evaporation pressure control valve 20. The evaporation pressure control valve 20 keeps a refrigerant evaporation pressure in the indoor evaporator 18 above or at a predetermined reference pressure in order to prevent frost formation on the indoor evaporator 18. The evaporation pressure control valve 20 includes a mechanical variable throttle mechanism that increases the valve opening in response to increase in pressure of refrigerant at the outlet of the indoor evaporator 18.

As a result, the evaporation pressure control valve 20 maintains the refrigerant evaporation temperature in the indoor evaporator 18 at or above a frost suppression temperature (1° C. in the present embodiment) capable of suppressing frost formation in the indoor evaporator 18.

Further, the evaporation pressure control valve 20 of the present embodiment is arranged downstream of the sixth three-way joint 13f, which is the merging portion. Therefore, the evaporation pressure control valve 20 also maintains the refrigerant evaporation temperature in the chiller 19 at or above the frost formation suppression temperature.

An outlet of the evaporation pressure control valve 20 is connected to another inflow port of the fourth three-way joint 13d. An outlet of the fourth three-way joint 13d is connected to an inlet of the accumulator 21. The accumulator 21 is a gas-liquid separator that separates gas and liquid of the refrigerant flowing into the accumulator 21 and stores therein surplus liquid-phase refrigerant of the cycle. A gas-phase refrigerant outlet of the accumulator 21 is connected to a suction port of the compressor 11.

The third refrigerant passage 18a is a refrigerant passage that guides the refrigerant flowing out of the outdoor heat exchanger 16 to the suction side of the compressor 11 via the evaporator 18, and corresponds to an air-conditioning passage. The air-cooling expansion valve 14b is an air-conditioning decompression unit that adjusts the decompression amount of the refrigerant flowing into the evaporator 18 by adjusting the opening area of the third refrigerant passage 18a. The air-cooling expansion valve 14b corresponds to a second throttle portion.

The cooling passage 19a is a refrigerant passage that allows the refrigerant flowing between the outdoor heat exchanger 16 and the air-cooling expansion valve 14b to flow through the chiller 19 to a position between the indoor evaporator 18 and the suction side of the compressor 11 in the third refrigerant passage 18a. The cooler-unit expansion valve 14c is a cooler-unit decompression unit that adjusts the decompression amount of the refrigerant flowing into the chiller 19 by adjusting the opening area of the cooling passage 19a.

As is clear from the above description, the fifth three-way joint 13e of the present embodiment functions as a branch portion that branches the flow of the refrigerant that has flowed out of the outdoor heat exchanger 16. The sixth three-way joint 13f is a merging portion that joins the flow of the refrigerant flowing out of the indoor evaporator 18 and the flow of the refrigerant flowing out of the chiller 19 to flow to the suction side of the compressor 11.

The indoor evaporator 18 and the chiller 19 are connected to each other in parallel with respect to the refrigerant flow. Further, the bypass passage 22a guides the refrigerant flowing out of the refrigerant passage of the water-refrigerant heat exchanger 12 to the upstream side of the branch portion. The heating passage 22b guides the refrigerant flowing out of the outdoor heat exchanger 16 to the suction port of the compressor 11.

Next, the high temperature heat medium circuit 40 will be described. The high temperature heat medium circuit 40 is a heat medium circulation circuit for circulating the high temperature heat medium. As the high temperature heat medium, ethylene glycol, dimethylpolysiloxane, a solution containing a nanofluid or the like, an antifreeze liquid or the like can be adopted. In the high temperature heat medium circuit 40, the water passage of the water-refrigerant heat exchanger 12, the high temperature heat medium pump 41, the heater core 42, and the like are arranged.

The high temperature heat medium pump 41 is a water pump that pumps the high temperature heat medium to the inlet of the water passage of the water-refrigerant heat exchanger 12. The high temperature heat medium pump 41 is an electric pump whose rotation speed (that is, pressure feeding capacity) is controlled by a control voltage output from the controller 60.

The heat medium inlet of the heater core 42 is connected to the outlet of the water passage of the water-refrigerant heat exchanger 12. The heater core 42 is a heat exchanger that heats the air by exchanging heat between the high temperature heat medium heated in the water-refrigerant heat exchanger 12 and the air that has passed through the indoor evaporator 18. The heater core 42 is arranged in the air conditioning case 31 of the indoor air conditioning unit 30. A suction port of the high temperature heat medium pump 41 is connected to a heat medium outlet of the heater core 42.

Therefore, in the high temperature heat medium circuit 40, the high temperature heat medium pump 41 adjusts the flow rate of the high temperature heat medium flowing into the heater core 42 so that the heat radiation amount of the high temperature heat medium in the heater core 42 to the air can be adjusted. That is, in the high temperature heat medium circuit 40, the high temperature heat medium pump 41 can adjust the heating amount of the air in the heater core 42 by adjusting the flow rate of the high temperature heat medium flowing into the heater core 42.

That is, in the present embodiment, the water-refrigerant heat exchanger 12 and the high temperature heat medium circuit 40 constitutes a heating unit for heating the air using the refrigerant discharged from the compressor 11 as a heat source.

Next, the low temperature heat medium circuit 50 will be described. The low temperature heat medium circuit 50 is a heat medium circulation circuit for circulating the low temperature heat medium. As the low temperature heat medium, the same fluid as the high temperature heat medium can be adopted. In the low temperature heat medium circuit 50, a water passage of the chiller 19, a low temperature heat medium pump 51, a cooling heat exchange section 52, a three-way valve 53, a low temperature radiator 54 and the like are arranged.

The low temperature heat medium pump 51 is a water pump that pumps the low temperature heat medium to the inlet of the water passage of the chiller 19. The basic configuration of the low temperature heat medium pump 51 is the same as that of the high temperature heat medium pump 41.

The inlet of the cooling heat exchange section 52 is connected to the outlet of the water passage of the chiller 19. The cooling heat exchange section 52 has plural heat medium passages made of metal and arranged so as to contact the battery cells 81 of the battery 80. The cooling heat exchange section 52 is a heat exchange unit that cools the battery 80 by exchanging heat between the low temperature heat medium flowing through the heat medium passage and the battery cells 81.

The cooling heat exchange section 52 may be formed by disposing the heat medium passage between the battery cells 81 stacked with each other. The cooling heat exchange section 52 may be formed integrally with the battery 80. For example, the heat medium passage may be provided in a dedicated case for housing the battery cells 81 stacked with each other, so as to be integrally formed with the battery 80.

The inlet of the three-way valve 53 is connected to the outlet of the cooling heat exchange section 52. The three-way valve 53 is an electric three-way flow rate control valve that has one inflow port and two outflow ports and is capable of continuously adjusting the passage area ratio of the two outflow ports. The operation of the three-way valve 53 is controlled by a control signal output from the controller 60.

The heat medium inlet of the low temperature radiator 54 is connected to one outlet of the three-way valve 53. The suction port of the low temperature heat medium pump 51 is connected to the other outlet of the three-way valve 53 via the radiator bypass passage 53a.

The radiator bypass passage 53a is a heat medium passage through which the low temperature heat medium flowing out of the cooling heat exchange section 52 bypasses the low temperature radiator 54.

Therefore, in the low temperature heat medium circuit 50, the three-way valve 53 continuously adjusts the flow rate of the low temperature heat medium flowing into the low temperature radiator 54, of the low temperature heat medium flowing out from the cooling heat exchange section 52.

The low temperature radiator 54 performs heat exchange between the low temperature heat medium flowing out from the cooling heat exchange section 52 and the outside air blown by an outside air fan (not shown), and radiates the heat of the low temperature heat medium to the outside air.

The low temperature radiator 54 is positioned at the front side in a drive device chamber. Therefore, the wind can be applied to the low temperature radiator 54 when the vehicle is traveling. Therefore, the low temperature radiator 54 may be integrally formed with the outdoor heat exchanger 16 and the like. The suction port of the low temperature heat medium pump 51 is connected to the heat medium outlet of the low temperature radiator 54.

Therefore, in the low temperature heat medium circuit 50, the low temperature heat medium pump 51 adjusts the flow rate of the low temperature heat medium flowing into the cooling heat exchange section 52. Thus, the amount of heat absorbed from the battery 80 by the low temperature heat medium in the cooling heat exchange section 52 can be adjusted. That is, in the present embodiment, the chiller 19 and the low temperature heat medium circuit 50 configure a cooler unit that evaporates the refrigerant flowing out from the cooler-unit expansion valve 14c to cool the battery 80.

Next, the indoor air conditioning unit 30 will be described. The indoor air conditioning unit 30 supplies air which has been conditioned in temperature by the refrigeration cycle device 10 to the cabin. The indoor air conditioning unit 30 is disposed inside an instrument panel at the foremost part inside the cabin.

As shown in FIG. 1, the indoor air conditioning unit 30 houses the blower 32, the indoor evaporator 18, the heater core 42, and the like in an air passage formed in the air conditioning case 31 forming an outer shell thereof.

The air conditioning case 31 has the air passage for air supplied into the cabin. The air conditioning case 31 is formed of a resin (for example, polypropylene) having a certain degree of elasticity and also excellent in strength.

An inside-outside air switch device 33 is disposed at the most upstream side of the air conditioning case 31 in the air flow. The inside-outside air switch device 33 switchingly introduces an inside air (air inside the cabin) and an outside air (air outside the cabin) into the air conditioning case 31.

The inside-outside air switch device 33 continuously adjusts an opening area of an inside air introduction port through which the inside air is introduced into the air conditioning case 31 and an opening area of an outside air introduction port through which the outside air is introduced into the air conditioning case 31 by using an inside-outside air switch door to change an introduction ratio of the volume of the inside air to the volume of the outside air. The inside-outside air switch door is driven by an electric actuator for the inside-outside air switch door. Operation of the electric actuator is controlled in accordance with a control signal output from the controller 60.

The blower 32 is disposed downstream of the inside-outside air switch device 33 in flow of the air. The blower 32 blows air sucked through the inside-outside air switch device 33 toward the cabin. The blower 32 is an electric blower in which a centrifugal multi-blade fan is driven by an electric motor. A rotation speed (that is, an air blowing capacity) of the blower 32 is controlled by a control voltage output from the controller 60.

The indoor evaporator 18 and the heater core 42 are disposed in this order downstream of the blower 32 in flow of the air. In other words, the indoor evaporator 18 is disposed upstream of the heater core 42 in flow of the air.

In the air conditioning case 31, a cold air bypass passage 35 is provided in which the air that has passed through the indoor evaporator 18 bypasses the heater core 42. An air mix door 34 is disposed in the air conditioning case 31 downstream of the indoor evaporator 18 in flow of the air and upstream of the heater core 42 in flow of the air.

The air mix door 34 is an air volume ratio control unit which controls a ratio of a volume of the air passing through the heater core 42 to a volume of the air passing through the cold air bypass passage 35 after passing through the indoor evaporator 18. The air mix door 34 is driven by an electric actuator for the air mix door. Operation of the electric actuator is controlled in accordance with a control signal output from the controller 60.

A mixing space is arranged downstream of the heater core 42 and the cold air bypass passage 35 in the air conditioning case 31 in the flow of air. The mixing space is a space for mixing the air heated by the heater core 42 and the air that has passed through the cold air bypass passage 35 without being heated.

Furthermore, the air conditioning case 31 has an opening hole for blowing out the air mixed in the mixing space (that is, the conditioned air) into the cabin that is a target space, at the downstream side in the air flow.

The opening hole includes a face opening hole, a foot opening hole, and a defroster opening hole (any of them is not shown). The face opening hole is an opening hole for blowing the air toward an upper body of an occupant in the cabin. The foot opening hole is an opening hole for blowing the air toward a foot of the occupant. The defroster opening hole is an opening hole for blowing the air toward an inner surface of a windshield of the vehicle.

The face opening hole, the foot opening hole, and the defroster opening hole are respectively connected to a face blowing port, a foot blowing port, and a defroster blowing port (not shown) provided in the cabin through a duct defining an air passage.

The air mix door 34 adjusts an air volume ratio between an air volume passing through the heater core 42 and an air volume passing through the cold air bypass passage 35, thereby adjusting the temperature of the conditioned air mixed in the mixing space. As a result, the temperature of the air (conditioned air) blown from each of the blowing ports into the cabin can be adjusted.

Further, a face door, a foot door, and a defroster door (none of which are shown) are arranged upstream of the face opening hole, the foot opening hole, and the defroster opening hole in the air flow respectively. The face door adjusts an opening area of the face opening hole. The foot door adjusts an opening area of the foot opening hole. The defroster door adjusts an opening area of the defroster opening hole.

The face door, the foot door, and the defroster door form a blowout mode switching unit for switching the blowout modes. The doors are connected to an electric actuator for driving the blowout mode door through a link mechanism or the like, and are rotationally operated in conjunction with the actuator. Operation of the electric actuator is also controlled in accordance with a control signal output from the controller 60.

The blowout mode switched by the mode switching unit includes a face mode, a bi-level mode, and a foot mode, for example.

The face mode is a blowout mode in which the face opening is fully opened to blow out air therefrom toward the upper body of an occupant in the cabin. The bi-level mode is a blowout mode in which both the face opening and the foot opening are opened to blow out air therefrom toward the upper body and a foot area of the occupant in the cabin. In the foot mode, the foot opening is fully opened and the defroster blowing port is open by a small opening degree so that the air is blown mainly through the foot opening.

Further, the occupant can manually switch the blowout mode by operating a switch provided on the operation panel 70 to set the defroster mode. The defroster mode is a blowout mode in which the defroster opening is fully opened so that air is blown toward an inner face of the front windshield through the defroster opening.

Next, an electric control unit of the present embodiment will be described. The controller 60 includes a known microcomputer including CPU, ROM, RAM and the like, and peripheral circuits. The controller 60 performs various calculations and processes based on an air conditioning control program stored in the ROM, and controls the operations of the various control target devices 11, 14a-14c, 15a, 15b, 32, 41, 51, 53, and so on connected to an output of the controller 60.

Figure 2:
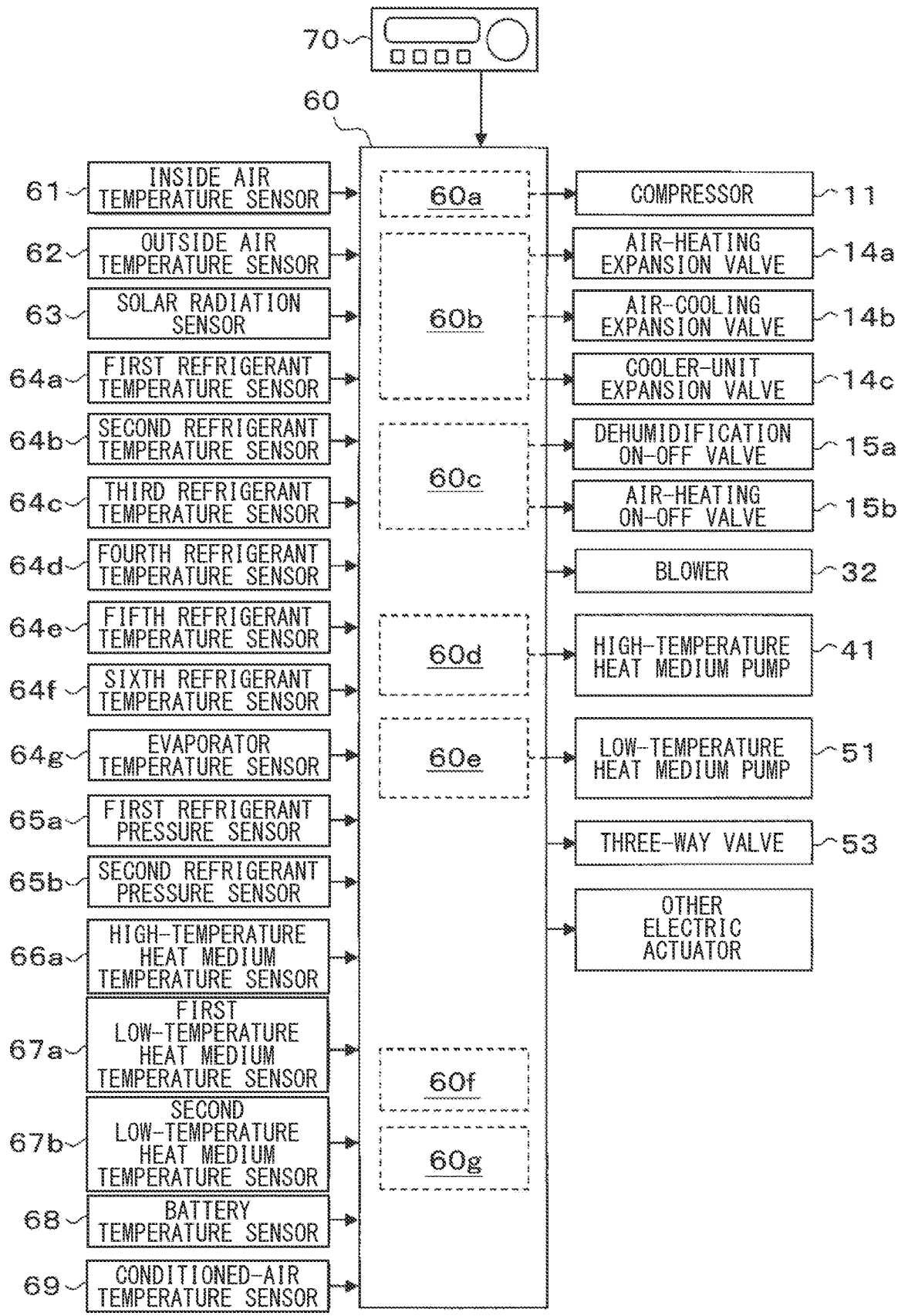
FIG. 2 is a block diagram showing an electric control unit of the vehicle air conditioner of the first embodiment.

As shown in FIG. 2, the input side of the controller 60 is connected with the inside air temperature sensor 61, the outside air temperature sensor 62, the solar radiation sensor 63, the first refrigerant temperature sensor 64a to the sixth refrigerant temperature sensor 64f, the evaporator temperature sensor 64g, the first refrigerant pressure sensor 65a, the second refrigerant pressure sensor 65b, the high temperature heat medium temperature sensor 66a, the first low temperature heat medium temperature sensor 67a, the second low temperature heat medium temperature sensor 67b, the battery temperature sensor 68, the conditioned air temperature sensor 69, and the like. The detection signals of the sensors are input to the controller 60.

The inside air temperature sensor 61 is an inside air temperature detector that detects a cabin interior temperature (inside air temperature) Tr. The outside air temperature sensor 62 is an outside air temperature detector that detects a cabin exterior temperature (outside air temperature) Tam. The solar radiation sensor 63 is a solar radiation detector that detects the solar radiation amount Ts that is emitted into the cabin.

The first refrigerant temperature sensor 64a is a discharged refrigerant temperature detector that detects the temperature T1 of the refrigerant discharged from the compressor 11. The second refrigerant temperature sensor 64b is a second refrigerant temperature detector that detects the temperature T2 of the refrigerant that has flowed out of the refrigerant passage of the water-refrigerant heat exchanger 12. The third refrigerant temperature sensor 64c is a third refrigerant temperature detector that detects the temperature T3 of the refrigerant that has flowed out of the outdoor heat exchanger 16.

The fourth refrigerant temperature sensor 64d is a fourth refrigerant temperature detector that detects the temperature T4 of the refrigerant that has flowed out of the indoor evaporator 18. The fifth refrigerant temperature sensor 64e is a fifth refrigerant temperature detector that detects the temperature T5 of the refrigerant flowing out from the refrigerant passage of the chiller 19. The sixth refrigerant temperature sensor 64f is a suction refrigerant temperature detector that detects the temperature T6 of the refrigerant sucked into the compressor 11, and corresponds to a suction refrigerant detector.

The evaporator temperature sensor 64g is an evaporator temperature detector that detects a refrigerant evaporation temperature (evaporator temperature) Tefin in the indoor evaporator 18. The evaporator temperature sensor 64g of the present embodiment specifically detects the temperature of the heat exchange fin of the indoor evaporator 18.

The first refrigerant pressure sensor 65a is a first refrigerant pressure detector that detects the pressure P1 of the refrigerant flowing out of the refrigerant passage of the water-refrigerant heat exchanger 12. The second refrigerant pressure sensor 65b is a second refrigerant pressure detector that detects the pressure P2 of the refrigerant flowing out from the refrigerant passage of the chiller 19.

The high temperature heat medium temperature sensor 66a is a high temperature heat medium temperature detector that detects the high temperature heat medium temperature TWH, which is the temperature of the high temperature heat medium flowing out from the water passage of the water-refrigerant heat exchanger 12.

The first low temperature heat medium temperature sensor 67a is a first low temperature heat medium temperature detector that detects a first low temperature heat medium temperature TWL1 that is the temperature of the low temperature heat medium flowing out from the water passage of the chiller 19. The second low temperature heat medium temperature sensor 67b is a second low temperature heat medium temperature detector that detects a second low temperature heat medium temperature TWL2 that is the temperature of the low temperature heat medium flowing out from the cooling heat exchange section 52.

The battery temperature sensor 68 is a battery temperature detector that detects the battery temperature TB (that is, the temperature of the battery 80). The battery temperature sensor 68 of the present embodiment has plural temperature sensors and detects temperatures at plural locations of the battery 80. Therefore, the controller 60 can also detect the temperature difference between the respective locations of the battery 80. Further, as the battery temperature TB, the average value of the detection values of the temperature sensors is adopted.

The conditioned air temperature sensor 69 is a conditioned-air temperature detector that detects an air temperature TAV sent from the mixing space into the cabin.

Further, as shown in FIG. 2, the operation panel 70 arranged near the instrument panel in the front part of the cabin is connected to the input side of the controller 60. The operation panel 70 includes various operation switches, and operation signals are input to the controller 60 through the operation switches.

The operation switches provided on the operation panel 70 are, specifically, an auto switch, an air conditioner switch, an air volume setting switch, a temperature setting switch, a blowout mode changeover switch, and the like.

The auto switch is an operation unit that sets or cancels automatic control operation of the vehicle air conditioner. The air conditioner switch is an operation unit that requests the indoor evaporator 18 to cool the air. The air volume setting switch is an operation unit for manually setting the air volume of the blower 32. The temperature setting switch is an operation unit that sets the target temperature Tset in the cabin. The blowout mode changeover switch is an operation unit for manually setting the blowout mode.

The controller 60 of the present embodiment is integrally configured with a control unit that controls various control target devices connected to the output side thereof. Configurations (hardware and software) of the controller 60, which control operations of the respective control target devices, are the controllers controlling the operations of the corresponding control target devices.

For example, a part of the controller 60 that controls the refrigerant discharge capacity of the compressor 11 (specifically, the rotation speed of the compressor 11) constitutes a compressor control unit 60a. Further, the configuration that controls the operations of the air-heating expansion valve 14a, the air-cooling expansion valve 14b, and the cooler-unit expansion valve 14c constitutes an expansion valve control unit 60b. The configuration for controlling the operation of the dehumidification on-off valve 15a and the air-heating on-off valve 15b constitutes a refrigerant circuit switching control unit 60c.

The configuration for controlling the capability of the high temperature heat medium pump 41 pumping the high temperature heat medium constitutes a high temperature heat medium pump control unit 60d. The configuration for controlling the capability of the low temperature heat medium pump 51 pumping the low temperature heat medium constitutes a low temperature heat medium pump control unit 60e.

The controller 60 has a refrigerant flow rate calculation unit 60f for calculating the flow rate V1 of the refrigerant flowing into the chiller 19. The refrigerant flow rate detection unit 60f calculates the flow rate V2 of the refrigerant discharged from the compressor 11 based on the temperature T6 of the refrigerant drawn into the compressor 11 detected by the sixth refrigerant temperature sensor 64f and the rotation speed of the compressor 11. Further, the refrigerant flow rate detection unit 60f calculates an opening area ratio of an opening area of the cooling passage 19a to an opening area of the refrigerant passage in which the refrigerant flow is parallel to the cooling passage 19a of the first refrigerant passage 16a and the third refrigerant passage 18a. Then, the refrigerant flow rate detection unit 60f calculates the flow rate V1 of the refrigerant flowing into the chiller 19 based on the flow rate V2 of the refrigerant discharged from the compressor 11 and the opening area ratio. Therefore, the refrigerant flow rate calculation unit 60f of the present embodiment corresponds to a refrigerant flow rate detector.

The controller 60 has a superheat degree calculation unit 60g for calculating the superheat degree SHC of the refrigerant flowing out of the refrigerant passage of the chiller 19. The superheat degree calculation unit 60g calculates the superheat degree SHC of the refrigerant flowing out of the refrigerant passage of the chiller 19 based on the temperature T5 detected by the fifth refrigerant temperature sensor 64e and the pressure P2 detected by the second refrigerant pressure sensor 65b. Therefore, the superheat degree calculation unit 60g of the present embodiment corresponds to a superheat degree detector.

Operations by the above configuration according to the present embodiment will be described. As described above, the vehicle air conditioner 1 of the present embodiment not only has the function of conditioning air for the cabin, but also has the function of adjusting the temperature of the battery 80. Therefore, in the refrigeration cycle device 10, the refrigerant circuit can be switched to perform operations in the following 11 kinds of operation modes.

(1) Air-cooling mode: The air-cooling mode is an operation mode in which the air in the cabin is cooled by cooling air to be and blown into the cabin without cooling the battery 80.

(2) Series dehumidification heating mode: In the series dehumidification heating mode, air in the cabin is dehumidified and heated by reheating the air that has been cooled and dehumidified without cooling the battery 80.

(3) Parallel dehumidification heating mode: In the parallel dehumidification heating mode, air in the cabin is dehumidified and heated by reheating the air that has been cooled and dehumidified with a higher heating capacity than the series dehumidification heating mode without cooling the battery 80.

(4) Heating mode: The heating mode is an operation mode in which the air in the cabin is heated by heating the air to be blown into the cabin without cooling the battery 80.

(5) Air-cooling cooler-unit mode: The air-cooling cooler-unit mode is an operation mode in which the battery 80 is cooled, and the air is cooled and blown out into the cabin to cool the cabin.

(6) Series dehumidification heating cooler-unit mode: In the series dehumidification heating cooler-unit mode, the battery 80 is cooled, and the cooled and dehumidified air is reheated and blown into the cabin to dehumidify and heat the cabin.

(7) Parallel dehumidification heating cooler-unit mode: In the parallel dehumidification heating cooler-unit mode, the battery 80 is cooled, and the cooled and dehumidified air is reheated with a heating capacity higher than that of the series dehumidification heating cooler-unit mode.

(8) Heating cooler-unit mode: The heating cooler-unit mode is an operation mode in which the battery 80 is cooled and the air is heated and blown into the cabin to heat the cabin.

(9) Heating series cooler-unit mode: In the heating series cooler-unit mode, the battery 80 is cooled, and the air is heated with a heating capacity higher than that in the heating cooler-unit mode and blown into the cabin to heat the cabin.

(10) Heating parallel cooler-unit mode: In the heating parallel cooler-unit mode, the battery 80 is cooled, and the air is heated for the cabin by heating the air with a heating capacity higher than that of the heating series cooler-unit mode and blown into the cabin.

(11) Cooler-unit mode: The cooler-unit mode is an operation mode in which the battery 80 is cooled without conditioning air for the cabin.

The operation mode is changed by executing the air-conditioning control program. The air conditioning control program is executed when an automatic switch of the operation panel 70 is turned on by an occupant to set automatic control of the cabin. The air conditioning control program will be described with reference to FIGS. 3 to 24. Further, each control step shown in the flowchart of FIG. 3 and the like is a function realizing unit in the controller 60.

Figure 3:
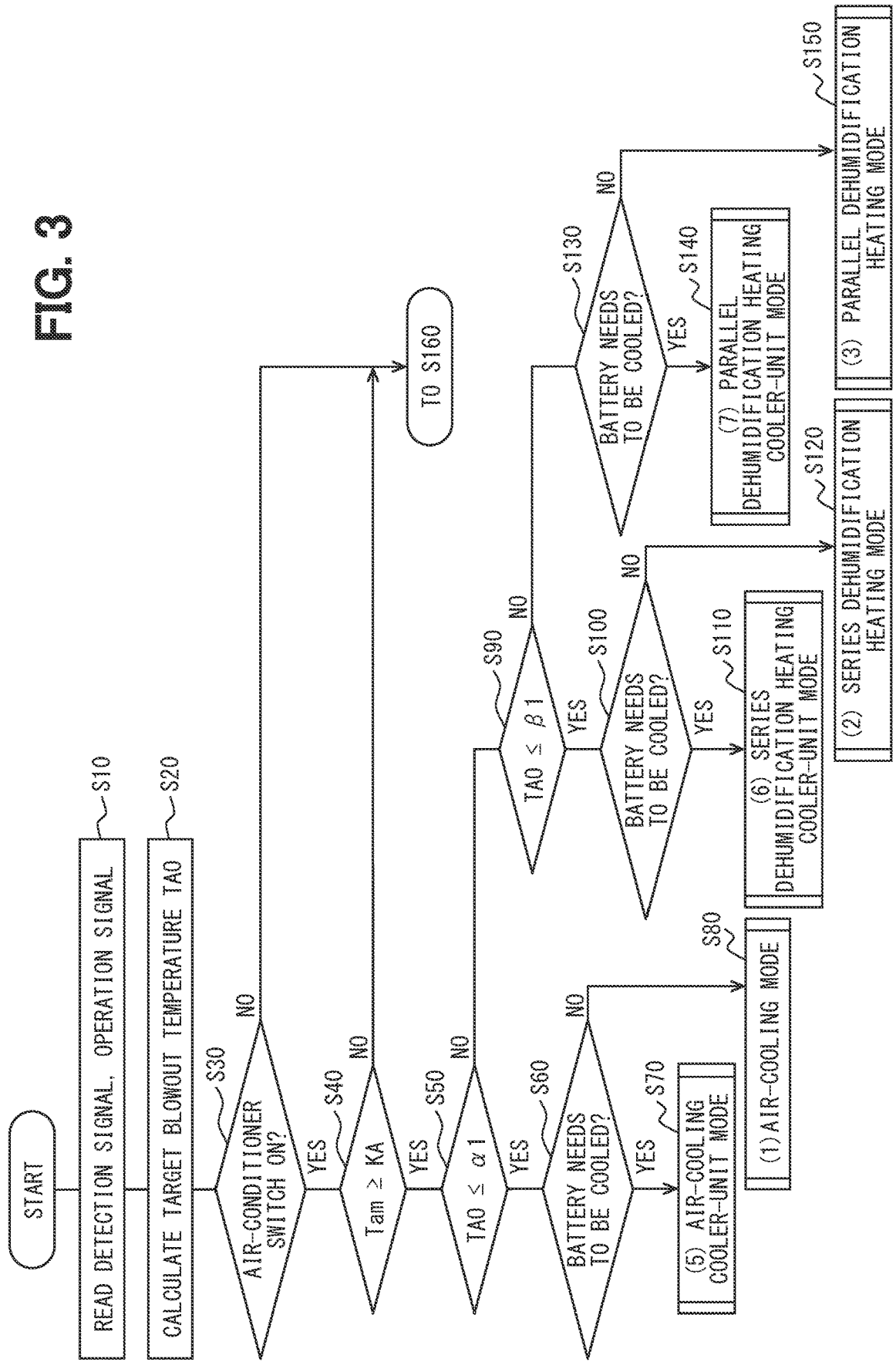
FIG. 3 is a flowchart showing a part of control processing of an air conditioning control program of the first embodiment.

First, in step S10 of FIG. 3, the detection signals of the sensors and the operation signal of the operation panel 70 are read. In the following step S20, the target blowout temperature TAO, which is the target temperature of the air blown into the cabin, is determined based on the detection signals and the operation signal read in step S10. Therefore, step S20 is a target blowout temperature determination unit.

Specifically, the target blowout temperature TAO is calculated by the following formula F1.

$$TAO = K_{set} \times T_{set} - K_r \times T_r - K_{am} \times T_{am} - K_s \times T_s + C \quad \text{(F1)}$$

Note that Tset is a cabin temperature set by the temperature setting switch. Tr is the cabin inside temperature detected by the inside air sensor. Tam is the cabin outside temperature detected by the outside air sensor. Ts is a solar radiation amount detected by the solar radiation sensor. Kset, Kr, Kam, and Ks are control gains, and C is a constant for correction.

Next, in step S30, it is determined whether the air conditioner switch is turned on. The fact that the air conditioner switch is turned on means that the occupant has requested cooling or dehumidification of the cabin. In other words, turning on the air conditioner switch means that the indoor evaporator 18 is required to cool the air.

When it is determined in step S30 that the air conditioner switch is turned on, the process proceeds to step S40. When it is determined in step S30 that the air conditioner switch is not turned on, the process proceeds to step S160.

In step S40, it is determined whether the outside air temperature Tam is equal to or higher than a predetermined reference outside air temperature KA (0° C. in this embodiment). The reference outside air temperature KA is set so that cooling the air by the indoor evaporator 18 is effective for cooling or dehumidifying the target space to be conditioned.

More specifically, in the present embodiment, in order to suppress frost formation on the indoor evaporator 18, the evaporation pressure control valve 20 keeps the refrigerant evaporation temperature in the indoor evaporator 18 at or above a frost formation suppression temperature (1° C. in the present embodiment). Therefore, the indoor evaporator 18 cannot cool the air to a temperature lower than the frost formation suppression temperature.

That is, when the temperature of the air flowing into the indoor evaporator 18 is lower than the frost formation suppression temperature, it is not effective to cool the air by the indoor evaporator 18. Therefore, the reference outside air temperature KA is set to a value lower than the frost formation suppression temperature. When the outside air temperature Tam is lower than the reference outside air temperature KA, the indoor evaporator 18 does not cool the air.

When it is determined in step S40 that the outside air temperature Tam is equal to or higher than the reference outside air temperature KA, the process proceeds to step S50. When it is determined in step S40 that the outside air temperature Tam is not equal to or higher than the reference outside air temperature KA, the process proceeds to step S160.

Figure 5:
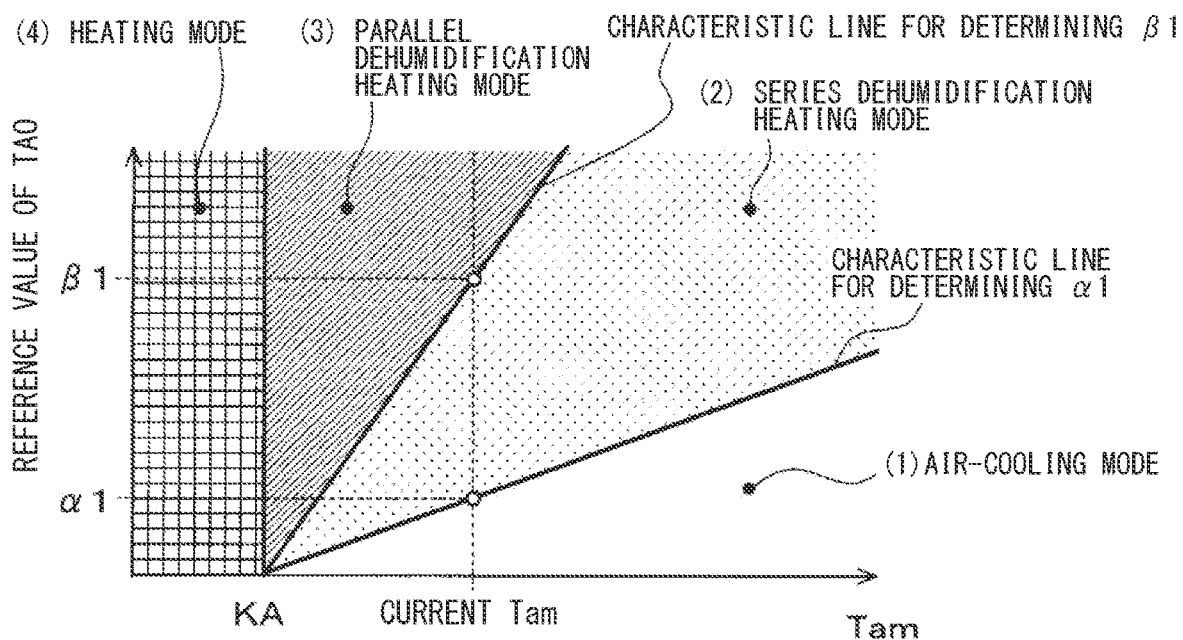
FIG. 5 is a control characteristic diagram for switching the operation mode of the air conditioning control program of the first embodiment.

In step S50, it is determined whether the target blowout temperature TAO is equal to or lower than a cooling reference temperature $\alpha 1$. The cooling reference temperature $\alpha 1$ is determined based on the outside air temperature Tam by referring to a control map stored in advance in the controller 60. In the present embodiment, as shown in FIG. 5, the cooling reference temperature $\alpha 1$ is determined to be a low value as the outside air temperature Tam decreases.

When it is determined in step S50 that the target blowout temperature TAO is equal to or lower than the cooling reference temperature $\alpha 1$, the process proceeds to step S60. When it is determined in step S50 that the target blowout temperature TAO is not lower than or equal to the cooling reference temperature $\alpha 1$, the process proceeds to step S90.

In step S60, it is determined whether the battery 80 needs to be cooled. Specifically, in the present embodiment, the battery 80 is to be cooled when the battery temperature TB detected by the battery temperature sensor 68 is equal to or higher than a predetermined reference cooling temperature KTB (35° C. in the present embodiment). When the battery temperature TB is lower than the reference cooling temperature KTB, it is determined that the battery 80 does not need to be cooled.

When it is determined in step S60 that the battery 80 needs to be cooled, the process proceeds to step S70, and (5) Air-cooling cooler-unit mode is selected as the operation mode. When it is determined in step S60 that the battery 80 does not need to be cooled, the process proceeds to step S80, and (1) Air-cooling mode is selected as the operation mode.

In step S90, it is determined whether the target blowout temperature TAO is equal to or lower than the dehumidification reference temperature $\beta 1$. The dehumidification reference temperature $\beta 1$ is determined based on the outside air temperature Tam by referring to a control map stored in advance in the controller 60.

In the present embodiment, as shown in FIG. 5, similarly to the cooling reference temperature $\alpha 1$, the dehumidification reference temperature $\beta 1$ is determined to be a low value as the outside air temperature Tam decreases. Further, the dehumidification reference temperature $\beta 1$ is determined to be a value higher than the cooling reference temperature $\alpha 1$.

When it is determined in step S90 that the target blowout temperature TAO is lower than or equal to the dehumidification reference temperature $\beta 1$, the process proceeds to step S100. When it is determined in step S90 that the target blowout temperature TAO is not lower than or equal to the dehumidification reference temperature $\beta 1$, the process proceeds to step S130.

In step S100, as in step S60, it is determined whether the battery 80 needs to be cooled.

When it is determined in step S100 that the battery 80 needs to be cooled, the process proceeds to step S110, and (6) Series dehumidification heating cooler-unit mode is selected as the operation mode of the refrigeration cycle device 10. When it is determined in step S100 that the battery 80 does not need to be cooled, the process proceeds to step S120, and (2) Series dehumidification heating mode is selected as the operation mode.

In step S130, as in step S60, it is determined whether the battery 80 needs to be cooled.

When it is determined in step S130 that the battery 80 needs to be cooled, the process proceeds to step S140, and (7) Parallel dehumidification heating cooler-unit mode is selected as the operation mode of the refrigeration cycle device 10. When it is determined in step S100 that the battery 80 does not need to be cooled, the process proceeds to step S150, and (3) Parallel dehumidification heating mode is selected as the operation mode.

Figure 4:
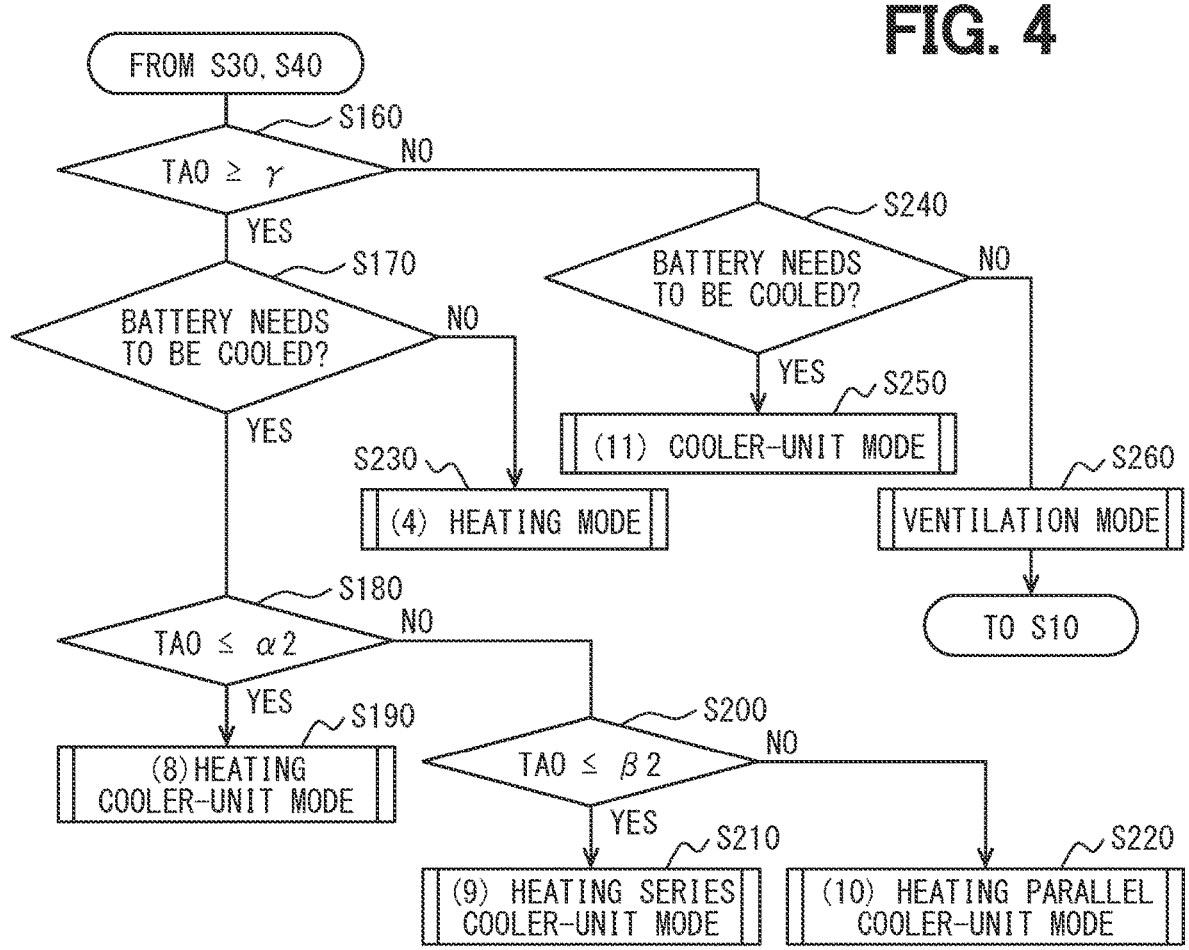
FIG. 4 is a flowchart showing another part of the control processing of the air conditioning control program of the first embodiment.

Subsequently, a case where the process proceeds from step S30 or step S40 to step S160 will be described. When the process proceeds from step S30 or step S40 to step S160, it is determined that cooling the air by the indoor evaporator 18 is not effective. In step S160, as shown in FIG. 4, it is determined whether the target blowout temperature TAO is equal to or higher than the heating reference temperature $\gamma$.

Figure 6:
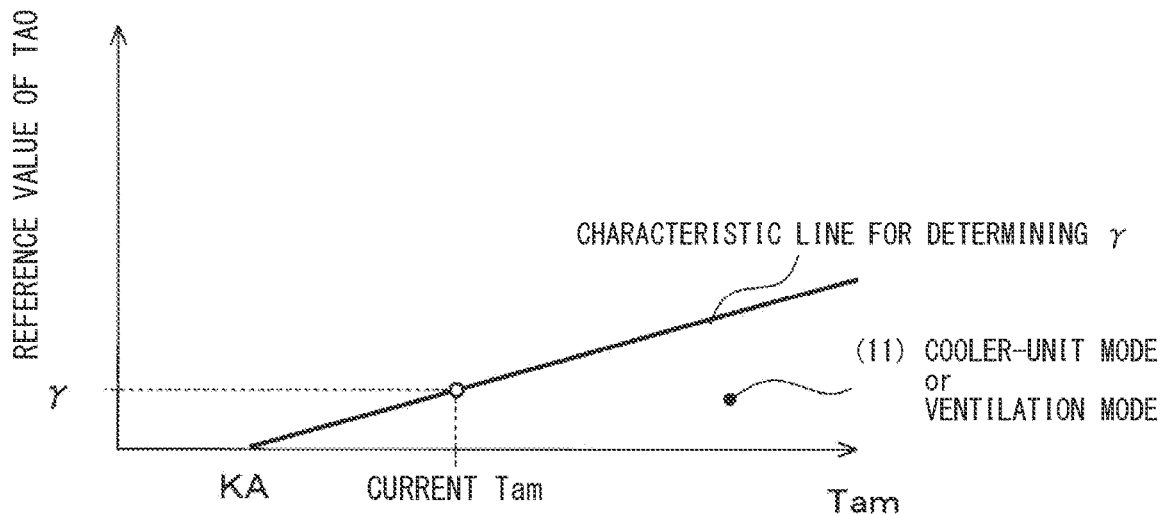
FIG. 6 is another control characteristic diagram for switching the operation mode of the air conditioning control program of the first embodiment.

The heating reference temperature $\gamma$ is determined based on the outside air temperature Tam by referring to a control map stored in advance in the controller 60. In the present embodiment, as shown in FIG. 6, the heating reference temperature $\gamma$ is determined to have a low value as the outside air temperature Tam decreases. The heating reference temperature $\gamma$ is set so that heating the air by the heater core 42 is effective for heating the target space.

When it is determined in step S160 that the target blowout temperature TAO is equal to or higher than the heating reference temperature γ, it is a case where the air needs to be heated by the heater core 42, and the process proceeds to step S170. When it is determined in step S160 that the target blowout temperature TAO is not equal to or higher than the heating reference temperature γ, it is not necessary to heat the air by the heater core 42, and the process proceeds to step S240.

In step S170, similarly to step S60, it is determined whether the battery 80 needs to be cooled.

When it is determined in step S170 that the battery 80 needs to be cooled, the process proceeds to step S180. When it is determined in step S170 that the battery 80 does not need to be cooled, the process proceeds to step S230, and (4) Heating mode is selected as the operation mode.

When it is determined in step S170 that the battery 80 needs to be cooled and the process proceeds to step S180, it is necessary to perform both heating of the cabin and cooling of the battery 80. Therefore, in the refrigeration cycle device 10, it is need to appropriately control the heat dissipation amount of the refrigerant radiated to the high temperature heat medium in the water-refrigerant heat exchanger 12 and the heat absorption amount of the refrigerant absorbing from the low temperature heat medium in the chiller 19.

Therefore, in the refrigeration cycle device 10 of the present embodiment, when it is necessary to both heat the cabin and cool the battery 80, the operation mode is switched as shown in steps S180 to S220 of FIG. 4. Specifically, the operation mode is set by the refrigeration cycle device 10 of the present embodiment among three modes such as (8) Heating cooler-unit mode, (9) Heating series cooler-unit mode, and (10) Heating parallel cooler-unit mode.

First, in step S180, it is determined whether the target blowout temperature TAO is equal to or lower than the first cooling reference temperature α2. The first cooling reference temperature α2 is determined based on the outside air temperature Tam with reference to a control map stored in advance in the controller 60.

Figure 7:
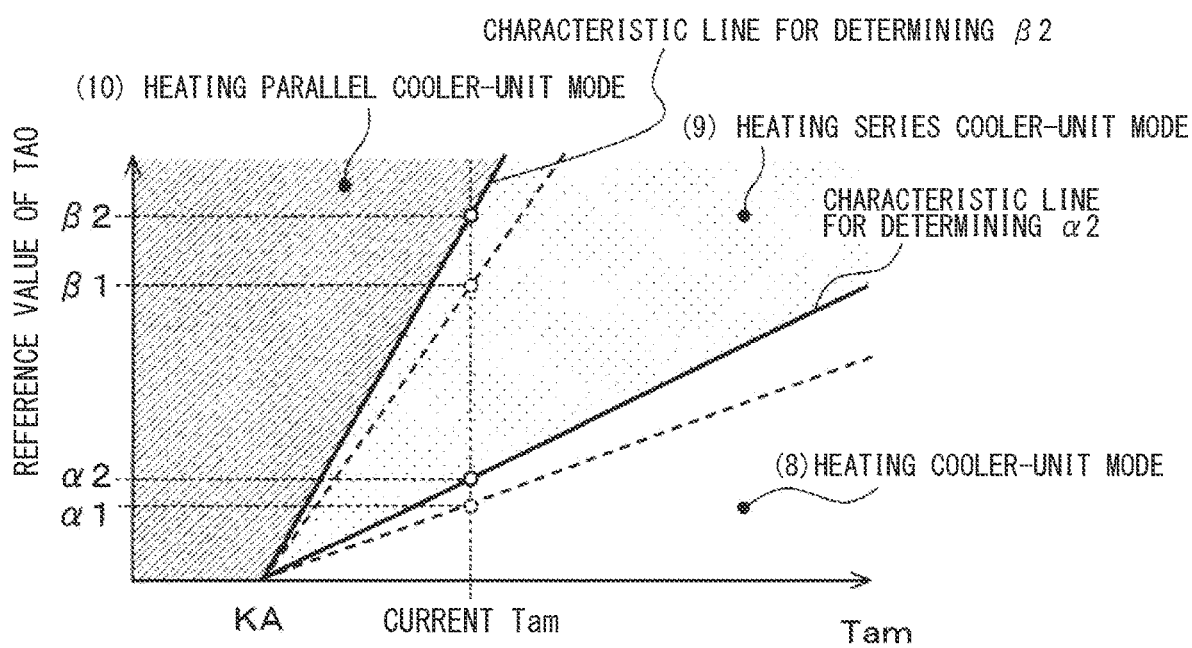
FIG. 7 is another control characteristic diagram for switching the operation mode of the air conditioning control program of the first embodiment.

In the present embodiment, as shown in FIG. 7, the first cooling reference temperature α2 is set to be a lower value as the outside air temperature Tam decreases. Further, at the same outside air temperature Tam, the first cooling reference temperature α2 is set higher than the cooling reference temperature α1.

When it is determined in step S180 that the target blowout temperature TAO is equal to or lower than the first cooling reference temperature α2, the process proceeds to step S190, and (8) Heating cooler-unit mode is selected as the operation mode. When it is determined in step S180 that the target blowout temperature TAO is not equal to or lower than the first cooling reference temperature α2, the process proceeds to step S200.

In step S200, it is determined whether or not the target blowout temperature TAO is equal to or lower than the second cooling reference temperature β2. The second cooling reference temperature β2 is set based on the outside air temperature Tam with reference to a control map stored in advance in the controller 60.

In the present embodiment, as shown in FIG. 7, similarly to the first cooling reference temperature α2, the second cooling reference temperature β2 is set to be a lower value as the outside air temperature Tam decreases. Further, the second cooling reference temperature β2 is set higher than the first cooling reference temperature α2. Further, at the same outside air temperature Tam, the second cooling reference temperature β2 is set higher than the dehumidification reference temperature β1.

When it is determined in step S200 that the target blowout temperature TAO is equal to or lower than the second cooling reference temperature β2, the process proceeds to step S210, and (9) Heating series cooler-unit mode is selected as the operation mode. When it is determined in step S200 that the target blowout temperature TAO is not equal to or lower than the second cooling reference temperature β2, the process proceeds to step S220, and (10) Heating parallel cooler-unit mode is selected as the operation mode.

Subsequently, a case where the process proceeds from step S160 to step S240 will be described. When the process proceeds from step S160 to step S240, it is not necessary to heat the air by the heater core 42. Therefore, in step S240, similarly to step S60, it is determined whether the battery 80 needs to be cooled.

When it is determined in step S240 that the battery 80 needs to be cooled, the process proceeds to step S250, and (11) Cooler-unit mode is selected as the operation mode. When it is determined in step S200 that the battery 80 does not need to be cooled, the process proceeds to step S260 to select the ventilation mode as the operation mode, and the process returns to step S10.

The ventilation mode is an operation mode in which the blower 32 is operated according to the setting signal set by the air volume setting switch. In addition, in step S240, when it is determined that the cooling of the battery 80 is not necessary, it is not necessary to operate the refrigeration cycle device 10 for conditioning air of the cabin and for cooling the battery. Therefore, in step S260, the blower 32 may be stopped.

In the air conditioning control program of the present embodiment, the operation mode of the refrigeration cycle device 10 is switched as described above. Furthermore, the air conditioning control program controls not only the operation of component of the refrigeration cycle device 10 but also the operation of other component. Specifically, the air conditioning control program controls the high temperature heat medium pump 41 of the high temperature heat medium circuit 40 forming the heating unit, and the low temperature heat medium pump 51 and the three-way valve 53 of the low temperature heat medium circuit 50 forming the cooler unit.

Specifically, the controller 60 controls the operation of the high temperature heat medium pump 41 so as to exert the reference pumping capability for each predetermined operation mode regardless of the operation mode of the refrigeration cycle device 10.

Therefore, in the high temperature heat medium circuit 40, when the high temperature heat medium is heated in the water passage of the water-refrigerant heat exchanger 12, the heated high temperature heat medium is pumped to the heater core 42. The high temperature heat medium that has flowed into the heater core 42 exchanges heat with the air. Accordingly, the air to be sent into the cabin is heated. The high temperature heat medium that has flowed out of the heater core 42 is sucked into the high temperature heat medium pump 41 and is pumped to the water-refrigerant heat exchanger 12.

Further, the controller 60 controls the operation of the low temperature heat medium pump 51 so as to exert the reference pumping capability for each predetermined operation mode regardless of the operation mode of the refrigeration cycle device 10.

Further, when the second low temperature heat medium temperature TWL2 is equal to or higher than the outside air temperature Tam, the controller 60 causes the low temperature heat medium flowing out from the cooling heat exchange section 52 to flow into the low temperature radiator 54 by controlling the operation of the three-way valve 53. The second low temperature heat medium temperature TWL2 is detected by the second low temperature heat medium temperature sensor 67b.

When the second low temperature heat medium temperature TWL2 is not equal to or higher than the outside air temperature Tam, the operation of the valve 53 is controlled such that the low temperature heat medium flowing out from the cooling heat exchange section 52 is sucked into the suction port of the low temperature heat medium pump 51.

Therefore, in the low temperature heat medium circuit 50, the low temperature heat medium is cooled in the water passage of the chiller 19, and the cooled low temperature heat medium is pumped to the cooling heat exchange section 52. The low temperature heat medium that has flowed into the cooling heat exchange section 52 absorbs heat from the battery 80. Consequently, the battery 80 is cooled. The low temperature heat medium flowing out from the cooling heat exchange section 52 flows into the three-way valve 53.

At this time, when the second low temperature heat medium temperature TWL2 is equal to or higher than the outside air temperature Tam, the low temperature heat medium flowing out from the cooling heat exchange section 52 flows into the low temperature radiator 54 and radiates heat to the outside air. Thereby, the low temperature heat medium is cooled to be equal to the outside air temperature Tam. The low temperature heat medium flowing out from the low temperature radiator 54 is sucked into the low temperature heat medium pump 51 and pressure-fed to the chiller 19.

When the second low temperature heat medium temperature TWL2 is lower than the outside air temperature Tam, the low temperature heat medium flowing out of the cooling heat exchange section 52 is sucked into the low temperature heat medium pump 51 and pumped to the chiller 19. Therefore, the temperature of the low temperature heat medium sucked into the low temperature heat medium pump 51 becomes equal to or lower than the outside air temperature Tam.

The detailed operation of the vehicle air conditioner 1 in each operation mode will be described below. The control map referred to in each operation mode described below is stored in the controller 60 in advance for each operation mode. The control maps corresponding to the operation modes may be equivalent to each other or may be different from each other.

(1) Air-Cooling Mode

Figure 8:
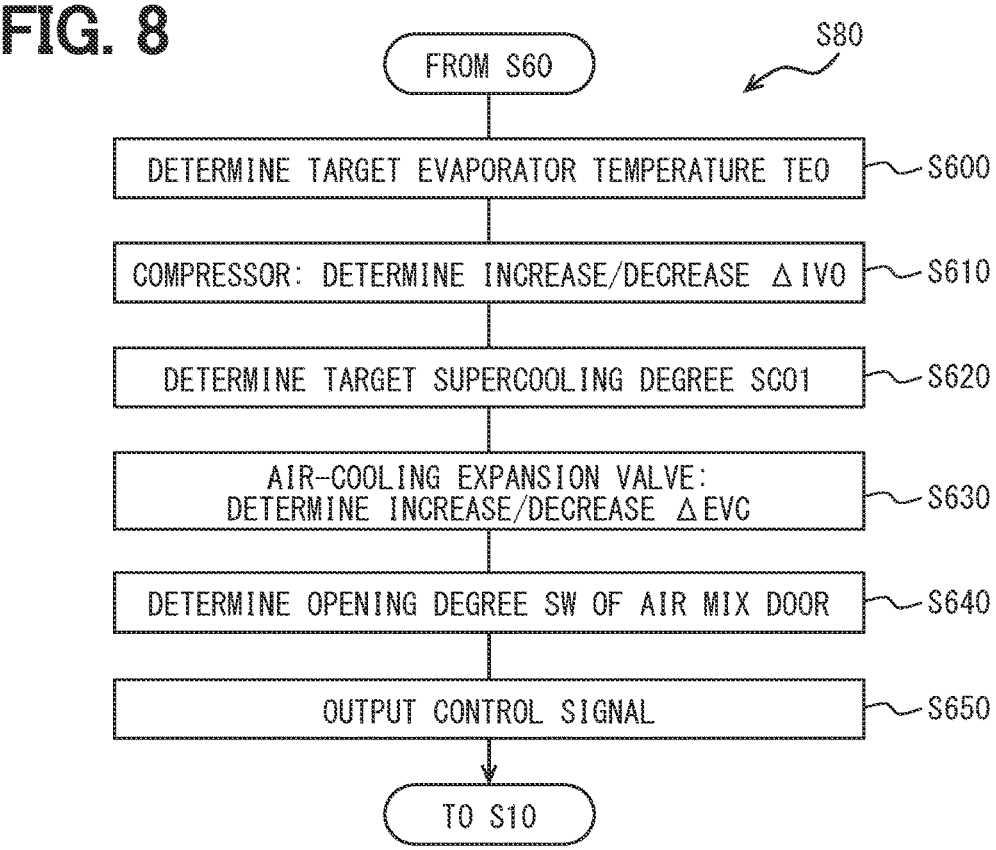
FIG. 8 is a flowchart showing a control process in a cooling mode of the first embodiment.

In the air-cooling mode, the controller 60 executes the control flow of the air-cooling mode shown in FIG. 8. First, in step S600, the target evaporator temperature TEO is determined. The target evaporator temperature TEO is determined based on the target blowout temperature TAO with reference to the control map stored in the controller 60. In the control map of the present embodiment, the target evaporator temperature TEO is increased as the target blowout temperature TAO increases.

In step S610, the increase/decrease amount ΔIVO in the rotation number of the compressor 11 is determined. The increase/decrease amount ΔIVO is determined based on a deviation between the target evaporator temperature TEO and the evaporator temperature Tefin detected by the evaporator temperature sensor 64g so that the evaporator temperature Tefin approaches the target evaporator temperature TEO by a feedback control method.

In step S620, the target supercooling degree SCO1 of the refrigerant flowing out of the outdoor heat exchanger 16 is determined. The target supercooling degree SCO1 is determined by referring to the control map, for example, based on the outside air temperature Tam. In the control map of this embodiment, the target supercooling degree SCO1 is determined so that the coefficient of performance (COP) of the cycle approaches the maximum value.

In step S630, the increase/decrease amount ΔEVC of the throttle opening of the air-cooling expansion valve 14b is determined. The increase/decrease amount ΔEVC is determined based on the deviation between the target supercooling degree SCO1 and the supercooling degree SC1 of the refrigerant on the outlet side of the outdoor heat exchanger 16 by a feedback control method such that the supercooling degree SC1 of the refrigerant on the outlet side of the outdoor heat exchanger 16 approaches the target supercooling degree SCO1.

The supercooling degree SC1 of the refrigerant on the outlet side of the outdoor heat exchanger 16 is calculated based on the temperature T3 detected by the third refrigerant temperature sensor 64c and the pressure P1 detected by the first refrigerant pressure sensor 65a.

In step S640, the opening degree SW of the air mix door 34 is calculated using the following formula F2.

$$SW=\{TAO-(Tefin+C2)\}/\{TWH-(Tefin+C2)\} \quad (F2)$$

TWH is the high temperature heat medium temperature detected by the high temperature heat medium temperature sensor 66a. C2 is a constant for control.

In step S650, in order to switch the refrigeration cycle device 10 to the refrigerant circuit in the air-cooling mode, the air-heating expansion valve 14a is fully opened, the air-cooling expansion valve 14b is set to the throttled state to exert the refrigerant depressurizing effect, and the cooler-unit expansion valve 14c is fully closed. Further, the dehumidification on-off valve 15a is closed and the air-heating on-off valve 15b is closed. Furthermore, a control signal or control voltage is output to each control target device so that the control state determined in steps S610, S630, and S640 is obtained, and the process returns to step S10.

Therefore, in the refrigeration cycle device 10 in the air-cooling mode, the vapor compression refrigeration cycle is defined to circulate the refrigerant in order of the compressor 11, the water-refrigerant heat exchanger 12 (the air-heating expansion valve 14a), the outdoor heat exchanger 16, the check valve 17, the air-cooling expansion valve 14b, the indoor evaporator 18, the evaporation pressure control valve 20, the accumulator 21, and the compressor 11.

That is, in the refrigeration cycle device 10 in the air-cooling mode, the water-refrigerant heat exchanger 12 and the outdoor heat exchanger 16 function as radiator that radiate the heat of refrigerant discharged from the compressor 11. Then, the air-cooling expansion valve 14b functions as a decompression unit that decompresses the refrigerant. Then, a vapor compression refrigeration cycle is configured in which the indoor evaporator 18 functions as an evaporator.

According to this, the air can be cooled by the indoor evaporator 18, and the high temperature heat medium can be heated by the water-refrigerant heat exchanger 12.

Therefore, in the vehicle air conditioner 1 in the air-cooling mode, the heater core 42 reheats a part of the air cooled by the indoor evaporator 18 by adjusting the opening degree of the air mix door 34. Then, the air whose temperature is adjusted so as to approach the target blowout temperature TAO is blown into the cabin, whereby the cabin can be cooled.

(2) Series Dehumidification Heating Mode

Figure 9:
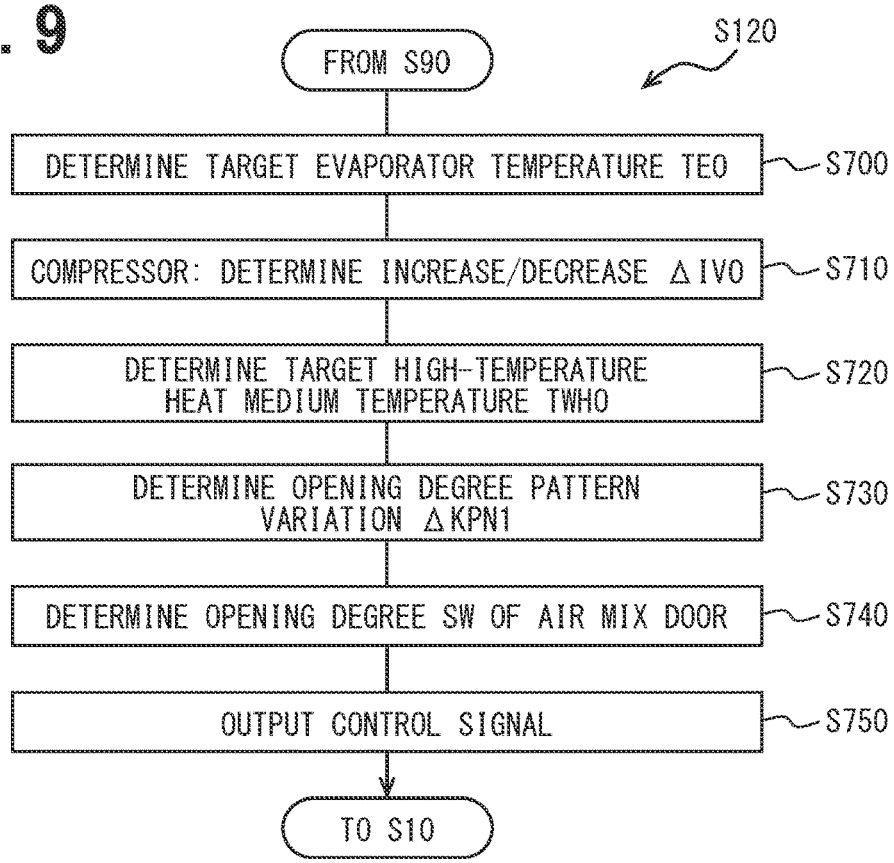
FIG. 9 is a flowchart showing a control process in a series dehumidification heating mode of the first embodiment.

In the series dehumidification heating mode, the controller 60 executes the control flow of the series dehumidification heating mode shown in FIG. 9. First, in step S700, the target evaporator temperature TEO is determined as in the air-cooling mode. In step S710, the increase/decrease amount ΔIVO in the rotation number of the compressor 11 is determined as in the air-cooling mode.

In step S720, the target high temperature heat medium temperature TWHO of the high temperature heat medium is determined so that the air can be heated by the heater core 42. The target high temperature heat medium temperature TWHO is determined with reference to the control map based on the target blowout temperature TAO and the efficiency of the heater core 42. In the control map of the present embodiment, the target high temperature heat medium temperature TWHO is increased as the target blowout temperature TAO increases.

In step S730, the variation ΔKPN1 of the opening degree pattern KPN1 is determined. The opening degree pattern KPN1 is a parameter for determining the combination of the throttle opening degree of the air-heating expansion valve 14a and the throttle opening degree of the air-cooling expansion valve 14b.

Figure 10:
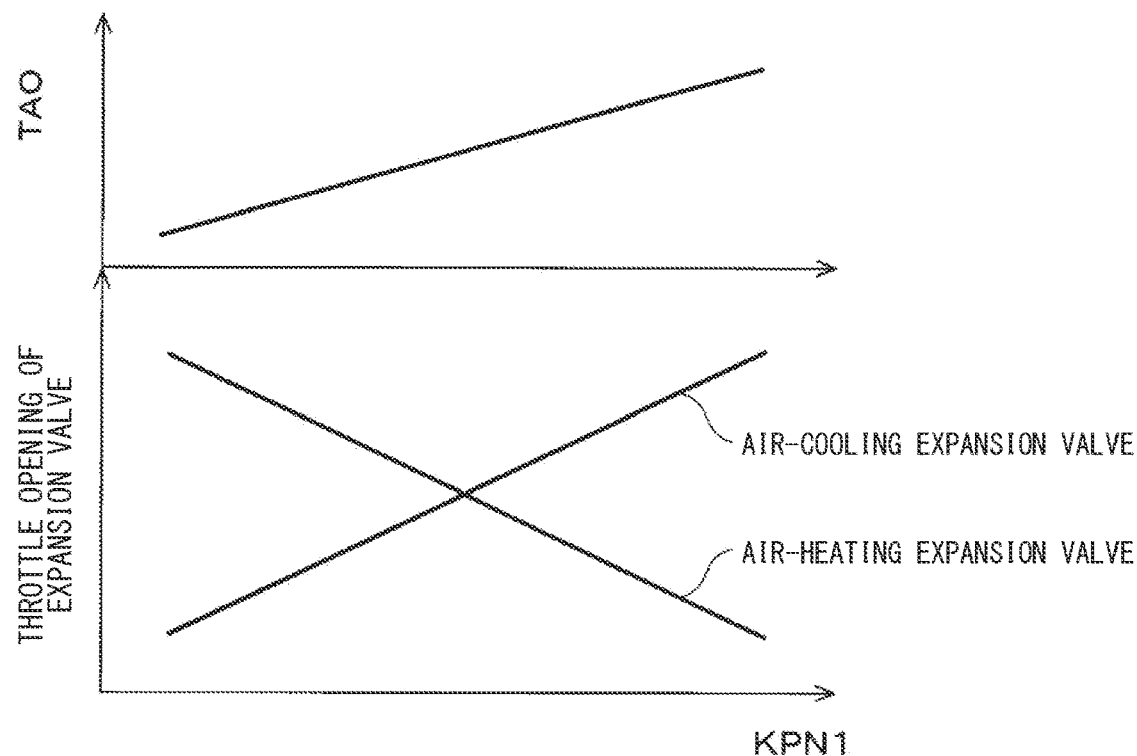
FIG. 10 is a control characteristic diagram for determining an opening pattern of an air-heating expansion valve and an air-cooling expansion valve in the series dehumidification heating mode of the first embodiment.

Specifically, in the series dehumidification heating mode, as shown in FIG. 10, the opening degree pattern KPN1 increases as the target blowout temperature TAO increases. As the opening degree pattern KPN1 increases, the throttle opening degree of the air-heating expansion valve 14a decreases, and the throttle opening degree of the air-cooling expansion valve 14b increases.

In step S740, the opening degree SW of the air mix door 34 is calculated as in the air-cooling mode. In the series dehumidification heating mode, the target blowout temperature TAO is higher than in the air-cooling mode, so the opening degree SW of the air mix door 34 approaches 100%. Therefore, in the series dehumidification heating mode, the opening degree of the air mix door 34 is determined so that almost the entire flow of the air passing through the indoor evaporator 18 passes through the heater core 42.

In step S750, in order to switch the refrigeration cycle device 10 to the refrigerant circuit in the series dehumidification heating mode, the air-heating expansion valve 14a is in the throttled state, the air-cooling expansion valve 14b is in the throttled state, and the cooler-unit expansion valve 14c is fully closed. Further, the dehumidification on-off valve 15a is closed and the air-heating on-off valve 15b is closed. Further, a control signal or control voltage is output to each control target device so that the control state determined in steps S710, S730, and S740 is obtained, and the process returns to step S10.

Therefore, in the refrigeration cycle device 10 in the series dehumidification heating mode, a vapor compression refrigeration cycle is formed to circulate the refrigerant in order of the compressor 11, the water-refrigerant heat exchanger 12, the air-heating expansion valve 14a, the outdoor heat exchanger 16, the check valve 17, the air-cooling expansion valve 14b, the indoor evaporator 18, the evaporation pressure control valve 20, the accumulator 21, and the compressor 11.

That is, in the refrigeration cycle device 10 in the series dehumidification heating mode, the water-refrigerant heat exchanger 12 functions as a radiator that radiates the heat of refrigerant discharged from the compressor 11. The air-heating expansion valve 14a and the air-cooling expansion valve 14b function as a pressure reducing unit. Then, a vapor compression refrigeration cycle in which the indoor evaporator 18 functions as an evaporator is configured.

Further, when the saturation temperature of the refrigerant in the outdoor heat exchanger 16 is higher than the outside air temperature Tam, the cycle in which the outdoor heat exchanger 16 functions as a radiator is configured. When the saturation temperature of the refrigerant in the outdoor heat exchanger 16 is lower than the outside air temperature Tam, the outdoor heat exchanger 16 functions as an evaporator in the cycle.

According to this, the air can be cooled by the indoor evaporator 18, and the high temperature heat medium can be heated by the water-refrigerant heat exchanger 12. Therefore, in the vehicle air conditioner 1 in the series dehumidification heating mode, the air cooled and dehumidified by the indoor evaporator 18 is reheated by the heater core 42 and blown into the cabin to dehumidify and heat the cabin.

When the saturation temperature of the refrigerant in the outdoor heat exchanger 16 is higher than the outside air temperature Tam, the opening degree pattern KPN1 is increased as the target blowout temperature TAO rises. As a result, the saturation temperature of the refrigerant in the outdoor heat exchanger 16 is lowered and the difference from the outside air temperature Tam is reduced. Thus, the heat radiation amount of the refrigerant in the outdoor heat exchanger 16 can be reduced, and the heat radiation amount of the refrigerant in the water-refrigerant heat exchanger 12 can be increased.

Further, when the saturation temperature of the refrigerant in the outdoor heat exchanger 16 is lower than the outside air temperature Tam, the opening degree pattern KPN1 is increased as the target blowout temperature TAO rises. As a result, the saturation temperature of the refrigerant in the outdoor heat exchanger 16 decreases and the difference from the outside air temperature Tam increases. Thus, the heat absorption amount of the refrigerant in the outdoor heat exchanger 16 can be increased, and the heat radiation amount of the refrigerant in the water-refrigerant heat exchanger 12 can be increased.

That is, in the series dehumidification heating mode, the heat radiation amount of the refrigerant in the water-refrigerant heat exchanger 12 to the high temperature heat medium can be increased by increasing the opening degree pattern KPN1 as the target blowout temperature TAO rises. Therefore, in the series dehumidification heating mode, the capacity of heating the air in the heater core 42 can be improved as the target blowout temperature TAO rises.

(3) Parallel Dehumidification Heating Mode

Figure 11:
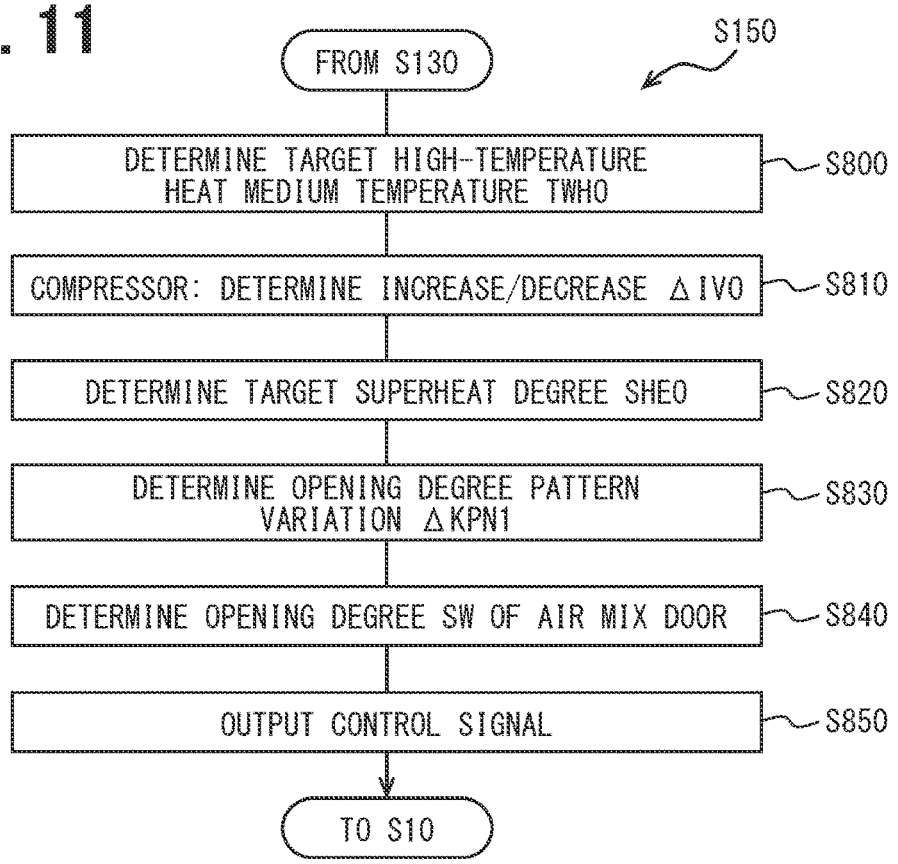
FIG. 11 is a flowchart showing a control process in a parallel dehumidification heating mode of the first embodiment.

In the parallel dehumidification heating mode, the controller 60 executes the control flow of the parallel dehumidification heating mode shown in FIG. 11. First, in step S800, the target high temperature heat medium temperature TWHO of the high temperature heat medium is determined in the same manner as in the series dehumidification heating mode so that the air can be heated by the heater core 42.

In step S810, the increase/decrease amount ΔIVO in the rotation number of the compressor 11 is determined. In the parallel dehumidification heating mode, the increase/decrease amount ΔIVO is determined based on the deviation between the target high temperature heat medium temperature TWHO and the high temperature heat medium temperature TWH by the feedback control method such that the high temperature heat medium temperature TWH approaches the target high temperature heat medium temperature TWHO.

In step S820, the target superheat degree SHEO of the refrigerant on the outlet side of the indoor evaporator 18 is determined. A predetermined constant (5° C. in this embodiment) can be adopted as the target superheat degree SHEO.

In step S830, the variation ΔKPN1 of the opening pattern KPN1 is determined, in the parallel dehumidification heating mode, based on the deviation between the target superheat degree SHEO and the superheat degree SHE of refrigerant on the outlet side of the indoor evaporator 18 using the feedback control method so that the superheat degree SHE approaches the target superheat degree SHEO.

The superheat degree SHE of refrigerant on the outlet side of the indoor evaporator 18 is calculated based on the temperature T4 detected by the fourth refrigerant temperature sensor 64d and the evaporator temperature Tefin.

Figure 12:
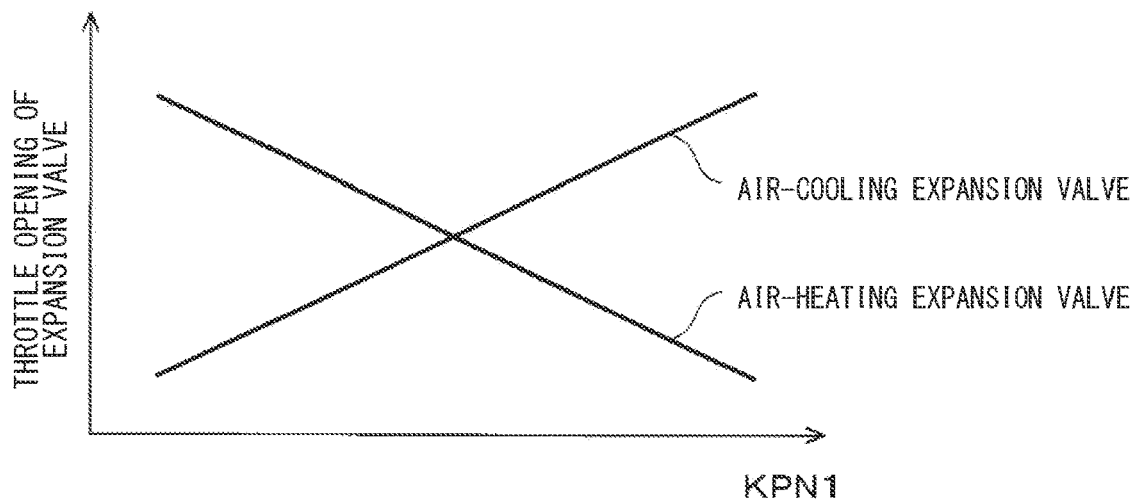
FIG. 12 is a control characteristic diagram for determining an opening pattern of the air-heating expansion valve and the air-cooling expansion valve in the parallel dehumidification heating mode of the first embodiment.

Further, in the parallel dehumidification heating mode, as shown in FIG. 12, as the opening degree pattern KPN1 increases, the throttle opening degree of the air-heating expansion valve 14a decreases and the throttle opening degree of the air-cooling expansion valve 14b increases. Therefore, when the opening degree pattern KPN1 increases, the flow rate of the refrigerant flowing into the indoor evaporator 18 increases, and the superheat degree SHE of the refrigerant on the outlet side of the indoor evaporator 18 decreases.

In step S840, the opening degree SW of the air mix door 34 is calculated as in the air-cooling mode. In the parallel dehumidification heating mode, the target blowout temperature TAO is higher than in the air-cooling mode, so that the opening degree SW of the air mix door 34 approaches 100% as in the series dehumidification heating mode. Therefore, in the parallel dehumidification heating mode, the opening degree of the air mix door 34 is determined so that almost the entire flow of the air passing through the indoor evaporator 18 passes through the heater core 42.

In step S850, in order to switch the refrigeration cycle device 10 to the refrigerant circuit in the parallel dehumidification heating mode, the air-heating expansion valve 14a is in a throttled state, the air-cooling expansion valve 14b is in a throttled state, and the cooler-unit expansion valve 14c is fully closed. Further, the dehumidification on-off valve 15a is opened, and the air-heating on-off valve 15b is opened. Further, a control signal or control voltage is output to each control target device so that the control state determined in steps S810, S830, and S840 is obtained, and the process returns to step S10.

Therefore, in the refrigeration cycle device 10 in the parallel dehumidification heating mode, a vapor compression refrigeration cycle is formed to circulate the refrigerant in order of the compressor 11, the water-refrigerant heat exchanger 12, the air-heating expansion valve 14a, the outdoor heat exchanger 16, the heating passage 22b, the accumulator 21, and the compressor 11 and to circulate the refrigerant in order of the compressor 11, the water-refrigerant heat exchanger 12, the bypass passage 22a, the air-cooling expansion valve 14b, the indoor evaporator 18, the evaporation pressure control valve 20, the accumulator 21, and the compressor 11.

That is, in the refrigeration cycle device 10 at the parallel dehumidification heating mode, the water-refrigerant heat exchanger 12 functions as a radiator that radiates the heat of refrigerant discharged from the compressor 11. Then, the air-heating expansion valve 14a functions as a pressure reducing unit, and the outdoor heat exchanger 16 functions as an evaporator. At the same time, the air-heating expansion valve 14a and the air-cooling expansion valve 14b connected in parallel to the outdoor heat exchanger 16 function as a pressure reducing unit. Then, a refrigeration cycle in which the indoor evaporator 18 functions as an evaporator is configured.

According to this, the air can be cooled by the indoor evaporator 18, and the high temperature heat medium can be heated by the water-refrigerant heat exchanger 12. Therefore, in the vehicle air conditioner 1 in the parallel dehumidification heating mode, the air cooled and dehumidified by the indoor evaporator 18 is reheated by the heater core 42 and blown into the cabin to dehumidify and heat the cabin.

Further, in the refrigeration cycle device 10 in the parallel dehumidification heating mode, the outdoor heat exchanger 16 and the indoor evaporator 18 are connected in parallel to the refrigerant flow, and the evaporation pressure control valve 20 is arranged downstream of the indoor evaporator 18. Thereby, the refrigerant evaporation temperature in the outdoor heat exchanger 16 can be made lower than the refrigerant evaporation temperature in the indoor evaporator 18.

Therefore, in the parallel dehumidification heating mode, the heat absorption amount of the refrigerant in the outdoor heat exchanger 16 can be increased, and the heat radiation amount of the refrigerant in the water-refrigerant heat exchanger 12 can be increased, compared with the series dehumidification heating mode. As a result, in the parallel dehumidification heating mode, the air can be reheated with a higher heating capacity than in the series dehumidification heating mode.

(4) Heating Mode

Figure 13:
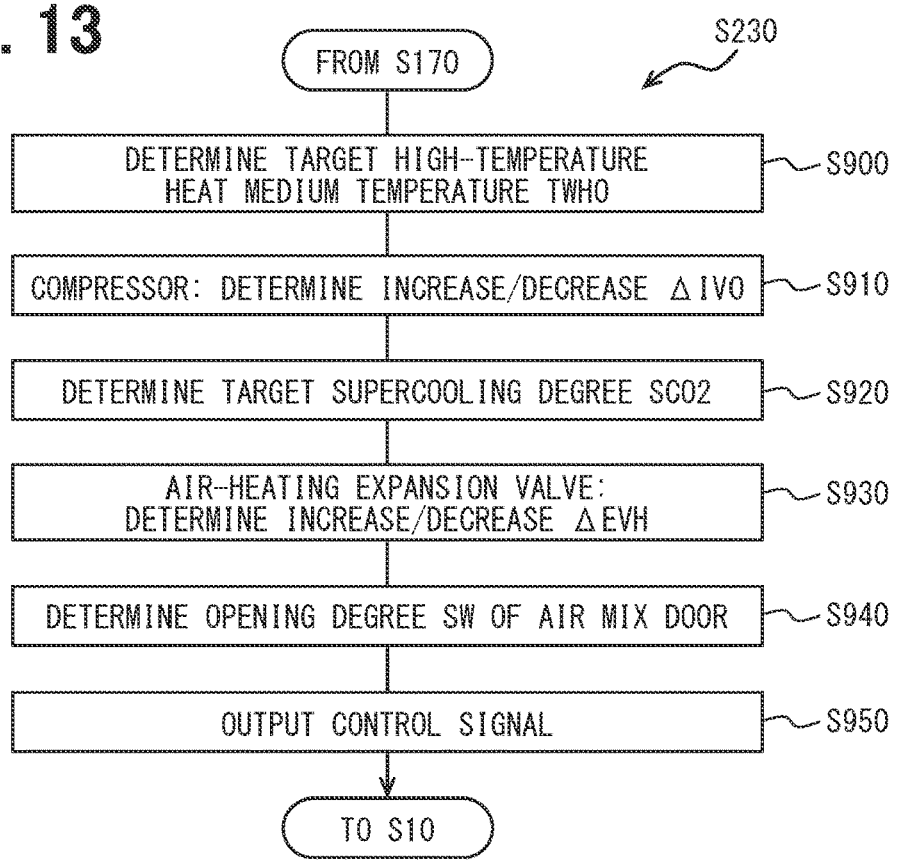
FIG. 13 is a flowchart showing a control process in a heating mode of the first embodiment.

In the heating mode, the controller 60 executes the control flow of the heating mode shown in FIG. 13. First, in step S900, the target high temperature heat medium temperature TWHO of the high temperature heat medium is determined as in the parallel dehumidification heating mode. In step S910, the increase/decrease amount ΔIVO in the rotation number of the compressor 11 is determined as in the parallel dehumidification heating mode.

In step S920, the target supercooling degree SCO2 of the refrigerant flowing out from the refrigerant passage of the water-refrigerant heat exchanger 12 is determined. The target supercooling degree SCO2 is determined with reference to the control map based on the suction temperature of the air flowing into the indoor evaporator 18 or the outside air temperature Tam. In the control map of the present embodiment, the target supercooling degree SCO2 is determined so that the coefficient of performance (COP) of the cycle approaches the maximum value.

In step S930, the increase/decrease amount ΔEVH of the throttle opening of the air-heating expansion valve 14a is determined. The increase/decrease amount ΔEVH is determined based on the deviation between the target supercooling degree SCO2 and the supercooling degree SC2 of the refrigerant flowing out of the refrigerant passage of the water-refrigerant heat exchanger 12 by the feedback control method, such that the supercooling degree SC2 of the refrigerant flowing out from the refrigerant passage approaches the target supercooling degree SCO2.

The supercooling degree SC2 of the refrigerant flowing out of the refrigerant passage of the water-refrigerant heat exchanger 12 is calculated based on the temperature T2 detected by the second refrigerant temperature sensor 64b and the pressure P1 detected by the first refrigerant pressure sensor 65a.

In step S940, the opening degree SW of the air mix door 34 is calculated as in the air-cooling mode. Here, in the heating mode, the target blowout temperature TAO is higher than in the air-cooling mode, so the opening degree SW of the air mix door 34 approaches 100%. Therefore, in the heating mode, the opening degree of the air mix door 34 is determined so that almost all the flow of the air passing through the indoor evaporator 18 passes through the heater core 42.

In step S950, in order to switch the refrigeration cycle device 10 to the refrigerant circuit in the heating mode, the air-heating expansion valve 14a is in a throttled state, the air-cooling expansion valve 14b is fully closed, and the cooler-unit expansion valve 14c is fully closed. The dehumidification on-off valve 15a is closed, and the air-heating on-off valve 15b is opened. Further, a control signal or control voltage is output to each control target device so that the control state determined in steps S910, S930, and S940 is obtained, and the process returns to step S10.

Therefore, in the refrigeration cycle device 10 in the heating mode, a vapor compression refrigeration cycle is constructed to circulate the refrigerant in order of the compressor 11, the water-refrigerant heat exchanger 12, the air-heating expansion valve 14a, the outdoor heat exchanger 16, the heating passage 22b, the accumulator 21, and the compressor 11.

That is, in the refrigeration cycle device 10 in the heating mode, the water-refrigerant heat exchanger 12 functions as a radiator that radiates the heat of refrigerant discharged from the compressor 11. Then, the air-heating expansion valve 14a functions as a pressure reducing unit. A refrigeration cycle in which the outdoor heat exchanger 16 functions as an evaporator is constructed.

According to this, the water-refrigerant heat exchanger 12 can heat the high temperature heat medium. Therefore, in the vehicle air conditioner 1 in the heating mode, the cabin can be heated by blowing the air heated by the heater core 42 into the cabin.

(5) Air-Cooling Cooler-Unit Mode

Figure 14:
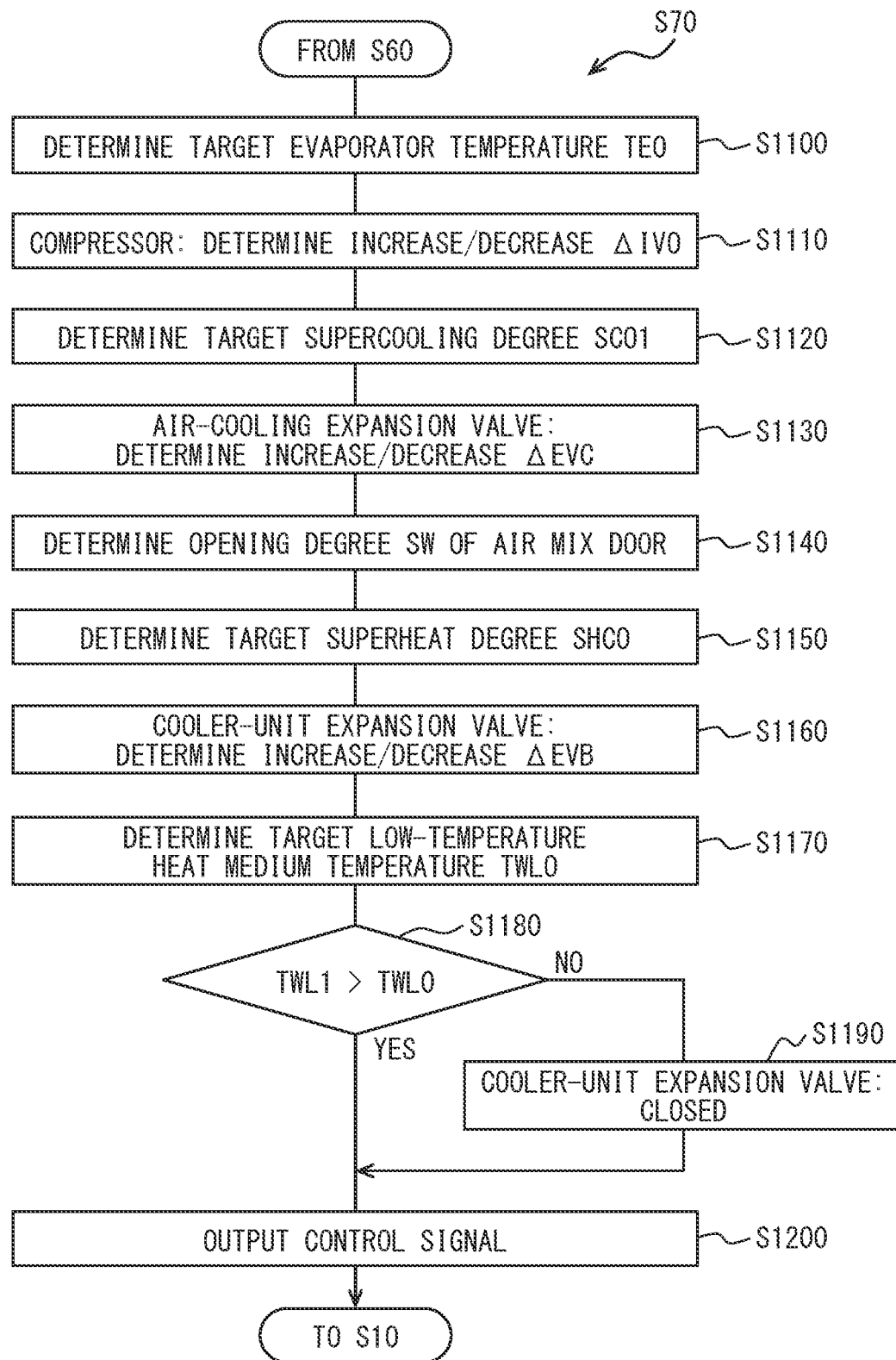
FIG. 14 is a flowchart showing a control process in an air-cooling cooler-unit mode of the first embodiment.

In the air-cooling cooler-unit mode, the controller 60 executes the control flow in the air-cooling cooler-unit mode shown in FIG. 14. First, in steps S1100 to S1140, as in steps S600 to S640 in the air-cooling mode, the target evaporator temperature TEO, the increase/decrease amount ΔIVO in the rotation number of the compressor 11, the increase/decrease amount ΔEVC in the throttle opening degree of the air-cooling expansion valve 14b, and the opening degree SW of the air mix door 34 are determined.

Next, in step S1150, the target superheat degree SHCO of the outlet side refrigerant of the refrigerant passage of the chiller 19 is determined. A predetermined constant (5° C. in the present embodiment) can be adopted as the target superheat degree SHCO.

In step S1160, the increase/decrease amount ΔEVB of the throttle opening degree of the cooler-unit expansion valve 14c is determined. The details of the control for determining the increase/decrease amount ΔEVB in the throttle opening of the cooler-unit expansion valve 14c executed in step S1160 will be described with reference to the flowchart of FIG. 15.

First, in step S1161, it is determined whether the flow rate V1 of the refrigerant flowing into the chiller 19 calculated by the refrigerant flow rate calculation unit 60f is equal to or less than a predetermined reference flow rate VO.

When it is determined in step S1161 that the flow rate V1 of the refrigerant flowing into the chiller 19 is equal to or less than the reference flow rate VO, the process proceeds to step S1162. In step S1162, the increase/decrease amount ΔEVB in the throttle opening of the cooler-unit expansion valve 14c is set as positive value, and the control for determining the increase/decrease amount ΔEVB in the throttle opening of the cooler-unit expansion valve 14c is terminated.

When the increase/decrease amount ΔEVB of the throttle opening of the cooler-unit expansion valve 14c is a positive value, the throttle opening of the cooler-unit expansion valve 14c is increased. As a result, the flow rate of the refrigerant flowing into the refrigerant passage of the chiller 19 increases, and the superheat degree SHC of the refrigerant on the outlet side of the refrigerant passage of the chiller 19 decreases.

When it is determined in step S1161 that the flow rate V1 of the refrigerant flowing into the chiller 19 is not equal to or less than the reference flow rate VO, the process proceeds to step S1163. In step S1163, it is determined whether the superheat degree SHC of the refrigerant flowing out from the refrigerant passage of the chiller 19 calculated by the superheat degree calculation unit 60g is lower than the target superheat degree SHCO.

When it is determined in step S1163 that the superheat degree SHC of the refrigerant flowing out from the refrigerant passage of the chiller 19 is lower than the target superheat degree SHCO, the process proceeds to step S1164. When it is not determined in step S1163 that the superheat degree SHC of the refrigerant flowing out from the refrigerant passage of the chiller 19 is lower than the target superheat degree SHCO, the process proceeds to step S1162.

In step S1164, the increase/decrease amount ΔEVB in the throttle opening of the cooler-unit expansion valve 14c is set as negative value, and the control for determining the increase/decrease amount ΔEVB in the throttle opening of the cooler-unit expansion valve 14c is terminated.

When the increase/decrease amount ΔEVB of the throttle opening of the cooler-unit expansion valve 14c is a negative value, the throttle opening of the cooler-unit expansion valve 14c is reduced. As a result, the flow rate of the refrigerant flowing into the refrigerant passage of the chiller 19 decreases, and the superheat degree SHC of the refrigerant on the outlet side of the refrigerant passage of the chiller 19 increases.

As shown in FIG. 14, in step S1170, the target low temperature heat medium temperature TWLO of the low temperature heat medium flowing out from the water passage of the chiller 19 is determined. The target low temperature heat medium temperature TWLO is determined with reference to the control map based on the heat generation amount of the battery 80 and the outside air temperature Tam. In the control map of the present embodiment, the target low temperature heat medium temperature TWLO is decreased in response to an increase in the heat generation amount of the battery 80 and an increase in the outside air temperature Tam.

In step S1180, it is determined whether the first low temperature heat medium temperature TWL1 detected by the first low temperature heat medium temperature sensor 67a is higher than the target low temperature heat medium temperature TWLO.

When it is determined in step S1180 that the first low temperature heat medium temperature TWL1 is higher than the target low temperature heat medium temperature TWLO, the process proceeds to step S1200. When it is not determined in step S1180 that the first low temperature heat medium temperature TWL1 is higher than the target low temperature heat medium temperature TWLO, the process proceeds to step S1190. In step S1190, the cooler-unit expansion valve 14c is fully closed and the process proceeds to step S1200.

In step S1200, in order to switch the refrigeration cycle device 10 to the refrigerant circuit in the air-cooling cooler-unit mode, the air-heating expansion valve 14a is fully opened, the air-cooling expansion valve 14b is throttled, and the cooler-unit expansion valve 14c is throttled. Further, the dehumidification on-off valve 15a is closed and the air-heating on-off valve 15b is closed. Further, a control signal or control voltage is output to each control target device so that the control state determined in steps S1110, S1130, S1140, S1160, and S1190 is obtained, and the process returns to step S10.

Therefore, in the refrigeration cycle device 10 in the air-cooling cooler-unit mode, a vapor compression refrigeration cycle is formed to circulate the refrigerant in order of the compressor 11, the water-refrigerant heat exchanger 12 (the air-heating expansion valve 14a), the outdoor heat exchanger 16, the check valve 17, the air-cooling expansion valve 14b, the indoor evaporator 18, the evaporation pressure control valve 20, the accumulator 21, and the compressor 11, and to circulate the refrigerant in order of the compressor 11, the water-refrigerant heat exchanger 12 (the air-heating expansion valve 14a), the outdoor heat exchanger 16, the check valve 17, the cooler-unit expansion valve 14c, the chiller 19, the evaporation pressure control valve 20, the accumulator 21, and the compressor 11.

That is, in the refrigeration cycle device 10 in the air-cooling cooler-unit mode, the water-refrigerant heat exchanger 12 and the outdoor heat exchanger 16 function as radiator that radiate the heat of refrigerant discharged from the compressor 11. Then, the air-cooling expansion valve 14b functions as a pressure reducing unit. The indoor evaporator 18 functions as an evaporator. At the same time, the air-cooling expansion valve 14b and the cooler-unit expansion valve 14c connected in parallel to the indoor evaporator 18 function as a pressure reducing unit. Then, a refrigeration cycle in which the chiller 19 functions as an evaporator is configured.

According to this, the air can be cooled by the indoor evaporator 18, and the high temperature heat medium can be heated by the water-refrigerant heat exchanger 12. Further, the chiller 19 can cool the low pressure heat medium.

Therefore, in the vehicle air conditioner 1 in the air-cooling cooler-unit mode, the heater core 42 reheats a part of the air cooled by the indoor evaporator 18 by adjusting the opening degree of the air mix door 34. As a result, it is possible to cool the cabin by blowing out the air whose temperature is adjusted so as to approach the target blowout temperature TAO into the cabin.

Furthermore, the low temperature heat medium cooled by the chiller 19 is caused to flow into the cooling heat exchange section 52, whereby the battery 80 can be cooled.

As described above, in the refrigerating cycle device 10 at the air-cooling cooler-unit mode, the refrigerant radiates heat in the water-refrigerant heat exchanger 12 and the outdoor heat exchanger 16, and the refrigerant evaporates in the indoor evaporator 18 and chiller 19 arranged in parallel with each other in the flow of the refrigerant radiating heat in the outdoor heat exchanger 16. Therefore, the air-cooling cooler-unit mode of the present embodiment corresponds to a parallel evaporation mode.

(6) Series Dehumidification Heating Cooler-Unit Mode

Figure 16:
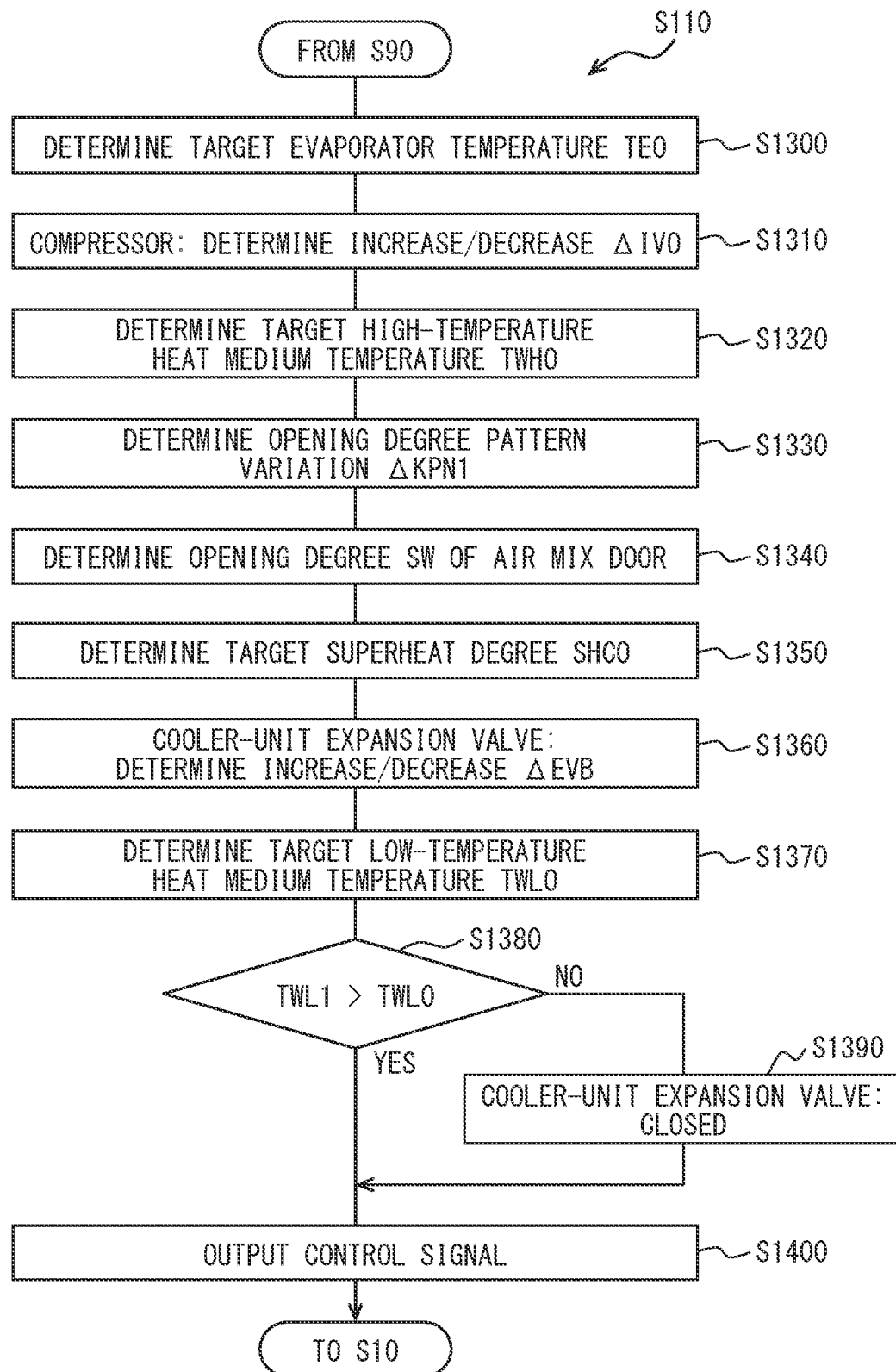
FIG. 16 is a flowchart showing a control process of a series dehumidification heating cooler-unit mode of the first embodiment.
Figure 17:
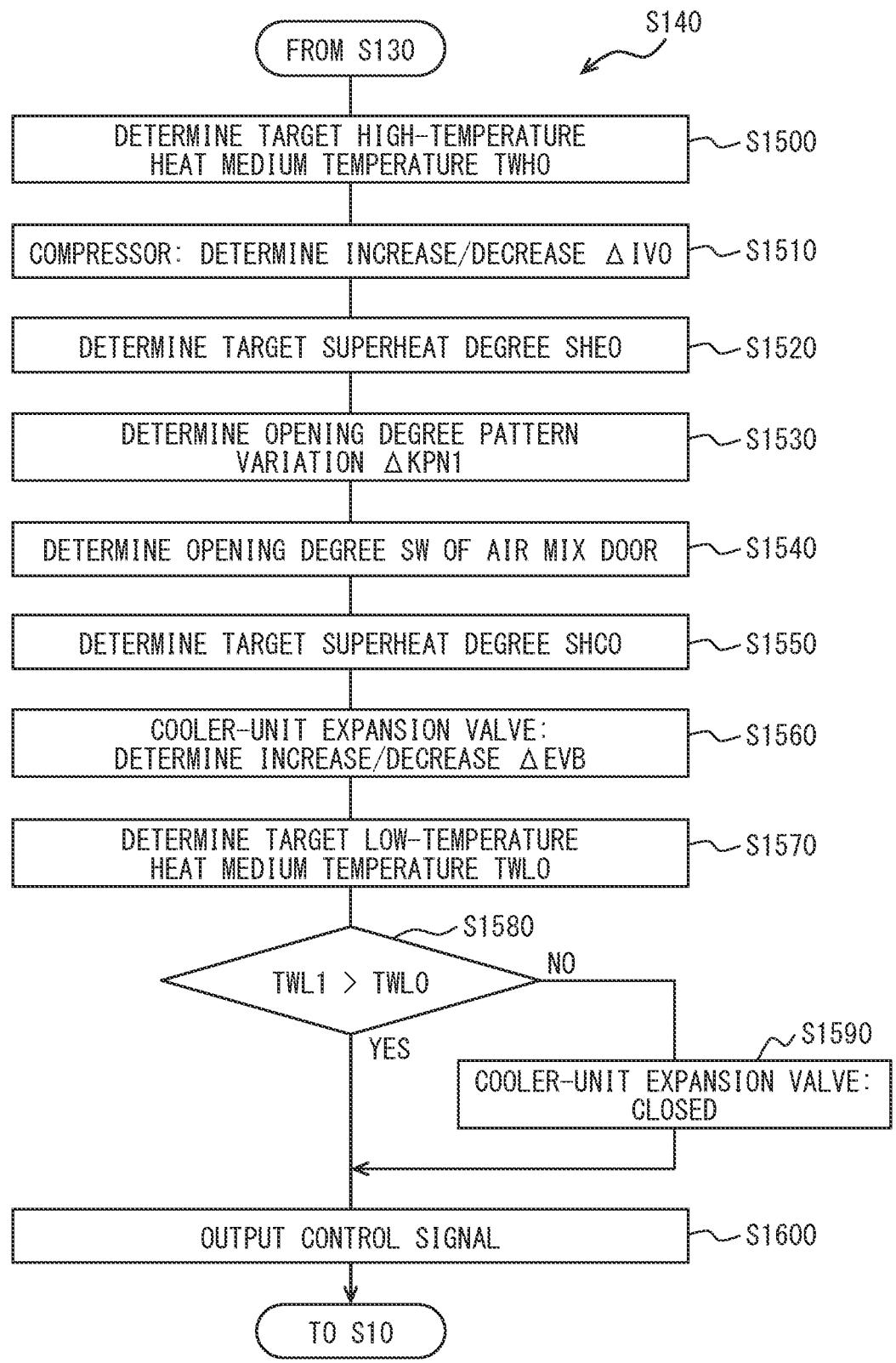
FIG. 17 is a flowchart showing a control process of a parallel dehumidification heating cooler-unit mode of the first embodiment.

In the series dehumidification heating cooler-unit mode, the controller 60 executes the control flow in the series dehumidification heating cooler-unit mode shown in FIG. 16. First, in steps S1300 to S1340, as in steps S700 to S740 in the series dehumidification heating mode, the target evaporator temperature TEO, the increase/decrease amount $\Delta$IVO in the rotation number of the compressor 11, the variation $\Delta$KPN1 of the opening degree pattern KPN1, and the opening degree SW of the air mix door 34 are determined.

In subsequent steps S1350, S1360 and S1370, as in steps S1150, S1160 and S1170 in the air-cooling cooler-unit mode, the target superheat degree SHCO, the increase/decrease amount $\Delta$EVB of the throttle opening degree of the cooler-unit expansion valve 14c, and the target low temperature heat medium temperature TWLO are determined.

Next, in step S1380, as in the air-cooling cooler-unit mode, when it is determined that the first low temperature heat medium temperature TWL1 is higher than the target low temperature heat medium temperature TWLO, the process proceeds to step S1400. When it is not determined in step S1380 that the first low temperature heat medium temperature TWL1 is higher than the target low temperature heat medium temperature TWLO, the process proceeds to step S1390. In step S1390, the cooler-unit expansion valve 14c is fully closed, and the process proceeds to step S1400.

In step S1400, in order to switch the refrigeration cycle device 10 to the refrigerant circuit in the series dehumidification heating cooler-unit mode, the air-heating expansion valve 14a is in a throttled state, the air-cooling expansion valve 14b is in a throttled state, and the cooler-unit expansion valve 14c is in a throttled state. Further, the dehumidification on-off valve 15a is closed and the air-heating on-off valve 15b is closed. Further, a control signal or control voltage is output to each control target device so that the control state determined in steps S1310, S1330, S1340, S1360, and S1390 is obtained, and the process returns to step S10.

Therefore, in the series dehumidification heating cooler-unit mode, a vapor compression refrigeration cycle is formed to circulate the refrigerant in order of the compressor 11, the water-refrigerant heat exchanger 12, the air-heating expansion valve 14a, the outdoor heat exchanger 16, the check valve 17, the air-cooling expansion valve 14b, the indoor evaporator 18, the evaporation pressure control valve 20, the accumulator 21, and the compressor 11, and to circulate the refrigerant in order of the compressor 11, the water-refrigerant heat exchanger 12, the air-heating expansion valve 14a, the outdoor heat exchanger 16, the check valve 17, the cooler-unit expansion valve 14c, the chiller 19, the evaporation pressure control valve 20, the accumulator 21, and the compressor 11.

That is, in the refrigeration cycle device 10 in the series dehumidification heating mode, the water-refrigerant heat exchanger 12 functions as a radiator that radiates the heat of refrigerant discharged from the compressor 11. Then, the air-heating expansion valve 14a functions as a pressure reducing unit. Then, the air-cooling expansion valve 14b functions as a pressure reducing unit, and the indoor evaporator 18 functions as an evaporator. At the same time, the air-cooling expansion valve 14b and the cooler-unit expansion valve 14c connected in parallel to the indoor evaporator 18 function as a pressure reducing unit. Then, a refrigeration cycle in which the chiller 19 functions as an evaporator is configured.

Further, when the saturation temperature of the refrigerant in the outdoor heat exchanger 16 is higher than the outside air temperature Tam, the cycle in which the outdoor heat exchanger 16 functions as a radiator is configured. When the saturation temperature of the refrigerant in the outdoor heat exchanger 16 is lower than the outside air temperature Tam, the outdoor heat exchanger 16 functions as an evaporator in the cycle.

According to this, the air can be cooled by the indoor evaporator 18, and the high temperature heat medium can be heated by the water-refrigerant heat exchanger 12. Further, the chiller 19 can cool the low pressure heat medium.

Therefore, in the refrigeration cycle device 10 in the series dehumidification heating cooler-unit mode, the air cooled and dehumidified by the indoor evaporator 18 is reheated by the heater core 42 and blown into the cabin, thereby dehumidifying and heating the cabin. At this time, it is possible to improve the capacity of heating the air in the heater core 42 by increasing the opening degree pattern KPN1, as in the series dehumidification heating mode.

Furthermore, the low temperature heat medium cooled by the chiller 19 is caused to flow into the cooling heat exchange section 52, whereby the battery 80 can be cooled.

As described above, in the refrigerating cycle device 10 at the series dehumidification heating cooler-unit mode, the refrigerant radiates heat at least in the water-refrigerant heat exchanger 12, and the refrigerant evaporates in the indoor evaporator 18 and the chiller 19 arranged in parallel with each other in the flow of the refrigerant radiated by the water-refrigerant heat exchanger 12. Therefore, the series dehumidification heating cooler-unit mode of the present embodiment corresponds to a parallel evaporation mode.

(7) Parallel Dehumidification Heating Cooler-Unit Mode

In the parallel dehumidification heating cooler-unit mode, the controller 60 executes the control flow in the parallel dehumidification heating cooler-unit mode shown in FIG. 16. First, in steps S1500 to S1540, as in steps S800 to S840 in the parallel dehumidification heating mode, the target high temperature heat medium temperature TWHO, the increase/decrease amount ΔIVO in the rotation number of the compressor 11, the target superheat degree SHEO, the variation ΔKPN1 in the opening degree pattern KPN1, and the opening degree SW of the air mix door 34 are determined.

In subsequent steps S1550, S1560 and S1570, as in steps S1150, S1160 and S1170 in the air-cooling cooler-unit mode, the target superheat degree SHCO, the increase/decrease amount ΔEVB of the throttle opening degree of the cooler-unit expansion valve 14c, and the target low temperature heat medium temperature TWLO are determined.

Next, in step S1580, when it is determined that the first low temperature heat medium temperature TWL1 is higher than the target low temperature heat medium temperature TWLO, the process proceeds to step S1600, as in the air-cooling cooler-unit mode. When it is not determined in step S1580 that the first low temperature heat medium temperature TWL1 is higher than the target low temperature heat medium temperature TWLO, the process proceeds to step S1590. In step S1590, the cooler-unit expansion valve 14c is fully closed, and the process proceeds to step S1600.

In step S1600, in order to switch the refrigeration cycle device 10 to the refrigerant circuit in the parallel dehumidification heating cooler-unit mode, the air-heating expansion valve 14a is in a throttled state, the air-cooling expansion valve 14b is in a throttled state, and the cooler-unit expansion valve 14c is in a throttled state. Further, the dehumidification on-off valve 15a is opened, and the air-heating on-off valve 15b is opened. Further, a control signal or control voltage is output to each control target device so that the control state determined in steps S1510, S1530, S1540, S1560, and S1590 is obtained, and the process returns to step S10.

Therefore, in the refrigeration cycle device 10 in the parallel dehumidification heating cooler-unit mode, a vapor compression refrigeration cycle is constructed to circulate the refrigerant in order of the compressor 11, the water-refrigerant heat exchanger 12, the air-heating expansion valve 14a, the outdoor heat exchanger 16, the heating passage 22b, the accumulator 21, and the compressor 11, to circulate the refrigerant in order of the compressor 11, the water-refrigerant heat exchanger 12, the bypass passage 22a, the air-cooling expansion valve 14b, the indoor evaporator 18, the evaporation pressure control valve 20, the accumulator 21, and the compressor 11, and to circulate the refrigerant in order of the compressor 11, the water-refrigerant heat exchanger 12, the bypass passage 22a, the cooler-unit expansion valve 14c, the chiller 19, the evaporation pressure control valve 20, the accumulator 21, and the compressor 11.

That is, in the refrigeration cycle device 10 in the parallel dehumidification heating cooler-unit mode, the water-refrigerant heat exchanger 12 functions as a radiator that radiates the heat of refrigerant discharged from the compressor 11. Then, the air-heating expansion valve 14a functions as a pressure reducing unit. The outdoor heat exchanger 16 functions as an evaporator. At the same time, the air-heating expansion valve 14a and the air-cooling expansion valve 14b connected in parallel to the outdoor heat exchanger 16 function as a pressure reducing unit. The indoor evaporator 18 functions as an evaporator. The air-heating expansion valve 14a and the cooler-unit expansion valve 14c connected in parallel to the outdoor heat exchanger 16 function as a pressure reducing unit. Then, a refrigeration cycle in which the chiller 19 functions as an evaporator is configured.

According to this, the air can be cooled by the indoor evaporator 18, and the high temperature heat medium can be heated by the water-refrigerant heat exchanger 12. Further, the chiller 19 can cool the low pressure heat medium.

Therefore, in the vehicle air conditioner 1 in the parallel dehumidification heating cooler-unit mode, the air cooled and dehumidified by the indoor evaporator 18 is reheated by the heater core 42 and blown into the cabin to dehumidify and heat the cabin. At this time, the air can be reheated with a heating capacity higher than that in the series dehumidification heating cooler-unit mode by lowering the refrigerant evaporation temperature in the outdoor heat exchanger 16 to be lower than the refrigerant evaporation temperature in the indoor evaporator 18.

Furthermore, the low temperature heat medium cooled by the chiller 19 is caused to flow into the cooling heat exchange section 52, whereby the battery 80 can be cooled.

As described above, in the refrigeration cycle device 10 at the parallel dehumidification heating cooler-unit mode, the refrigerant dissipates heat in the water-refrigerant heat exchanger 12, and the refrigerant evaporates in the outdoor heat exchanger 16, the indoor evaporator 18, and the chiller 19 arranged in parallel with each other in the flow of the refrigerant dissipated in the water-refrigerant heat exchanger 12. Therefore, the parallel dehumidification heating cooler-unit mode of the present embodiment corresponds to a parallel evaporation mode.

(8) Heating Cooler-Unit Mode

Figure 18:
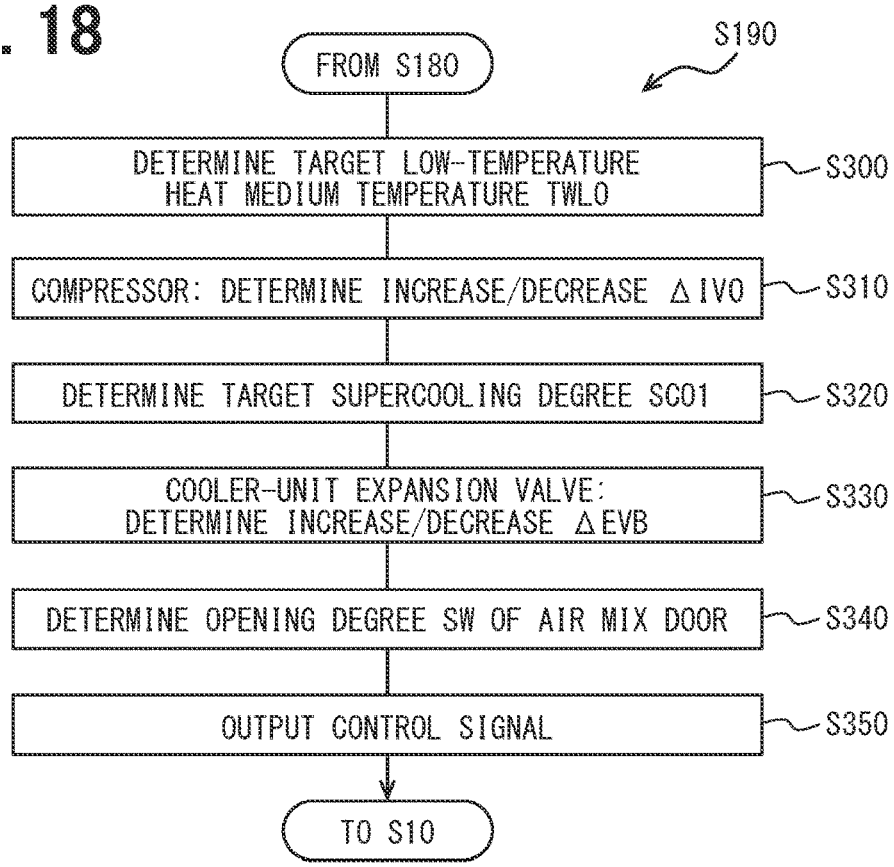
FIG. 18 is a flowchart showing a control process in a heating cooler-unit mode of the first embodiment.
Figure 19:
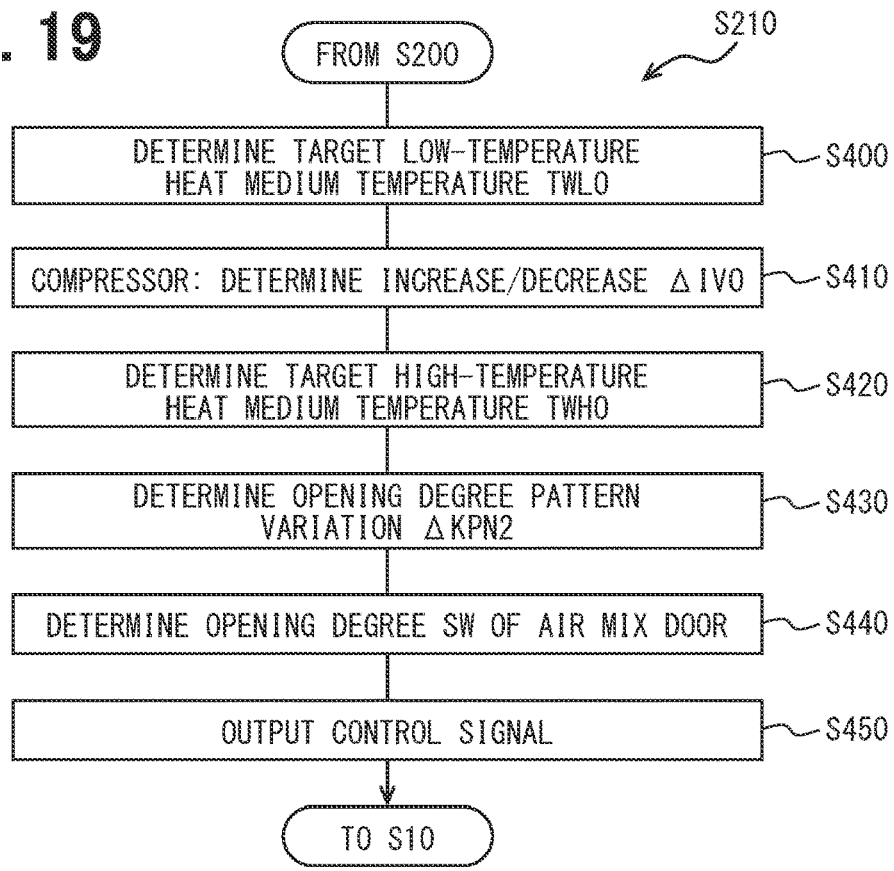
FIG. 19 is a flowchart showing a control process in a heating series cooler-unit mode of the first embodiment.

In the heating cooler-unit mode, the controller 60 executes the control flow of the heating cooler-unit mode shown in FIG. 18. First, in step S300, the target low temperature heat medium temperature TWLO of the low temperature heat medium is determined so that the cooling heat exchange section 52 can cool the battery 80.

In step S310, the increase/decrease amount ΔIVO in the rotation number of the compressor 11 is determined. In the heating cooler-unit mode, the increase/decrease amount ΔIVO is determined based on the deviation between the target low temperature heat medium temperature TWLO and the first low temperature heat medium temperature TWL1 by the feedback control method so that the first low temperature heat medium temperature TWL1 approaches the target low temperature heat medium temperature TWLO.

In step S320, the target supercooling degree SCO1 of the refrigerant flowing out of the outdoor heat exchanger 16 is determined. The target supercooling degree SCO1 in the heating cooler-unit mode is determined with reference to the control map based on the outside air temperature Tam. In the control map of this embodiment, the target supercooling degree SCO1 is determined so that the coefficient of performance (COP) of the cycle approaches the maximum value.

In step S330, the increase/decrease amount ΔEVB of the throttle opening degree of the cooler-unit expansion valve 14c is determined. The increase/decrease amount ΔEVB is determined based on the deviation between the target supercooling degree SCO1 and the supercooling degree SC1 of the refrigerant on the outlet side of the outdoor heat exchanger 16, by a feedback control method, such that the supercooling degree SC1 of the refrigerant on the outlet side of the outdoor heat exchanger 16 approaches the target supercooling degree SCO1. The supercooling degree SC1 is calculated similarly to in the air-cooling mode.

In step S340, the opening degree SW of the air mix door 34 is calculated as in the air-cooling mode.

In step S350, in order to switch the refrigeration cycle device 10 to the refrigerant circuit in the heating cooler-unit mode, the air-heating expansion valve 14a is fully opened, the air-cooling expansion valve 14b is fully closed, and the cooler-unit expansion valve 14c is throttled. Further, the dehumidification on-off valve 15a is closed and the air-heating on-off valve 15b is closed. Further, a control signal or control voltage is output to each control target device so that the control state determined in steps S310, S330, and S340 is obtained, and the process returns to step S10.

Therefore, in the refrigeration cycle device 10 in the heating cooler-unit mode, a vapor compression refrigeration cycle is formed to circulate the refrigerant in order of the compressor 11, the water-refrigerant heat exchanger 12 (the air-heating expansion valve 14a), the outdoor heat exchanger 16, the check valve 17, the cooler-unit expansion valve 14c, the chiller 19, the evaporation pressure control valve 20, the accumulator 21, and the compressor 11.

That is, in the refrigeration cycle device 10 in the heating cooler-unit mode, the water-refrigerant heat exchanger 12 and the outdoor heat exchanger 16 function as radiator that radiates the heat of refrigerant discharged from the compressor 11. Then, the cooler-unit expansion valve 14c functions as a decompression unit that decompresses the refrigerant. Then, a vapor compression refrigeration cycle in which the chiller 19 functions as an evaporator is configured.

According to this, the water-refrigerant heat exchanger 12 can heat the high temperature heat medium and the chiller 19 can cool the low temperature heat medium.

Therefore, in the vehicle air conditioner 1 in the heating cooler-unit mode, the cabin can be heated by blowing the air heated by the heater core 42 into the cabin. Furthermore, the low temperature heat medium cooled by the chiller 19 is caused to flow into the cooling heat exchange section 52, whereby the battery 80 can be cooled.

(9) Heating Series Cooler-Unit Mode

In the heating series cooler-unit mode, the controller 60 executes the control flow of the heating series cooler-unit mode shown in FIG. 18. First, in step S400, the target low temperature heat medium temperature TWLO is determined as in the heating cooler-unit mode. In step S410, the increase/decrease amount ΔIVO in the rotation number of the compressor 11 is determined as in the heating cooler-unit mode.

In step S420, the target high temperature heat medium temperature TWHO of the high temperature heat medium is determined as in the series dehumidification heating mode.

In step S430, the variation ΔKPN2 of the opening degree pattern KPN2 is determined. The opening degree pattern KPN2 is a parameter for determining the combination of the throttle opening degree of the air-heating expansion valve 14a and the throttle opening degree of the cooler-unit expansion valve 14c.

Figure 20:
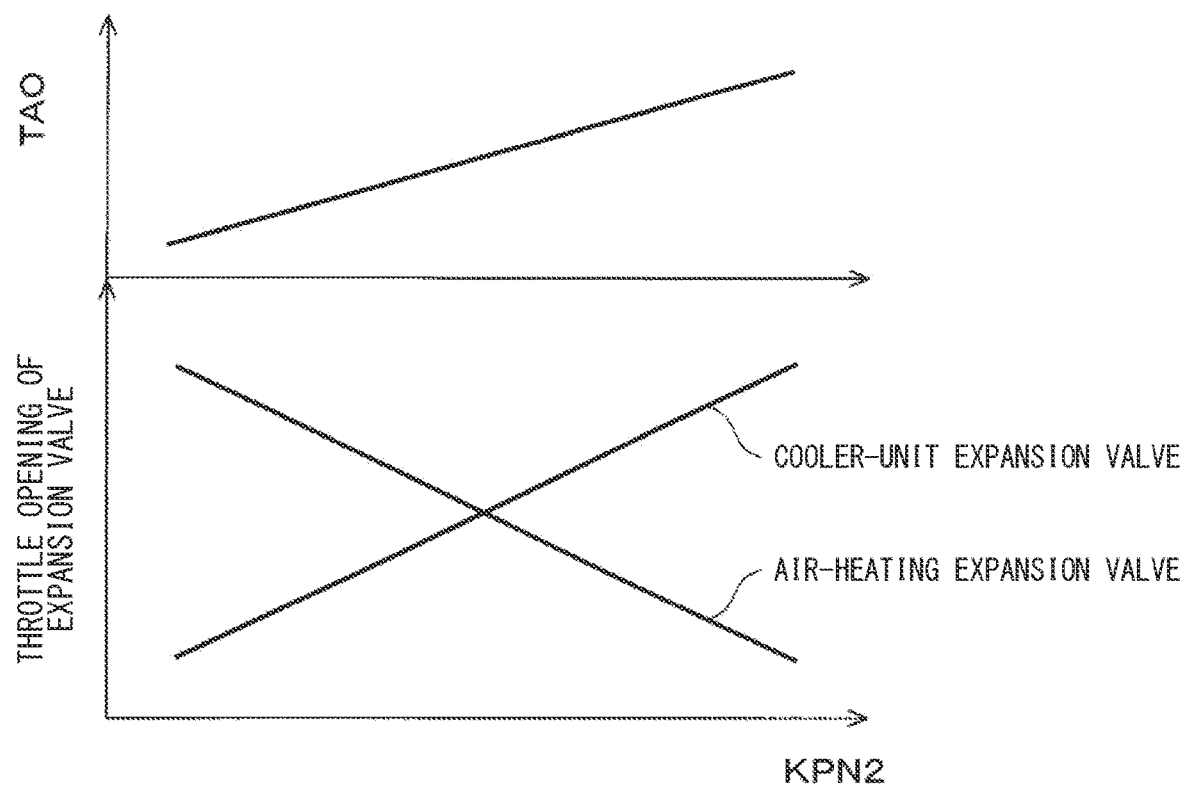
FIG. 20 is a control characteristic diagram for determining the opening pattern of the air-heating expansion valve and the cooler-unit expansion valve in the heating series cooler-unit mode of the first embodiment.

Specifically, in the heating series cooler-unit mode, as shown in FIG. 20, the opening degree pattern KPN2 increases as the target blowout temperature TAO increases. Then, as the opening degree pattern KPN2 increases, the throttle opening degree of the air-heating expansion valve 14a decreases and the throttle opening degree of the cooler-unit expansion valve 14c increases.

In step S440, the opening degree SW of the air mix door 34 is calculated as in the air-cooling mode.

In step S450, in order to switch the refrigeration cycle device 10 to the refrigerant circuit in the heating series cooler-unit mode, the air-heating expansion valve 14a is in a throttled state, the air-cooling expansion valve 14b is fully closed, and the cooler-unit expansion valve 14c is in a throttled state. Further, the dehumidification on-off valve 15a is closed and the air-heating on-off valve 15b is closed. Further, a control signal or control voltage is output to each control target device so that the control state determined in steps S310, S330, and S340 is obtained, and the process returns to step S10.

Therefore, in the refrigeration cycle device 10 in the heating series cooler-unit mode, a vapor compression refrigeration cycle is formed to circulate the refrigerant in order of the compressor 11, the water-refrigerant heat exchanger 12, the air-heating expansion valve 14a, the outdoor heat exchanger 16, the check valve 17, the cooler-unit expansion valve 14c, the chiller 19, the evaporation pressure control valve 20, the accumulator 21, and the compressor 11.

That is, in the refrigeration cycle device 10 in the heating series cooler-unit mode, the water-refrigerant heat exchanger 12 functions as a radiator for radiating the heat of refrigerant discharged from the compressor 11. The air-heating expansion valve 14a and the cooler-unit expansion valve 14c function as decompression unit. A vapor compression refrigeration cycle is formed in which the chiller 19 functions as an evaporator.

Further, when the saturation temperature of the refrigerant in the outdoor heat exchanger 16 is higher than the outside air temperature Tam, the cycle in which the outdoor heat exchanger 16 functions as a radiator is configured. When the saturation temperature of the refrigerant in the outdoor heat exchanger 16 is lower than the outside air temperature Tam, the outdoor heat exchanger 16 functions as an evaporator in the cycle.

According to this, the water-refrigerant heat exchanger 12 can heat the high temperature heat medium, and the chiller 19 can cool the low temperature heat medium.

Therefore, in the vehicle air conditioner 1 in the heating series cooler-unit mode, the cabin can be heated by blowing the air heated by the heater core 42 into the cabin. Furthermore, the low temperature heat medium cooled by the chiller 19 is caused to flow into the cooling heat exchange section 52, whereby the battery 80 can be cooled.

Furthermore, when the saturation temperature of the refrigerant in the outdoor heat exchanger 16 is higher than the outside air temperature Tam, the opening degree pattern KPN2 is increased in response to the increase in the target blowout temperature TAO. Therefore, the saturation temperature of the refrigerant in the outdoor heat exchanger 16 decreases and the difference from the outside air temperature Tam decreases. Thereby, the heat radiation amount of the refrigerant in the outdoor heat exchanger 16 can be reduced, and the heat radiation amount of the refrigerant in the water-refrigerant heat exchanger 12 can be increased.

Further, when the saturation temperature of the refrigerant in the outdoor heat exchanger 16 is lower than the outside air temperature Tam, the opening degree pattern KPN2 is increased as the target blowout temperature TAO rises. Therefore, the saturation temperature of the refrigerant in the outdoor heat exchanger 16 decreases and the temperature difference from the outside air temperature Tam increases. Thereby, the heat absorption amount of the refrigerant in the outdoor heat exchanger 16 can be increased, and the heat radiation amount of the refrigerant in the water-refrigerant heat exchanger 12 can be increased.

That is, in the heating series cooler-unit mode, the heat radiation amount of the refrigerant in the water-refrigerant heat exchanger 12 to the high temperature heat medium can be increased by increasing the opening degree pattern KPN2 as the target blowout temperature TAO rises. Therefore, in the heating series cooler-unit mode, the capability of heating the air in the heater core 42 can be improved as the target blowout temperature TAO rises.

(10) Heating Parallel Cooler-Unit Mode

Figure 21:
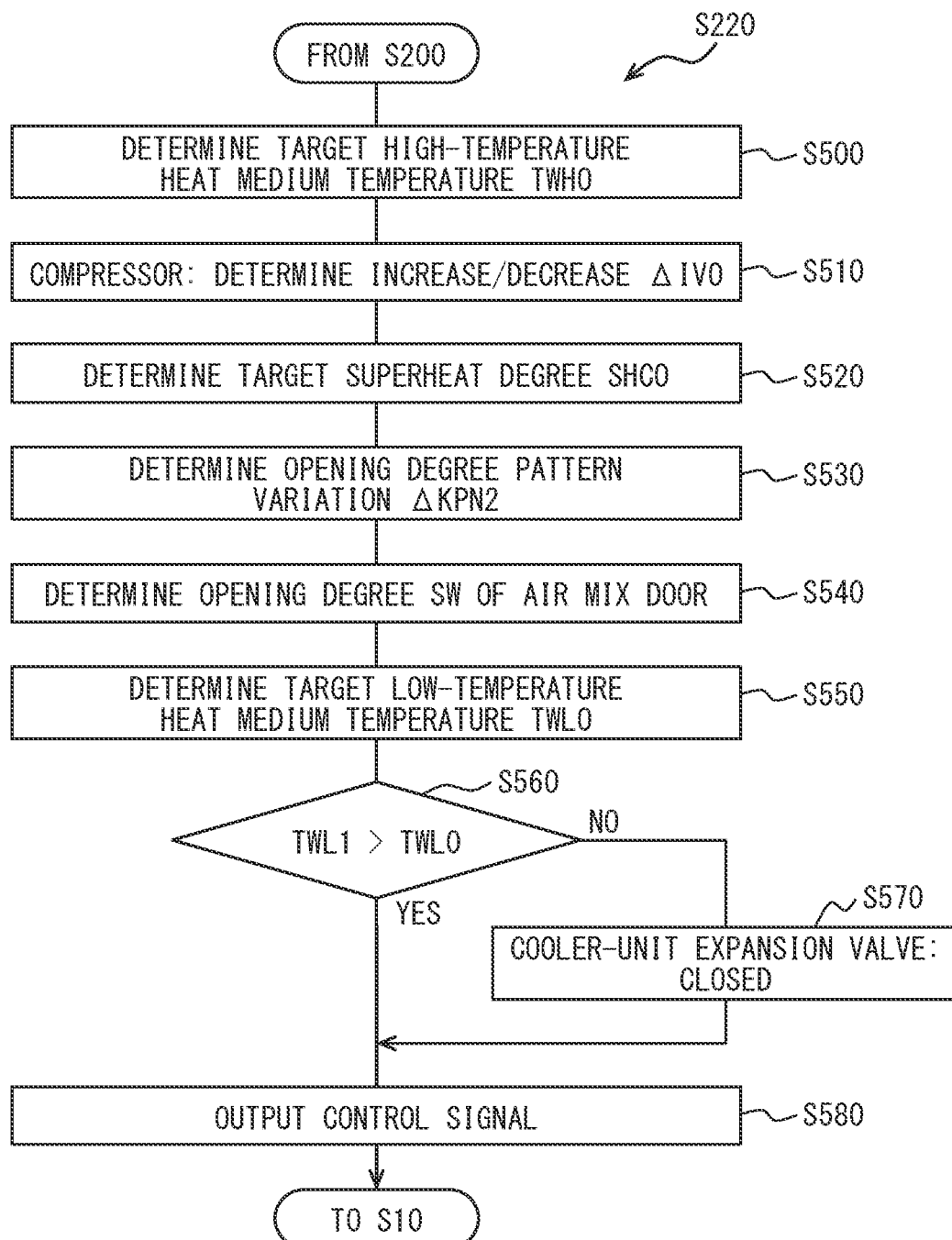
FIG. 21 is a flowchart showing a control process in a heating parallel cooler-unit mode of the first embodiment.

In the heating parallel cooler-unit mode, the controller 60 executes the control flow of the heating parallel cooler-unit mode shown in FIG. 21. First, in step S500, the target high temperature heat medium temperature TWHO of the high temperature heat medium is determined as in the series dehumidification heating mode so that the air can be heated by the heater core 42.

In step S510, the increase/decrease amount ΔIVO in the rotation number of the compressor 11 is determined. In the heating parallel cooler-unit mode, the increase/decrease amount ΔIVO is determined based on the deviation between the target high temperature heat medium temperature TWHO and the high temperature heat medium temperature TWH, as in the parallel dehumidification heating mode, using the feedback control method, such that the high temperature heat medium temperature TWH approaches the target high temperature heat medium temperature TWHO.

In step S520, the target superheat degree SHCO of the outlet side refrigerant of the refrigerant passage of the chiller 19 is determined. A predetermined constant (5° C. in the present embodiment) can be adopted as the target superheat degree SHCO.

In step S530, the variation ΔKPN2 of the opening degree pattern KPN2 is determined.

In step S531, it is determined whether the flow rate V1 of the refrigerant flowing into the chiller 19 calculated by the refrigerant flow rate calculation unit 60f is equal to or less than the reference flow rate VO.

When it is determined in step S531 that the flow rate V1 of the refrigerant flowing into the chiller 19 is equal to or less than the reference flow rate VO, the process proceeds to step S532. In step S532, the variation ΔKPN2 in the opening pattern KPN2 is set as positive, and the control for determining the variation ΔKPN2 in the opening pattern is terminated.

Figure 23:
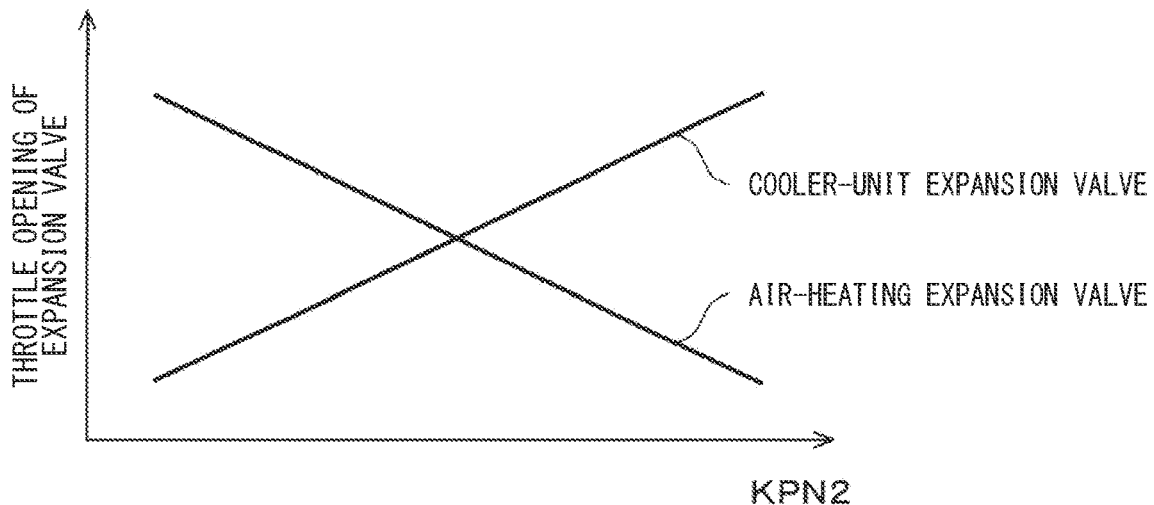
FIG. 23 is a control characteristic diagram for determining the opening pattern of the air-heating expansion valve and the cooler-unit expansion valve in the heating parallel cooler-unit mode of the first embodiment.

When the variation ΔKPN2 in the opening pattern KPN2 is set as positive, the opening pattern KPN2 becomes large. Then, in the heating parallel cooler-unit mode, as shown in FIG. 23, as the opening degree pattern KPN2 becomes larger, the throttle opening degree of the cooler-unit expansion valve 14c becomes larger, and the throttle opening degree of the air-heating expansion valve 14a becomes smaller. Therefore, when the opening degree pattern KPN2 increases, the flow rate of the refrigerant flowing into the refrigerant passage of the chiller 19 increases, and the superheat degree SHC of the refrigerant on the outlet side of the refrigerant passage of the chiller 19 decreases.

Figure 22:
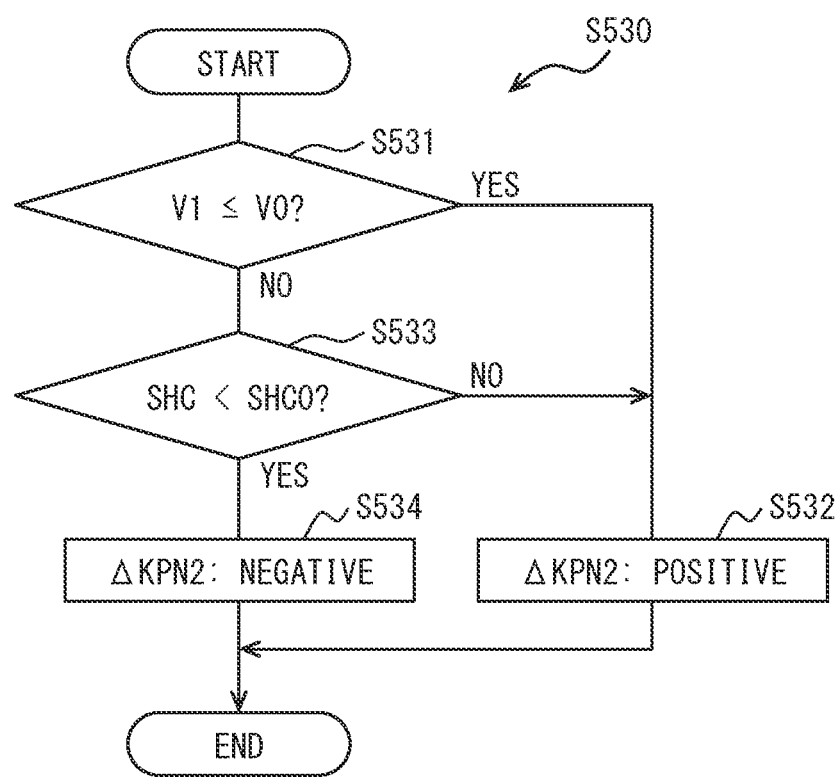
FIG. 22 is a flowchart showing a control process for determining variation in opening degree pattern of the air-heating expansion valve and the cooler-unit expansion valve in the heating parallel cooler-unit mode of the first embodiment.

As shown in FIG. 22, when it is determined in step S531 that the flow rate V1 of the refrigerant flowing into the chiller 19 is not equal to or less than the reference flow rate VO, the process proceeds to step S533. In step S533, it is determined whether the superheat degree SHC of the refrigerant flowing out from the refrigerant passage of the chiller 19 calculated by the superheat degree calculation unit 60g is lower than the target superheat degree SHCO.

When it is determined in step S533 that the superheat degree SHC of the refrigerant flowing out from the refrigerant passage of the chiller 19 is lower than the target superheat degree SHCO, the process proceeds to step S534. When it is not determined in step S534 that the superheat degree SHC of the refrigerant flowing out from the refrigerant passage of the chiller 19 is lower than the target superheat degree SHCO, the process proceeds to step S532.

In step S534, the variation ΔKPN2 in the opening pattern KPN2 is set as negative, and the control for determining the variation ΔKPN2 in the opening pattern is terminated.

When the variation ΔKPN2 of the opening pattern KPN2 is set as negative, the opening pattern KPN2 becomes smaller. Then, in the heating parallel cooler-unit mode, as shown in FIG. 23, as the opening pattern KPN2 becomes smaller, the throttle opening of the cooler-unit expansion valve 14c becomes smaller, and the throttle opening of the air-heating expansion valve 14a becomes larger. Therefore, when the opening pattern KPN2 becomes smaller, the flow rate of the refrigerant flowing into the refrigerant passage of the chiller 19 decreases, and the superheat degree SHC of the refrigerant on the outlet side of the refrigerant passage of the chiller 19 increases.

As shown in FIG. 22, in step S540, the opening degree SW of the air mix door 34 is calculated as in the air-cooling mode. In step S550, the target low temperature heat medium temperature TWLO of the low temperature heat medium is determined as in the air-cooling cooler-unit mode.

In step S560, it is determined whether the first low temperature heat medium temperature TWL1 detected by the first low temperature heat medium temperature sensor 67a is higher than the target low temperature heat medium temperature TWLO.

When it is determined in step S560 that the first low temperature heat medium temperature TWL1 is higher than the target low temperature heat medium temperature TWLO, the process proceeds to step S580. When it is not determined in step S560 that the first low temperature heat medium temperature TWL1 is higher than the target low temperature heat medium temperature TWLO, the process proceeds to step S570. In step S570, the cooler-unit expansion valve 14c is fully closed and the process proceeds to step S580.

In step S580, in order to switch the refrigeration cycle device 10 to the refrigerant circuit in the heating parallel cooler-unit mode, the air-heating expansion valve 14a is in a throttled state, the air-cooling expansion valve 14b is fully closed, and the cooler-unit expansion valve 14c is in a throttled state. Further, the dehumidification on-off valve 15a is opened, and the air-heating on-off valve 15b is opened. Further, a control signal or control voltage is output to each control target device so that the control state determined in steps S510, S530, S540, and S570 is obtained, and the process returns to step S10.

Therefore, in the refrigeration cycle device 10 in the heating parallel cooler-unit mode, a vapor compression refrigeration cycle is constructed to circulate the refrigerant in order of the compressor 11, the water-refrigerant heat exchanger 12, the air-heating expansion valve 14a, the outdoor heat exchanger 16, the heating passage 22b, the accumulator 21, and the compressor 11 and to circulate the refrigerant in order of the compressor 11, the water-refrigerant heat exchanger 12, the bypass passage 22a, the cooler-unit expansion valve 14c, the chiller 19, the evaporation pressure control valve 20, the accumulator 21, and the compressor 11.

That is, in the refrigeration cycle device 10 in the heating parallel cooler-unit mode, the water-refrigerant heat exchanger 12 functions as a radiator that radiates the heat of refrigerant discharged from the compressor 11. The air-heating expansion valve 14a functions as a pressure reducing unit. The outdoor heat exchanger 16 functions as an evaporator. At the same time, the air-heating expansion valve 14a and the cooler-unit expansion valve 14c connected in parallel to the outdoor heat exchanger 16 function as a pressure reducing unit. Then, a refrigeration cycle in which the chiller 19 functions as an evaporator is configured.

According to this, the water-refrigerant heat exchanger 12 can heat the high temperature heat medium and the chiller 19 can cool the low temperature heat medium.

Therefore, in the vehicle air conditioner 1 in the heating parallel cooler-unit mode, the cabin can be heated by blowing the air heated by the heater core 42 into the cabin. Furthermore, the low temperature heat medium cooled by the chiller 19 is caused to flow into the cooling heat exchange section 52, whereby the battery 80 can be cooled.

Further, in the refrigeration cycle device 10 in the heating parallel cooler-unit mode, the outdoor heat exchanger 16 and the chiller 19 are connected in parallel to the refrigerant flow, and the evaporation pressure control valve 20 is arranged downstream of the refrigerant passage of the chiller 19. Thereby, the refrigerant evaporation temperature in the outdoor heat exchanger 16 can be made lower than the refrigerant evaporation temperature in the refrigerant passage of the chiller 19.

Therefore, in the heating parallel cooler-unit mode, the heat absorption amount of the refrigerant in the outdoor heat exchanger 16 can be increased, and the heat radiation amount of the refrigerant in the water-refrigerant heat exchanger 12 can be increased, compared to the heating series cooler-unit mode. As a result, in the heating parallel cooler-unit mode, the air can be reheated with a heating capacity higher than that in the heating series cooler-unit mode.

As described above, in the refrigerating cycle device 10 at the heating parallel cooler-unit mode, the refrigerant dissipates heat in the water-refrigerant heat exchanger 12 and the refrigerant evaporates in the outdoor heat exchanger 16 and the chiller 19 arranged in parallel with each other in the flow of the refrigerant dissipated in the water-refrigerant heat exchanger 12. Therefore, the heating parallel cooler-unit mode of the present embodiment corresponds to a parallel evaporation mode.

(11) Cooler-Unit Mode

Figure 24:
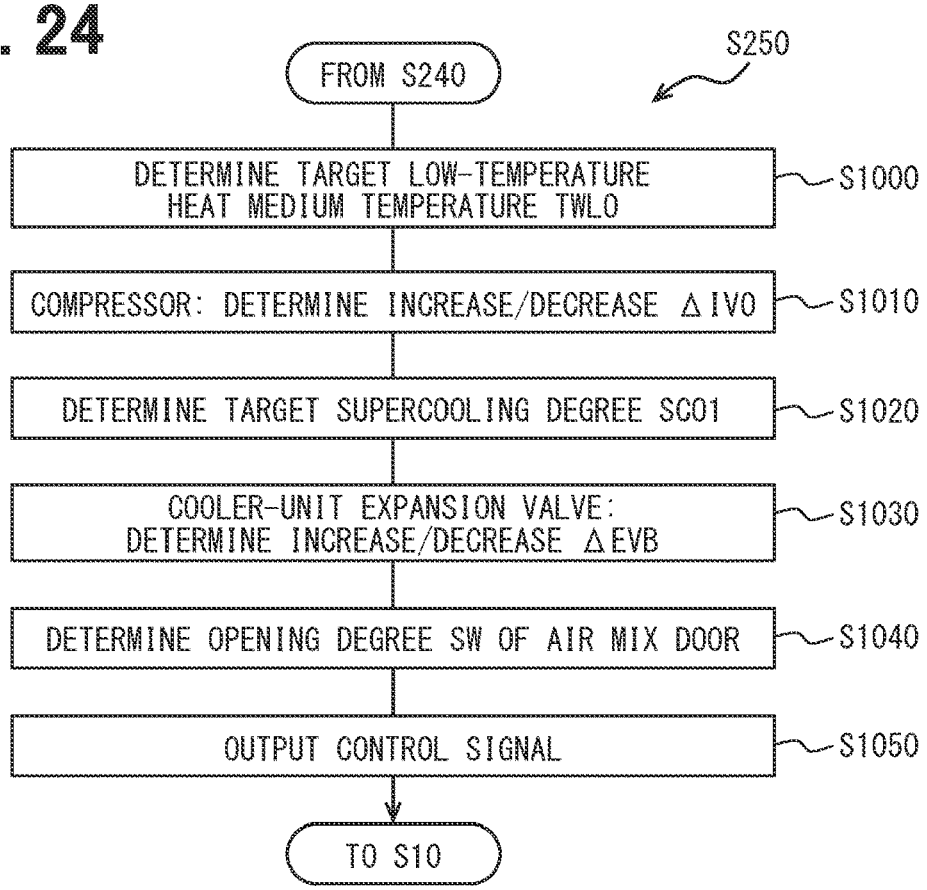
FIG. 24 is a flowchart showing a control process in a cooler-unit mode of the first embodiment.

In the cooler-unit mode, the controller 60 executes the control flow of the cooler-unit mode shown in FIG. 24. First, in steps S1000 to S1040, similar to steps S300 to S340 in the heating cooler-unit mode, the target low temperature heat medium temperature TWLO of the low temperature heat medium, the increase/decrease amount ΔIVO in the rotation number of the compressor 11, the target supercooling degree SCO1, The increase/decrease amount ΔEVB of the throttle opening degree of the cooler-unit expansion valve 14c and the opening degree SW of the air mix door 34 are determined.

In the cooler-unit mode, since the target blowout temperature TAO becomes lower than the heating reference temperature γ, the opening degree SW of the air mix door 34 approaches 0%. Therefore, in the cooler-unit mode, the opening degree of the air mix door 34 is determined so that almost the entire flow of the air passing through the indoor evaporator 18 passes through the cold air bypass passage 35.

In step S1050, in order to switch the refrigeration cycle device 10 to the refrigerant circuit in the cooler-unit mode, the air-heating expansion valve 14a is fully opened, the air-cooling expansion valve 14b is fully closed, and the cooler-unit expansion valve 14c is throttled. Further, the dehumidification on-off valve 15a is closed and the air-heating on-off valve 15b is closed. Further, a control signal or control voltage is output to each control target device so that the control state determined in steps S1010, S1030, and S1040 is obtained, and the process returns to step S10.

Therefore, in the refrigeration cycle device 10 in the cooler-unit mode, a vapor compression refrigeration cycle is formed to circulate the refrigerant in order of the compressor 11, the water-refrigerant heat exchanger 12 (the air-heating expansion valve 14a), the outdoor heat exchanger 16, the check valve 17, the cooler-unit expansion valve 14c, the chiller 19, the evaporation pressure control valve 20, the accumulator 21, and the compressor 11.

That is, in the refrigeration cycle device 10 in the cooler-unit mode, the outdoor heat exchanger 16 functions as a radiator that radiates the heat of refrigerant discharged from the compressor 11. The cooler-unit expansion valve 14c functions as a pressure reducing unit. Then, a vapor compression refrigeration cycle in which the chiller 19 functions as an evaporator is configured.

According to this, the chiller 19 can cool the low temperature heat medium. Therefore, in the vehicle air conditioner 1 in the cooler-unit mode, the battery 80 can be cooled by causing the low temperature heat medium cooled by the chiller 19 to flow into the cooling heat exchange section 52.

As described above, in the refrigeration cycle device 10 of this embodiment, the operation modes can be switched from each other. As a result, the vehicle air conditioner 1 can perform comfortable air conditioning for the cabin and appropriately control the temperature of the battery 80.

As described above, in the refrigeration cycle device 10 with (5) Air-cooling cooler-unit mode, (6) Series dehumidification heating cooler-unit mode, (7) Parallel dehumidification heating cooler-unit mode and (10) Heating parallel cooler-unit mode, the chiller 19 is arranged in parallel with at least one of the outdoor heat exchanger 16 and the indoor evaporator 18 in the flow of the refrigerant dissipated in the water-refrigerant heat exchanger 12. Then, the refrigerant evaporates in the chiller 19 and at least one of the outdoor heat exchanger 16 and the indoor evaporator 18.

Figure 15:
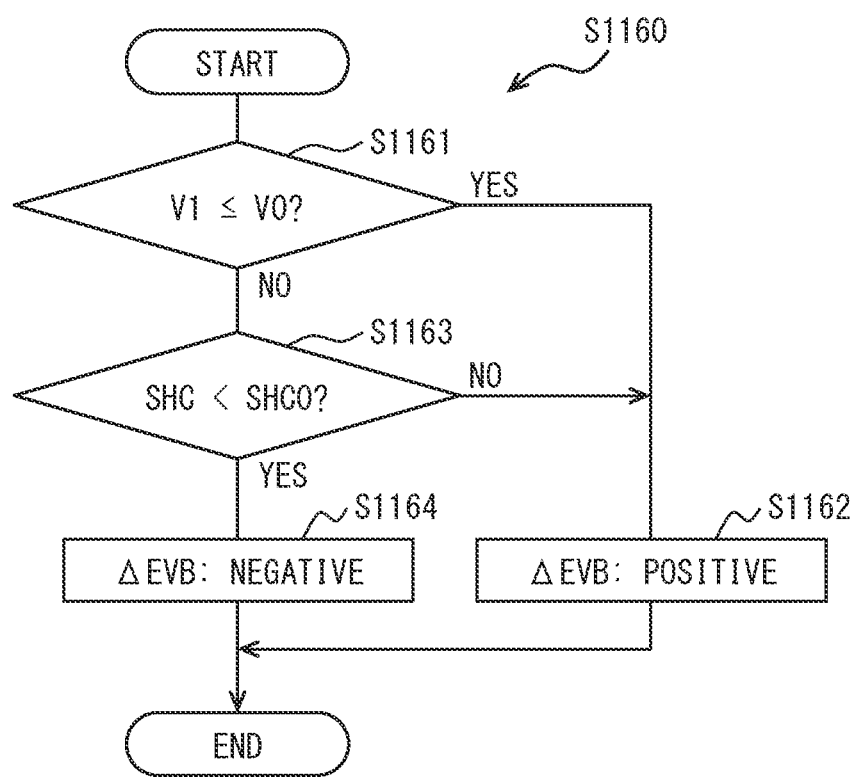
FIG. 15 is a flowchart showing a control process for determining increase/decrease in a throttle opening of a cooler-unit expansion valve in the air-cooling cooler-unit mode of the first embodiment.

As described above, in (5) Air-cooling cooler-unit mode, (6) Series dehumidification heating cooler-unit mode, and (7) Parallel dehumidification heating cooler-unit mode, as shown in FIG. 15, when the flow rate V1 of the refrigerant flowing into the chiller 19 is lower than or equal to the reference flow rate VO, even if the superheat degree SHC of the refrigerant flowing out from the refrigerant passage of the chiller 19 is lower than the target superheat degree SHCO, the increase/decrease ΔEVB of the throttle opening of the cooler-unit expansion valve 14c is set as positive value. That is, when the flow rate V1 of the refrigerant flowing into the chiller 19 is equal to or less than the reference flow rate VO, the increase/decrease ΔEVB in the throttle opening of the cooler-unit expansion valve 14c is set as positive value regardless of the superheat degree SHC of the refrigerant flowing out from the refrigerant passage of the chiller 19.

Therefore, in (5) Air-cooling cooler-unit mode, (6) Series dehumidification heating cooler-unit mode, and (7) Parallel dehumidification heating cooler-unit mode, when the flow rate of the refrigerant flowing into the chiller 19 is small, the throttle opening of the cooler-unit expansion valve 14c is increased to increase the flow rate of the refrigerant flowing into the chiller 19.

Further, in (10) Heating parallel cooler-unit mode, as shown in FIG. 22, when the flow rate V1 of the refrigerant flowing into the chiller 19 is equal to or less than the reference flow rate VO, even if the superheat degree SHC of the refrigerant flowing out from the refrigerant passage of the chiller 19 is less than the target superheat degree SHCO, the variation ΔKPN2 of the opening pattern KPN2 is set as positive value. That is, when the flow rate V1 of the refrigerant flowing into the chiller 19 is equal to or less than the reference flow rate VO, the variation ΔKPN2 of the opening pattern KPN2 is set as positive value regardless of the superheat degree SHC of the refrigerant flowing out from the refrigerant passage of the chiller 19.

Therefore, in (10) Heating parallel cooler-unit mode, when the flow rate of the refrigerant flowing into the chiller 19 is small, the throttle opening of the cooler-unit expansion valve 14c is increased to increase the flow rate of the refrigerant flowing into the chiller 19.

As described above, in (5) Air-cooling cooler-unit mode, (6) Series dehumidification heating cooler-unit mode, (7) Parallel dehumidification heating cooler-unit mode, and (10) Heating parallel cooler-unit mode, the operation of the cooler-unit expansion valve 14c is controlled such that the flow rate of the refrigerant flowing into the chiller 19 exceeds the reference flow rate VO. As a result, the flow rate of the refrigerant flowing through the chiller 19 can be secured, and the refrigerating oil of the refrigerating cycle device 10 can be restricted from accumulating in the chiller 19. Therefore, it is possible to suppress the oil from staying into the chiller 19.

In the present embodiment, in (5) Air-cooling cooler-unit mode, (6) Series dehumidification heating cooler-unit mode, (7) Parallel dehumidification heating cooling mode, and (10) Heating parallel cooler-unit mode, the controller 60 controls the air-heating expansion valve 14a, the air-cooling expansion valve 14b, the cooler-unit expansion valve 14c, the air-heating on-off valve 15b, and the dehumidification on-off valve 15a, such that the refrigerant radiates heat in at least one of the water-refrigerant heat exchanger 12 and the outdoor heat exchanger 16, and the refrigerant evaporates in the chiller 19 and at least one of the indoor evaporator 18 and the outdoor heat exchanger 16.

As a result, the above-mentioned effects can be obtained in the refrigeration cycle device 10 capable of performing cooling, heating, and dehumidifying heating operations.

In the present embodiment, (5) Air-cooling cooler-unit mode is an air-cooling battery cooling mode in which the refrigerant dissipates heat in the water-refrigerant heat exchanger 12 and the outdoor heat exchanger 16 and the refrigerant evaporates in the indoor evaporator 18 and the chiller 19.

Further, (6) Series dehumidification heating cooler-unit mode is a series dehumidification heating battery-cooling mode in which the refrigerant dissipates heat in the water-refrigerant heat exchanger 12, the refrigerant dissipates or evaporates in the outdoor heat exchanger 16, and the refrigerant flowing out from the outdoor heat exchanger 16 evaporates in the indoor evaporator 18 and the chiller 19.

Further, (7) Parallel dehumidification heating cooler-unit mode is a parallel dehumidification heating battery-cooling mode in which the refrigerant dissipates heat in the water-refrigerant heat exchanger 12, and the refrigerant evaporates in the outdoor heat exchanger 16, the indoor evaporator 18, and the chiller 19.

Further, (10) Heating parallel cooler-unit mode is a heating parallel battery-cooling mode in which the refrigerant dissipates heat in the water-refrigerant heat exchanger 12, the refrigerant evaporates in the outdoor heat exchanger 16 and the chiller 19, and the refrigerant does not flow into the indoor evaporator 18.

Second Embodiment

Figure 25:
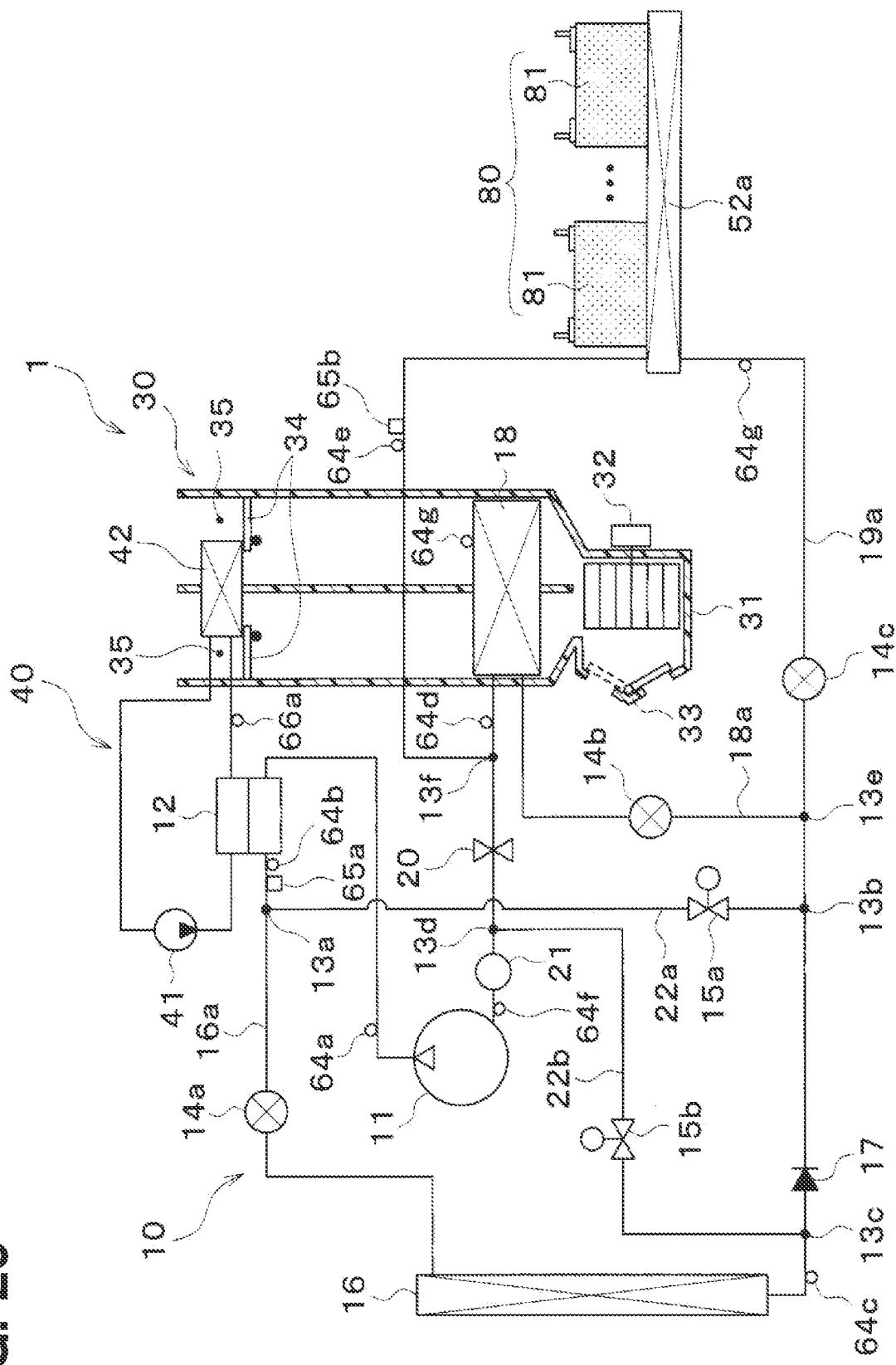
FIG. 25 is an overall configuration diagram of a vehicle air conditioner of a second embodiment.

In the present embodiment, as compared with the first embodiment, as shown in FIG. 25, the low temperature heat medium circuit 50 is eliminated. In FIG. 25, the same or equivalent parts as those of the first embodiment are denoted by the same reference numerals. This also applies to the following drawings.

More specifically, in the refrigeration cycle device 10 of the present embodiment, the inlet of the cooling heat exchange section 52a is connected to the outlet of the cooler-unit expansion valve 14c. The cooling heat exchange section 52a is a so-called direct cooling type cooler that cools the battery 80 by evaporating the refrigerant flowing through the refrigerant passage to exert endothermic effect. Therefore, in the present embodiment, the cooling heat exchange section 52a constitutes a cooler unit.

It is desirable that the cooling heat exchange section 52a has plural refrigerant passages connected in parallel with each other so that the entire area of the battery 80 can be uniformly cooled. The other inlet of the sixth three-way joint 13f is connected to the outlet of the cooling heat exchange section 52a.

Further, an inlet temperature sensor 64f is connected to the input of the controller 60 of the present embodiment. The inlet temperature sensor 64f is a temperature detector that detects the temperature of the refrigerant flowing into the refrigerant passage of the cooling heat exchange section 52.

Further, the fifth refrigerant temperature sensor 64e of the present embodiment detects the temperature T5 of the refrigerant flowing out from the refrigerant passage of the cooling heat exchange section 52. The second refrigerant pressure sensor 65b of the present embodiment detects the pressure P2 of the refrigerant flowing out from the refrigerant passage of the cooling heat exchange section 52a.

Further, in the controller 60 of the present embodiment, when the temperature T7 detected by the cooling heat exchange section inlet temperature sensor 64f is equal to or lower than a reference inlet side temperature during the operation mode in which the battery 80 needs to be cooled, the cooler-unit expansion valve 14c is closed. This restricts the battery 80 from being unnecessarily cooled and the output of the battery 80 from decreasing. The operation mode in which the battery 80 needs to be cooled is an operation mode in which the cooler-unit expansion valve 14c is in the throttled state.

Other configurations and operations of the refrigeration cycle device 10 are similar to those of the first embodiment. According to this, the same effect as that of the first embodiment can be obtained. That is, also in the refrigeration cycle device 10 of the present embodiment, the temperature of the air can be continuously adjusted within a wide range while appropriately adjusting the temperature of the battery 80.

Third Embodiment

Figure 26:
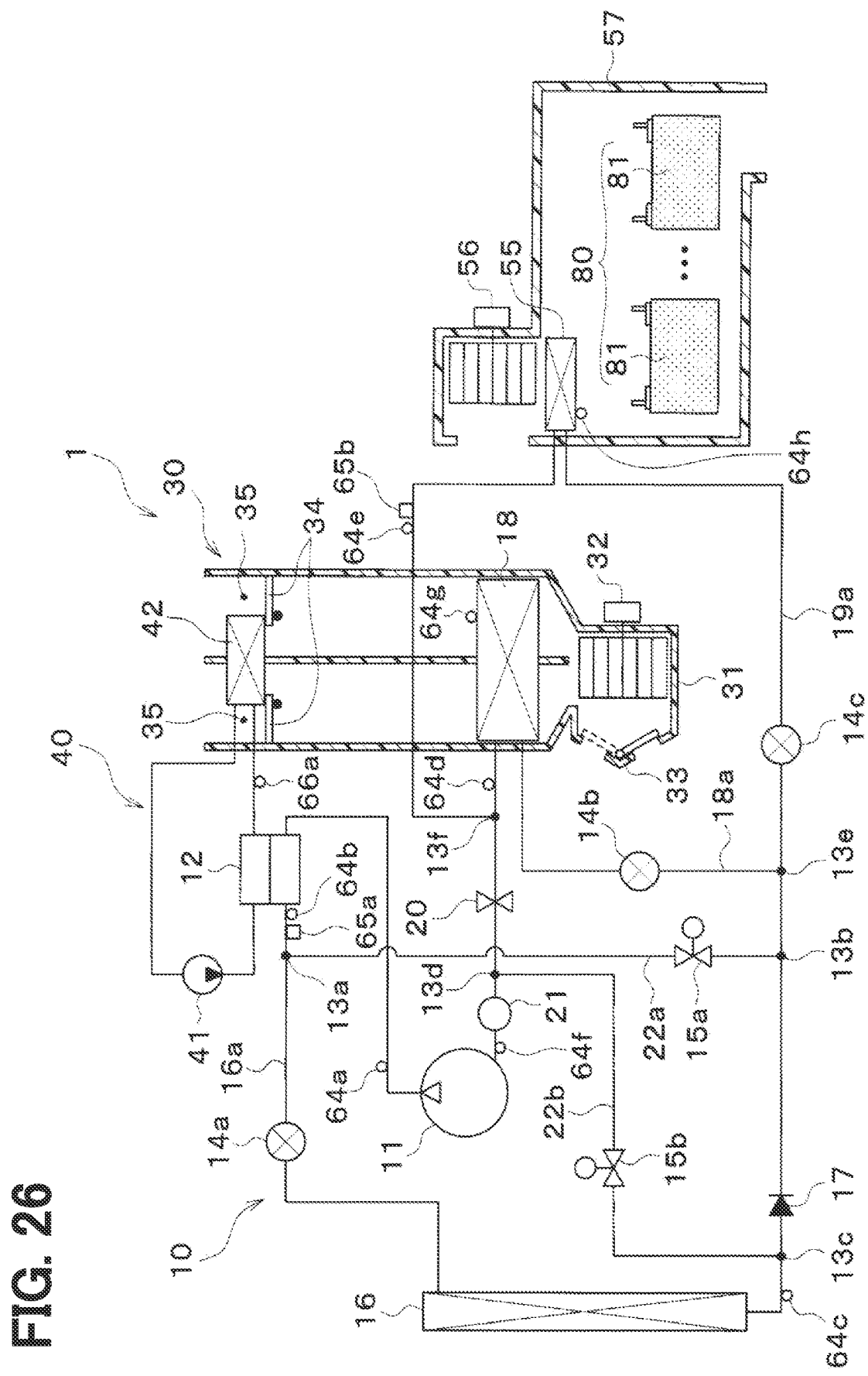
FIG. 26 is an overall configuration diagram of a vehicle air conditioner of a third embodiment.

In the present embodiment, as shown in FIG. 26, the low temperature heat medium circuit 50 is eliminated and a battery evaporator 55, a battery blower 56, and a battery case 57 are added to the first embodiment.

More specifically, the battery evaporator 55 evaporates the refrigerant by exchanging heat between the refrigerant decompressed by the cooler-unit expansion valve 14c and air blown from the battery blower 56. The battery evaporator 55 is a cooling heat exchanger that cools the air by exerting endothermic effect of the refrigerant. The refrigerant outlet of the battery evaporator 55 is connected to one inlet of the sixth three-way joint 13f.

The battery blower 56 blows the air cooled by the battery evaporator 55 toward the battery 80. The battery blower 56 is an electric blower whose rotation speed (blowing capacity) is controlled by a control voltage output from the controller 60.

The battery case 57 houses the battery evaporator 55, the battery blower 56, and the battery 80 inside, and forms an air passage for guiding the air from the battery blower 56 to the battery 80. The air passage may be a circulation passage that guides the air blown to the battery 80 toward the suction side of the battery blower 56.

Therefore, in the present embodiment, the battery blower 56 blows the air cooled by the battery evaporator 55 onto the battery 80, whereby the battery 80 is cooled. That is, in this embodiment, the battery evaporator 55, the battery blower 56, and the battery case 57 form a cooler unit.

Further, a battery evaporator temperature sensor 64h is connected to the input side of the controller 60 of the present embodiment. The battery evaporator temperature sensor 64h is a temperature detector that detects a refrigerant evaporation temperature (battery evaporator temperature) T7 in the battery evaporator 55. The battery evaporator temperature sensor 64h of the present embodiment specifically detects the temperature of heat exchange fin of the battery evaporator 55.

The controller 60 of the present embodiment controls the operation of the battery blower 56 so as to exhibit the reference air blowing capacity for each predetermined operation mode regardless of the operation mode.

Further, the controller 60 of the present embodiment closes the cooler-unit expansion valve 14c, in the operation mode in which the battery 80 needs to be cooled, when the temperature T8 detected by the battery evaporator temperature sensor 64h is equal to or lower than the reference battery evaporator temperature. This prevents the battery 80 from being unnecessarily cooled and the output of the battery 80 from decreasing. The operation mode in which the battery 80 needs to be cooled is an operation mode in which the cooler-unit expansion valve 14c is in the throttled state.

Other configurations and operations of the refrigeration cycle device 10 are similar to those of the first embodiment.

According to this, the same effect as that of the first embodiment can be obtained.

Fourth Embodiment

Figure 27:
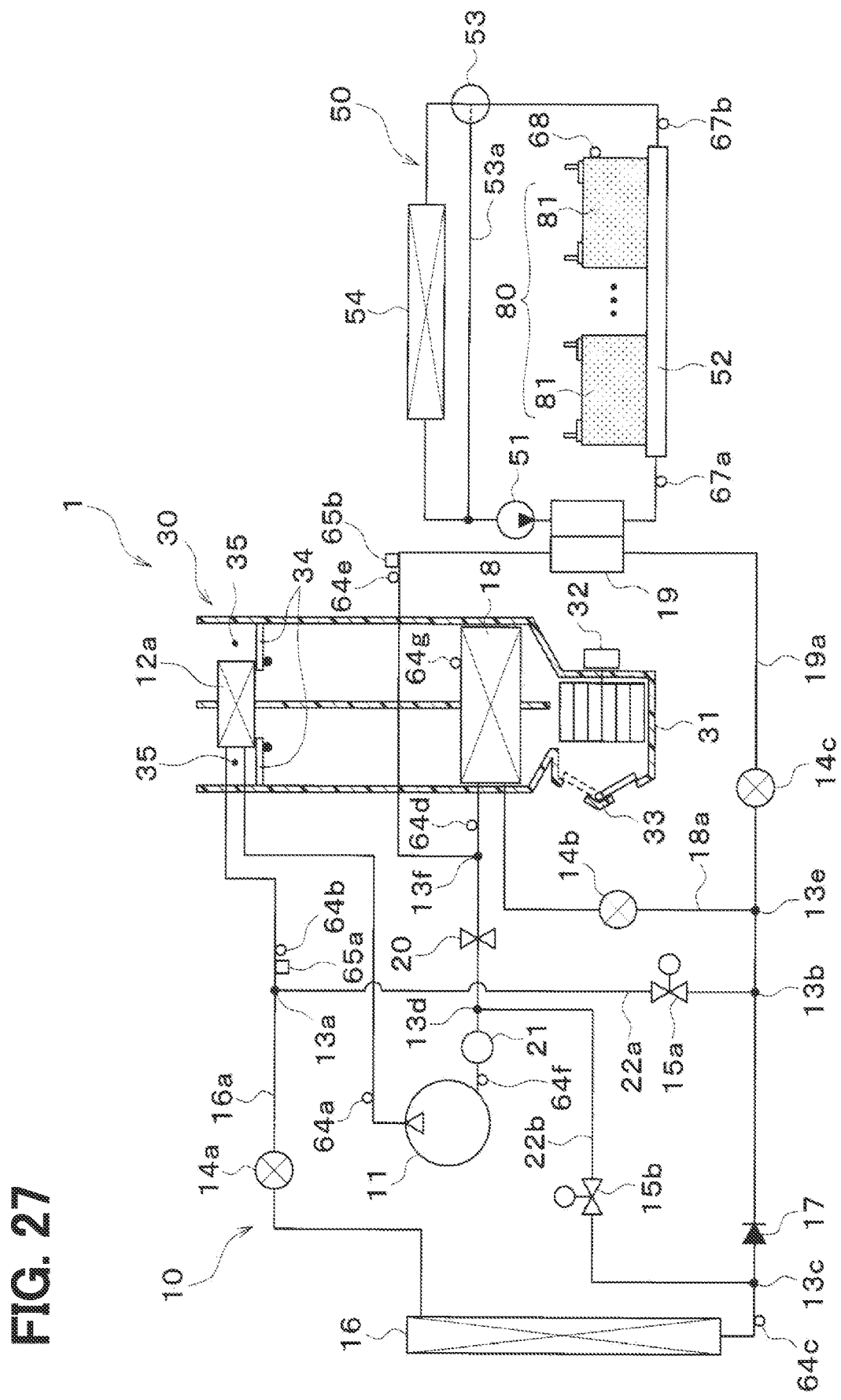
FIG. 27 is an overall configuration diagram of a vehicle air conditioner of a fourth embodiment.

In the present embodiment, as compared with the first embodiment, as shown in FIG. 27, the high temperature heat medium circuit 40 is abolished and the indoor condenser 12a is adopted.

More specifically, the indoor condenser 12a is a heating unit in which heat is exchanged between the high-temperature high-pressure refrigerant discharged from the compressor 11 and air to condense the refrigerant and to heat the air. The indoor condenser 12a is arranged in the air conditioning case 31 of the indoor air conditioning unit 30 similarly to the heater core 42 described in the first embodiment.

Other configurations and operations of the refrigeration cycle device 10 are similar to those of the first embodiment. According to this, the same effect as that of the first embodiment can be obtained.

The present disclosure is not limited to the embodiments described above, and various modifications can be made as follows within a scope not departing from the spirit of the present disclosure. Further, means disclosed in the above embodiments may be appropriately combined within an enabling range. For example, the indoor condenser 12a described in the fourth embodiment may be adopted as the heating unit of the refrigeration cycle device 10 in the second and third embodiments.

(a) Although the refrigeration cycle device 10 capable of switching the plural operation modes has been described in the embodiment, the switching of operation modes of the refrigeration cycle device 10 is not limited to this.

For example, in order to continuously adjust the temperature of the air within a wide range while appropriately adjusting the temperature of the cooling target object, at least (2) Series dehumidification heating mode, (3) Parallel dehumidification heating mode, (9) Heating series cooler-unit mode and (10) Heating parallel cooler-unit mode are needed. In addition to the four operation modes described above, (1) Air-cooling mode and (8) Heating cooler-unit mode are desirably provided.

Further, in the embodiment, the high temperature cooling reference temperature $\beta 2$ is set to be a value higher than the dehumidification reference temperature $\beta 1$, but the high temperature cooling reference temperature $\beta 2$ and the dehumidification reference temperature $\beta 1$ may be equal to each other. Further, the low temperature cooling reference temperature $\alpha 2$ is set to be a value higher than the cooling reference temperature $\alpha 1$, but the low temperature cooling reference temperature $\alpha 2$ and the cooling reference temperature $\alpha 1$ may be the same.

Further, the detailed control of each operation mode is not limited to the one disclosed in the embodiment. For example, in the ventilation mode described in step S260, not only the compressor 11 but also the blower 32 are stopped.

(b) The components of the refrigeration cycle device are not limited to those disclosed in the embodiment. Plural cycle constituent devices may be integrated so that the above-described effects can be exhibited. For example, a four-way joint structure may be adopted in which the second three-way joint 13b and the fifth three-way joint 13e are integrated. Further, as the air-cooling expansion valve 14b and the cooler-unit expansion valve 14c, an electric expansion valve not having fully closing function and an opening/closing valve may be directly connected with each other.

Further, in the above-described embodiment, the sixth refrigerant temperature sensor 64f, which is a suction refrigerant temperature detector that detects the temperature T6 of the refrigerant sucked into the compressor 11, is adopted as a suction refrigerant detector. The suction refrigerant detector is not limited to this. For example, as the suction refrigerant detector, a suction refrigerant pressure detector may be adopted to detect the pressure of the suction refrigerant sucked into the compressor 11.

Further, in the embodiment, R1234yf is adopted as the refrigerant, but the refrigerant is not limited to this. For example, R134a, R600a, R410A, R404A, R32, R4070 and the like may be adopted. Alternatively, a mixture refrigerant may be employed in which multiple types of those refrigerants are mixed together. Further, carbon dioxide may be employed as the refrigerant to configure a supercritical refrigeration cycle in which the high-pressure side refrigerant pressure is equal to or higher than the critical pressure of the refrigerant.

(c) The configuration of the heating unit is not limited to that disclosed in the embodiment. For example, a three way valve and a high temperature radiator similar to the three-way valve 53 and the low temperature radiator 54 of the low temperature heat medium circuit 50 may be added to the high temperature heat medium circuit 40 in the first embodiment, to emit excess heat to the outside air. Further, in a vehicle including an internal combustion engine (engine) such as a hybrid vehicle, the engine cooling water may be circulated in the high temperature heat medium circuit 40.

(d) The configuration of the cooler unit is not limited to the one disclosed in the embodiment. For example, as the cooler unit, a condensing unit may be defined by the chiller 19 of the low temperature heat medium circuit 50 in the first embodiment, and a thermosiphon may be adopted such that the cooling heat exchange section 52 functions as an evaporation unit. According to this, the low temperature heat medium pump 51 can be eliminated.

The thermosiphon has the evaporation unit that evaporates the refrigerant and a condensation unit that condenses the refrigerant, and is configured by connecting the evaporation unit and the condensation unit in a closed loop (that is, in a circuit shape). Then, a specific gravity difference is generated in the refrigerant in the circuit due to a temperature difference between the temperature of the refrigerant in the evaporation unit and the temperature of the refrigerant in the condensation unit. Thus, the refrigerant is naturally circulated by the action of gravity, so that heat is transported together with the refrigerant as a heat transfer circuit.

Further, in the embodiment, the cooling target object to be cooled by the cooler unit (that is, the target object form which heat is absorbed) is the battery 80, but the cooling target object is not limited to this. The cooling target object may be inverter that converts direct current and alternating current, or a charger that charges the battery 80 with electric power. The cooling target object may be another device that generates heat during operation, such as a motor generator that outputs driving power for traveling by being supplied with electric power and generates regenerative electric power during deceleration.

(e) In the embodiment, the refrigeration cycle device 10 according to the present disclosure is applied to the vehicle air conditioner 1, but the application of the refrigeration cycle device 10 is not limited to this. For example, the present disclosure may be applied to an air conditioner for air conditioning the space, with a server cooling function appropriately adjusting the temperature of the computer server.

Although the present disclosure has been described in accordance with the embodiments, it is understood that the present disclosure is not limited to the embodiments and structures disclosed therein. The present disclosure also includes various modifications and variations within an equivalent range. In addition, while the various combinations and configurations, which are preferred, other combinations and configurations, including more, less or only a single element, are also within the spirit and scope of the present disclosure.

What is claimed is:

1. A refrigeration cycle device comprising:
   a compressor that sucks in and discharges refrigerant;
   a radiator that radiates heat from the refrigerant discharged from the compressor;
   an air-conditioning heat exchanger that evaporates the refrigerant by absorbing heat from air;
   a cooling heat exchanger arranged in parallel with the air-conditioning heat exchanger in a flow of the refrigerant that radiates heat in the radiator, the cooling heat exchanger evaporating the refrigerant by absorbing heat from a target object or a heat medium circulating for the target object;
   an air-conditioning decompression unit that adjusts a decompression amount of the refrigerant flowing into the air-conditioning heat exchanger by adjusting an opening area of an air-conditioning passage that guides the refrigerant flowing out of the radiator toward an inlet of the air-conditioning heat exchanger;
   a cooler-unit decompression unit that adjusts a decompression amount of the refrigerant flowing into the cooling heat exchanger by adjusting an opening area of a cooling passage that guides the refrigerant flowing out of the radiator toward an inlet of the cooling heat exchanger;
   a refrigerant flow rate detector that detects a flow rate of the refrigerant flowing into the cooling heat exchanger;
   a controller that controls operation of the cooler-unit decompression unit so that the flow rate of the refrigerant detected by the refrigerant flow rate detector exceeds a predetermined reference flow rate; and
   a superheat degree detector that detects a superheat degree of the refrigerant flowing out of the cooling heat exchanger, wherein
   the controller controls operation of the cooler-unit decompression unit such that the superheat degree of the refrigerant detected by the superheat degree detector approaches a target superheat degree in case where the flow rate of the refrigerant detected by the refrigerant flow rate detector is higher than the reference flow rate, and
   the controller controls operation of the cooler-unit decompression unit to increase the opening area of the cooling passage when the superheat degree detected by the superheat degree detector is lower than the target superheat degree in case where the flow rate of the refrigerant detected by the refrigerant flow rate detector is equal to or lower than the reference flow rate.

2. The refrigerating cycle device according to claim 1, further comprising:
   a suction refrigerant detector that detects temperature or pressure of suction refrigerant sucked into the compressor, wherein
   the refrigerant flow rate detector calculates a flow rate of discharge refrigerant discharged from the compressor based on the temperature or pressure of the suction refrigerant detected by the suction refrigerant detector and a rotation speed of the compressor, and the refrigerant flow rate detector calculates a flow rate of the refrigerant flowing into the cooling heat exchanger based on the flow rate of the discharge refrigerant and an opening area ratio of the opening area of the cooling passage to the opening area of the air-conditioning passage.

3. The refrigeration cycle device according to claim 1, further comprising:

an outdoor heat exchanger in which heat is exchanged between the refrigerant flowing out of the radiator and outside air;

an indoor evaporator that evaporates the refrigerant by exchanging heat between the refrigerant flowing out of the radiator and air to be blown to a target space;

a first refrigerant passage that guides the refrigerant flowing out of the radiator toward an inlet of the outdoor heat exchanger;

a first throttle portion arranged in the first refrigerant passage and capable of changing an opening area of the first refrigerant passage;

a second refrigerant passage that guides the refrigerant flowing out of the outdoor heat exchanger toward a suction side of the compressor;

a second refrigerant passage opening/closing portion arranged in the second refrigerant passage to open/close the second refrigerant passage;

a third refrigerant passage that guides the refrigerant flowing out of the outdoor heat exchanger toward the suction side of the compressor via the indoor evaporator;

a second throttle portion arranged between the outdoor heat exchanger and the indoor evaporator in the third refrigerant passage and capable of changing am opening area of the third refrigerant passage;

a bypass passage that guides the refrigerant flowing between the radiator and the first throttle portion to a position between the outdoor heat exchanger and the second throttle portion in the third refrigerant passage; and a bypass opening/closing portion arranged in the bypass passage to open/close the bypass passage, wherein the cooling passage guides the refrigerant flowing between the outdoor heat exchanger and the second throttle portion to a position between the indoor evaporator and the suction side of the compressor in the third refrigerant passage through the cooling heat exchanger, the cooler-unit decompression unit is arranged on an inlet side of the cooling heat exchanger in the cooling passage and capable of changing the opening area of the cooling passage, the controller controls operation of the cooler-unit decompression unit so that the flow rate of the refrigerant detected by the refrigerant flow rate detector exceeds the reference flow rate in a parallel evaporation mode in which the first throttle portion, the second throttle portion, the cooler-unit decompression unit, the second refrigerant passage opening/closing portion, and the bypass opening/closing portion are controlled so that the refrigerant radiates heat in at least one of the radiator and the outdoor heat exchanger, that the refrigerant evaporates in the cooling heat exchanger, and that the refrigerant evaporates in at least one of the indoor evaporator and the outdoor heat exchanger, the air-conditioning heat exchanger includes the outdoor heat exchanger and the indoor evaporator, the air-conditioning passage includes the first refrigerant passage and the third refrigerant passage, and the air-conditioning decompression unit includes the first throttle portion and the second throttle portion.

4. The refrigeration cycle device according to claim 3, wherein the parallel evaporation mode includes an air-cooling cooler-unit mode in which the refrigerant radiates heat in the radiator and the outdoor heat exchanger, and the refrigerant evaporates in the indoor evaporator and the cooling heat exchanger.

5. The refrigeration cycle device according to claim 3, wherein the parallel evaporation mode includes a series dehumidification air-heating cooler-unit mode in which the refrigerant radiates heat in the radiator, the refrigerant radiates heat or evaporates in the outdoor heat exchanger, and the refrigerant flowing out of the outdoor heat exchanger evaporates in the indoor evaporator and the cooling heat exchanger.

6. The refrigeration cycle device according to claim 3, wherein the parallel evaporation mode includes a parallel dehumidification air-heating cooler-unit mode in which the refrigerant radiates heat in the radiator and the refrigerant evaporates in the outdoor heat exchanger, the indoor evaporator, and the cooling heat exchanger.

7. The refrigeration cycle device according to claim 3, wherein the parallel evaporation mode includes a heating parallel cooler-unit mode in which the refrigerant radiates heat in the radiator, the refrigerant evaporates in the outdoor heat exchanger and the cooling heat exchanger, and the refrigerant does not flow into the indoor evaporator.

* * * * *